(12) United States Patent
Medlock et al.

(10) Patent No.: US 6,567,017 B2
(45) Date of Patent: May 20, 2003

(54) CONFIGURABLE CODE GENERATOR SYSTEM FOR SPREAD SPECTRUM APPLICATIONS

(75) Inventors: Joel D. Medlock, Los Gatos, CA (US); Paul L. Chou, Santa Clara, CA (US)

(73) Assignee: Morphics Technology, Inc., Campbell, CA (US)

(*) Notice: Subject to any disclaimer, the term of this patent is extended or adjusted under 35 U.S.C. 154(b) by 0 days.

(21) Appl. No.: 09/751,782

(22) Filed: Dec. 29, 2000

(65) Prior Publication Data

US 2001/0048380 A1 Dec. 6, 2001

Related U.S. Application Data

(60) Provisional application No. 60/173,632, filed on Dec. 30, 1999.

(51) Int. Cl.⁷ .................................................. H03M 7/00
(52) U.S. Cl. ........................ 341/50; 708/190; 714/732
(58) Field of Search ..................... 341/50, 51; 714/732, 714/733, 42, 719; 708/252, 710, 256, 190; 455/67.1

(56) References Cited

U.S. PATENT DOCUMENTS

| | | | |
|---|---|---|---|
| 4,224,676 A | 9/1980 | Appelt | 708/190 |
| 4,847,839 A | 7/1989 | Hudson, Jr. et al. | 714/732 |
| 4,974,184 A | 11/1990 | Avra | 708/252 |
| 4,979,141 A | 12/1990 | Gelinas et al. | 708/710 |
| 5,425,035 A | 6/1995 | Spence et al. | 714/732 |
| 5,446,683 A | 8/1995 | Mullen et al. | 708/256 |
| 5,506,959 A | 4/1996 | Cockburn | 714/42 |
| 5,784,323 A | 7/1998 | Adams et al. | 714/719 |
| 6,459,883 B2 * | 10/2002 | Subramanian et al. | 455/67.1 |

* cited by examiner

*Primary Examiner*—Jean Bruner Jeanglaude
(74) *Attorney, Agent, or Firm*—Pennie & Edmonds LLP

(57) ABSTRACT

A configurable code generator system (CGS) for spread spectrum applications is disclosed herein. The CGS includes a composite code generator unit (CGU), a global code generator, and an interface that is coupled to the composite code generator and the global code generator. The CGU has multiple independent code generators, each capable of generating an independent code sequence. The global code generator provides a global code sequence for synchronization. The interface has memory that stores at least one bit of the global sequence and at least one bit from at least one of the independent code sequences of the CGU from which an output conditioning circuit can selectively choose based on a desired communication protocol.

125 Claims, 27 Drawing Sheets

CONFIGURABLE CODE GENERATOR SYSTEM FOR SPREAD SPECTRUM APPLICATIONS

CROSS-REFERENCE TO RELATED APPLICATIONS

This application claims priority to the provisional patent application with the following Ser. No. 60/173,632, filed on Dec. 30, 1999.

Related applications, which are incorporated herein by reference, are:
A CONFIGURABLE ALL-DIGITAL COHERENT DEMODULATOR SYSTEM FOR SPREAD SPECTRUM APPLICATIONS Ser. No. 09/751,783
A CONFIGURABLE MULTIMODE DESPREADER FOR SPREAD SPECTRUM APPLICATIONS Ser. No. 09/751,785
APPARATUS AND METHOD FOR CALCULATING AND IMPLEMENTING A FIBONACCI MASK FOR A CODE GENERATOR Ser. No. 09/751,776
A FAST INITIAL ACQUISITION & SEARCH DEVICE FOR A SPREAD SPECTRUM COMMUNICATION SYSTEM Ser. No. 09/751,777
METHOD AND APPARATUS TO SUPPORT MULTI STANDARD, MULTI SERVICE BASE-STATIONS FOR WIRELESS VOICE AND DATA NETWORKS Ser. No. 09/752,050
IMPROVED APPARATUS AND METHOD FOR MULTI-THREADED SIGNAL PROCESSING Ser. No. 09/492,634, field on Jan. 27, 2000.

Except for application Ser. No. 09/492,634, all of the above applications are filed simultaneously herewith.

TECHNICAL FIELD

The present claimed invention relates to a configurable code generator. It is useful in the field of wireless communication and, in particular, in apparatus and methods for processing digital spread spectrum signals. It will be described in such context.

BACKGROUND ART

Wireless communication has extensive applications in consumer and business markets. Among the many communication applications/systems are: fixed wireless, unlicensed Federal Communications Commission (FCC) wireless, local area network (LAN), cordless telephony, personal base station, telemetry, mobile wireless, encryption, and other digital data processing applications. While each of these applications utilizes spread spectrum communications, they generally utilize unique and incompatible code modulation and protocols. Consequently, each application may require unique hardware, software, and methodologies for generating the codes required for encoding and for decoding a signal. This practice can be costly in terms of design, testing, manufacturing, and infrastructure resources. As a result, a need arises to overcome the limitations associated with the varied hardware, software, and methodologies of generating codes for digital signals in each of the varied spread spectrum applications.

Furthermore, within each of these applications, there is code modulation proliferation. For example, different codes can arise for different tasks, e.g., a spreading code sequence for a spreading a signal across a frequency spectrum, and a channelization code for uniquely identifying a user or a traffic channel. In another example, different codes arise based on newly structured communication protocols. For example, within the cellular telephony spread spectrum systems, industry protocols are constantly evolving.

A code generator is a device that generates predetermined code sequences used for code modulation and demodulation prescribed by a given communication protocol. If a code generator is designed for a single spread spectrum application, or for a specific protocol or standard within the application, then it is typically not usable for a different application. Furthermore, it may not even be usable with a new or refined protocol or standard within a given application. Thus, if a code generator is implemented in application-specific hardware, then the cost to update the hardware can be significant. Consequently, a need arises for overcoming the limitations of protocol non-uniformity and proliferation of code sequences in the wireless communications field.

Furthermore, the pace at which improvements and new standards arise in the wireless communication industry, new and different code standards are inevitable. If a code generator is built to satisfy only conventional code sequences and combinations, it may not be of a satisfactory capacity or configuration to accommodate a new code standard. Furthermore, while new standards are anticipated, they are not necessarily defined. As a result, a need arises for a code generator that can overcome the limitations of a conventional code generator in order to accommodate new and undefined code standards.

Another variable in the operation of a code generator is the speed of the code generator. That is, a code generator depends upon a fixed system clock. The code generator also depends on other components, such as memory access that is also tied to a given cycle time. However, because each of these components may have limitations, the speed of the code generator cannot be changed. Thus it may not be possible to increase the speed of a code generator without a costly hardware design. But a new communication protocol may require a code generation speed that is different from previous code generation speeds. Consequently, a need exists to overcome the limitation of generating code only at one speed.

A conventional code generator can load an initial state into a code generator, e.g., a linear feedback shift register (LFSR), then iteratively generate sequential values of the code sequence. If a code generator has hardware limited to producing only a short sequence length, then it may be unable to generate a longer code sequences. This is because a longer code sequence generally requires a longer LFSR. Alternatively, if an LFSR has hardware for generating a long sequence when the system only needs a short sequence, then a time penalty may be incurred. That is, after the code generator has finished generating the desired short code, the system may have to wait for the code generator to cycle through the balance of the undesired long code sequence to reach the starting point for the short sequence. Resultantly, a need arises for a code generator to overcome the limitation of sequentially indexing through the entirety of the code sequence.

SUMMARY OF THE INVENTION

The present invention provides a method and apparatus that overcomes the limitations of protocol non-uniformity and proliferation of code sequences in the wireless communications field. In particular, the present invention overcomes the limitations of a conventional code generator in order to accommodate new and undefined code standards.

And the present invention overcomes the limitation of generating code only at one speed. Lastly, the present invention overcomes the limitation of sequentially indexing through the entirety of a code sequence to reach a starting point of the sequence.

A first embodiment of the present invention provides a configurable code generator system (CGS) that can be used for any one of a wide variety of spread spectrum applications. The CGS includes a composite code generator, a global code generator, and an interface that is coupled to the composite code generator and the global code generator. The composite code generator has multiple independent code generators, each capable of generating an independent code sequence. The global code generator provides a global code sequence for synchronization. The interface has memory that stores at least one bit of the global sequence and at least one bit from at least one of the independent code sequences of the composite code generator. Multiple subsequent circuits can selectively choose one or more of the code sequences from the interface simultaneously and in parallel, as dictated by a desired communication protocol.

A second embodiment of the present invention provides a code generator having a master linear feedback shift register (LFSR) and multiple slave circuits. The multiple slave circuits are coupled in parallel to the LFSR. The LFSR itself has multiple memory registers and at least one adder coupled to the multiple memory registers for providing feedback. And each of the plurality of slave circuits has a mask circuit for receiving a unique mask word. The unique mask word corresponds to a unique offset in code space from the master linear feedback shift register. As a result, each of the multiple slave circuits provides a code sequence output in parallel. The code generator also includes a selective coupler that is coupled to the output from each of the plurality of slave circuits and coupled to a final output line. The selective interconnect allows a single desired code sequence to be provided from the code generator.

These and other objects and advantages of the present invention will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate embodiments of the invention and, together with the description, serve to explain the principles of the invention. It should be understood that the drawings referred to in this description are not drawn to scale unless specifically noted as such.

DETAILED DESCRIPTION OF THE INVENTION

Figure 1A:
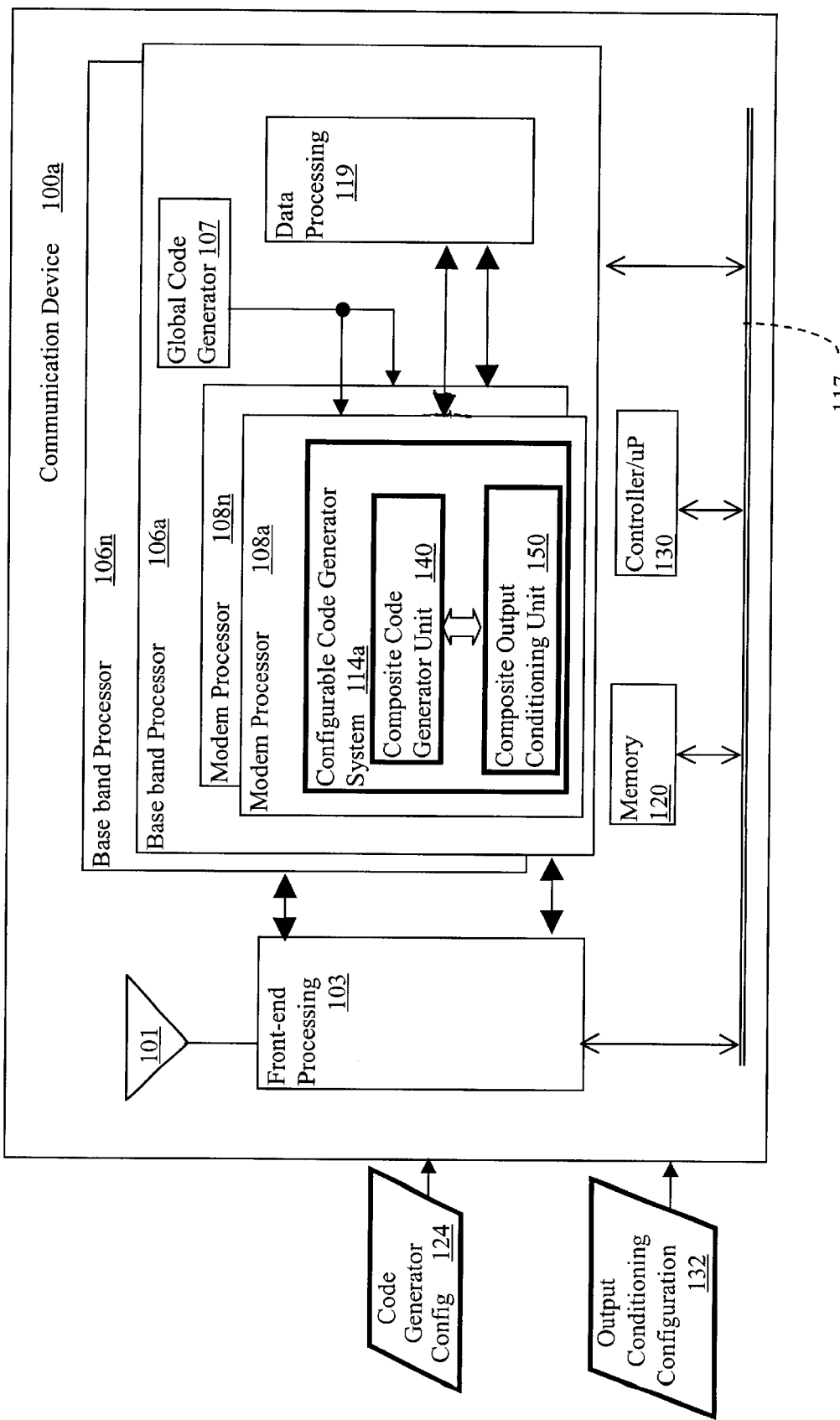
FIG. 1A is a block diagram of an electronic communication device having a configurable code generator, in accordance with one embodiment of the present invention.

Reference will now be made in detail to the preferred embodiments of the invention. Examples of the preferred embodiment are illustrated in the accompanying drawings. While the invention will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

The present invention can be implemented in a wide variety of digital spread-spectrum wireless communication systems or techniques that utilize code sequences. Code sequences are utilized in wireless communications for many functions including, but not limited to: filtering, searching, modulation, and demodulation. The systems or techniques which utilize code sequences include, but are not limited to, fixed wireless, unlicensed Federal Communications Commission (FCC) wireless systems, wireless local area network (W-LAN), cordless telephony, cellular telephony, personal base station, telemetry, and other digital data processing applications. The present invention can be applied to both transmitters, e.g., a base station, and to receivers, e.g., a terminal, for fixed wireless, W-LAN, cellular telephony, and personal base station applications.

In particular, one fixed wireless application to which the present invention may be applied is a metropolitan multipoint distribution system (MMDS). Examples include wireless cable broadcast, or two-way wireless local loop (WLL) systems. Some examples of a W-LAN, that can communicate digitized audio and data packets, and for which the present invention can be applied, include Open Air, and the Institute of Electrical and Electronics Engineers (IEEE) specification 802.11b. In yet another application, a specific example of unlicensed FCC applications to which the present invention may be applied include the Industrial, Scientific, and Medical band (ISM) devices, which can include cordless telephony products. Personal base stations can utilize either cordless or cellular telephony wireless communication standards. Lastly, the cellular telephony systems in which the present invention can be applied includes, but is not limited to, IS-95, IS2000, ARIB, 3GPP-FDD, 3GPP-TDD, 3GPP2, 1EXTREME, or other user-defined protocols. The range of code sequences utilized in the exemplary spread spectrum applications disclosed herein, are useful to define the class of functions for which the present configurable code generator unit is applicable.

The detailed description of the present invention begins with a description of a spread-spectrum communication device, in FIGS. 1A, in which a configurable code generator unit is implemented. Then, a detailed description is provided for the code generation unit itself. Thereafter, the component code generators, interface, and output condition circuits of the configurable code generator system are described in FIGS. 2A through 7C. Lastly, various processes associated with the communication device, the code generator unit, and the component code generators, interface, and output-conditioning circuits of the code generator unit are described in FIGS. 8A–8M.

Communication Device

Referring now to FIG. 1A, a block diagram of an electronic communication device having a configurable code generator is shown, in accordance with one embodiment of the present invention. Electronic communication device 100a provides an exemplary application of the present invention in a wireless code division multiple access (CDMA) base station. Furthermore, the present invention is applicable to any electronic device utilizing code sequences for data processing. The configurable code generator system portion of the communication system 100a is described in more detail in subsequent hardware diagrams and flowchart diagrams.

Communication device 100a includes an antenna 101, a front-end processing block 103, a base band processing block 106a, a microprocessor (mP)/controller 130, a memory block 120, and a bus 117. Front-end processing block 103 is coupled to base band processing block 106a, both of which are coupled to mP 130 and memory block 120 via bus 117. Microprocessor 130 and memory block 120 support the exchange of data and/or instructions to the various components of communication device 100a. Base band processor block 106a is coupled to front-end processing block 103 to receive and to transmit signals.

Front-end processing block is coupled to antenna 101 to receive a wireless signal. Front-end processing block includes components (not shown) such as a radio frequency (RF) transceiver and an analog to digital (A/D) converter, coupled to each other in series. The subcomponents and functions of these components within front-end processing block 103 are known to those skilled in the art. In contrast, data processing block 119 performs functions such as combining, decoding, etc., that are performed by a combiner, a codec device, and other components known by those skilled in the art. These components are not shown in data processing block 119 for purposes of clarity.

Base band processing block 106a is operable to process the band of frequencies of the signal delivered by a source. Base band processing block 106a includes multiple modem processor blocks 108a–108n, a global code generator 107, and data processing function block 119. Each modem processor block, e.g., 108a, has a configurable code generator system block (CGS) 114a, as well as other modem blocks such as a demodulator (not shown). Modem processor block 108n provides for "n" (where "N" is an arbitrary number) parallel paths in order to realize multipath receiver support D-channel diversity combining. The D-channel of the N paths is used to realize a multipath-combining receiver in the present embodiment. This enables the creation of a rake receiver for WCDMA handsets and base stations in one embodiment. At least one additional base band processor block 106n provides a duplicate version of base band processor block 106a, useful in some of the spread-spectrum applications that receive multiple channels.

CGS 114a includes a composite code generator unit (CGU) 140 and a composite output conditioning unit (OCU)

150. In one embodiment, a CGU 140 can provide any one of a wide variety of codes and types of codes according to the code configuration requests received. The wide variety of codes producible by configurable CGU, can include, but is not limited to: multiple types of channelization codes, multiple types of traffic codes, multiple types of user codes, and/or multiple types of extended codes. Some examples of code sequences to which the present invention can be applied include, but are not limited to: M-sequences, Gold codes, S2 codes, etc.

Configuration inputs to communication device 100*a* can be designed using a computing device that has a graphical user interface (GUI) with a library of functions that allow predetermined configuration options, in the present embodiment. Additionally, communication device 100*a* can receive the desired code generator configurations 124 via a variety of embodiments. For example, in one embodiment, configuration information is received via wired communications with a computing device, e.g., a workstation. In another embodiment, configuration information can be provided by an electronic storage medium, e.g., CD-ROM. In yet another embodiment, configuration information is received by wireless transmission from another communication device via antenna 101. Furthermore, configuration information is provided at the time communication device 100*a* is manufactured and/or initially programmed for operation in the field, in the present embodiment. However, in another embodiment, configuration information is dynamically implemented at a time communication device 100*a* is in operation in the field. Configuration information is received, processed, and implemented via controller 130 and memory 120, which then communicate the information and instructions via bus 117 to base band processors 106*a*–106*n*. Within baseband processor 106*a*–106*n*, local memory, e.g., memory 122, and local controller, e.g., controller 121, can control implementation of configuration information to, and operation of, CGS 114*a* and global code generator 107 in the present embodiment. Local controller 121 can provide local control signals for initiation, reset, and interrupt for CGS 114*a*, as well as scaled clock rates.

CGS 114*a* is a hardware computation resource that can be applied to a single computation process, e.g., a multipath of a given channel, in one embodiment. However, in another embodiment, the computation resource provided by CGS 114*a* can be enhanced by running CGS 114*a* at a clock rate higher than that required by a process, e.g., higher than the data rate for a communication protocol. In this manner, resources of individual computation components, such as CGS 114*a*, can be time-shared across multiple computation processes, e.g., several multipaths and/or multiple channels. Additional information on the design and implementation of configurations into a configurable communication device is provided in above-referenced co-pending U.S. patent application Ser. No. 09/492,634 entitled "IMPROVED APPARATUS AND METHOD FOR MULTI-THREADED SIGNAL PROCESSING."

Communication system 100*a* provides an exemplary embodiment of the present invention, which is well suited to alternative embodiments. For example, communication system 100*a* is a mobile handset, a test platform, an embedded modem, or other communication device in another code-dependent application. In another alternative embodiment, global code generator 107 is coupled to all base band processor blocks 106*a* through 106*n*. In this manner, global code generator 107 can provide a synchronizing code sequence for all modem function blocks in communication device 100*a*. In another alternative embodiment, exemplary front-end processing block includes different components, e.g., a chip-matched filter (CMF) that filters the signal in a manner suitable for subsequent processing by base band processor 106*a*–106*n*. Lastly, while CGS 114*a* is shown in modem processor 108*a*, communication device can include many duplicate and independent CGS that can be utilized in a searcher circuit, a filter circuit, transmitter, tracker, and in other circuits used for processing data signals.

Figure 1B:
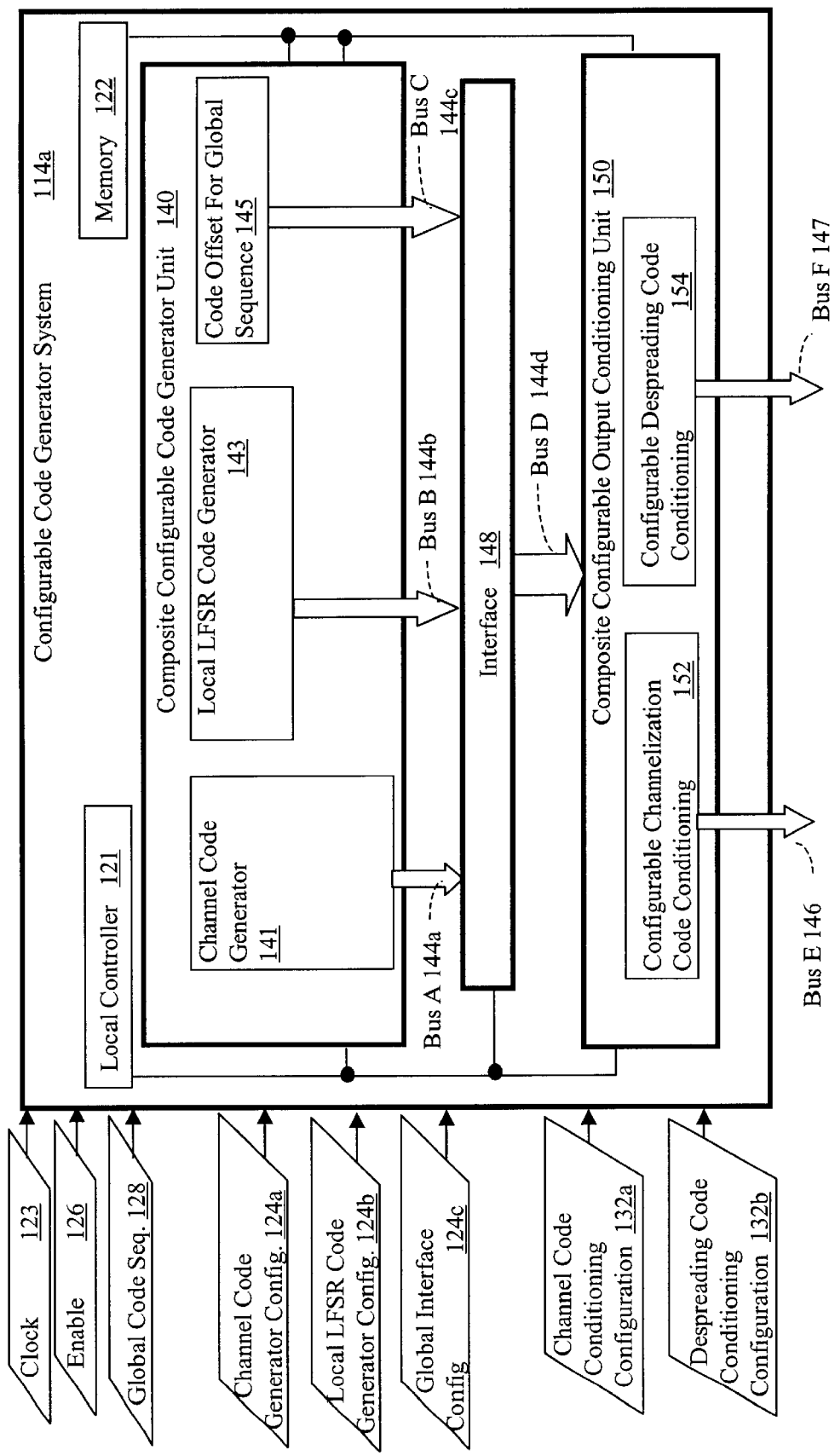
FIG. 1B is a block diagram of a configurable code generator system, in accordance with one embodiment of the present invention.

Referring now to FIG. 1B, a block diagram of a configurable code generator system is shown, in accordance with one embodiment of the present invention. FIG. 1B provides an exemplary Code Generator System (CGS) 114*a* for application in modem processor 108*a* of FIG. 1A. Depending upon its configuration, CGS 114*a* can provide multiple code sequences in parallel, wherein the ones utilized for a given communication protocol will be selected therefrom. Operation of CGS 114*a* is provided in subsequent flowchart figures.

CGS 114*a* includes CGU 140, OCU 150, and an interface 148 coupled in between them. CGS 114*a* also includes a local controller 121 and memory 122, both of which are coupled to CGU 140, interface 146, and OCU 150, to communicate configuration information, control signals, and status signals. Local controller 121 can locally scale system clock input 123 to a local clock rate for driving components in code generator system 114*a* appropriately for any one of a wide range of communication protocols. In addition, local controller 121 provides local control signals for initiation, reset, and interrupt for CGU 140, interface 146, and OCU 150.

CGU 140 includes a channel code generator 141, a local linear feedback shift register (LFSR) code generator 143, and a global code sequence interface 145, each of which are coupled in parallel to interface 148 to communicate their independently generated code. In particular, channel code generator 141 is coupled to interface 148 via bus A 144*a*, LFSR code generator 143 is coupled to interface 148 via bus B 144*b*, and global code interface 145 is coupled to interface 148 via bus C 144*c*. Global code sequence interface 145 is coupled to global code generator 107 of FIG. 1A, from which it receives global code sequence input 128. Global code sequence interface 145 provides global code sequence input 128, or an offset therefrom, as a reference state for code generator system 114*a*.

Interface 148 is a memory block for storing at least one bit provided by channel code generator 141, at least one bit from local LFSR code generator 143, and at least one bit from global code interface 145. Interface 148 provides a superset of bits from the multiple code sequences generated in composite code generator 140. For example, interface 148 can include at least one code bit from channel code generator 141, at least one bit from local LFSR code generator 143, and at least one bit from global code interface 145. From this superset of bits, OCU 150 may selectively choose the appropriate bits for subsequent conditioning operations, such as adding, as dictated by a desired communication protocol.

OCU 150 includes a channelization code conditioning circuit 152 and a despreading code conditioning circuit 154. Bus D 144*d* couples interface 148 to OCU 150. In contrast, bus E 146 communicates channelization code output from channelization code conditioning unit 152, and output bus F 147 provides despreading code output from despreading code conditioning circuit 154.

FIG. 1B provides specific exemplary inputs of code generator configuration input 124 shown in FIG. 1A. These exemplary inputs include, but are not limited to: channel code generator configuration input 124a, local LFSR code generator configuration input 124b, and global interface configuration input 125. Similarly, FIG. 1B provides exemplary inputs of output conditioning configuration inputs 132 shown in FIG. 1A. These exemplary inputs include, but are not limited to: channel code conditioning configuration 132a and despreading code conditioning configuration 132b. Additional inputs provided to code generator system 114a include a system clock input 123, an enable input 126, and a global code sequence input 128. Overall, through the combination of configurable CGU 140, a broad interface 146, a configurable OCU, and inputs 124 and 132, the present code generation system 114a provides an efficient, flexible, and universal code generator system for a wide variety of communication devices.

The present invention is well suited to alternative embodiments to CGS 114a. For example, an alternative embodiment can include additional code generators or alternative configurations for code generators than those provided in FIG. 1B. One alternative embodiment utilizes one or more non-configurable code generator units in composite code generator unit 140. The present invention is also well suited to using additional output conditioning circuits than those described for OCU 150. One alternative embodiment utilizes one or more non-configurable output conditioning circuits in composite output conditioning unit 140. Additionally, while local controller 121 and memory 122 provide local autonomous control of CGS 114a, another embodiment of the present invention utilizes system memory 120 and control 130 of FIG. 1A for operation of CGS 114a.

Configurable Channel Code Generator

Figure 2A:
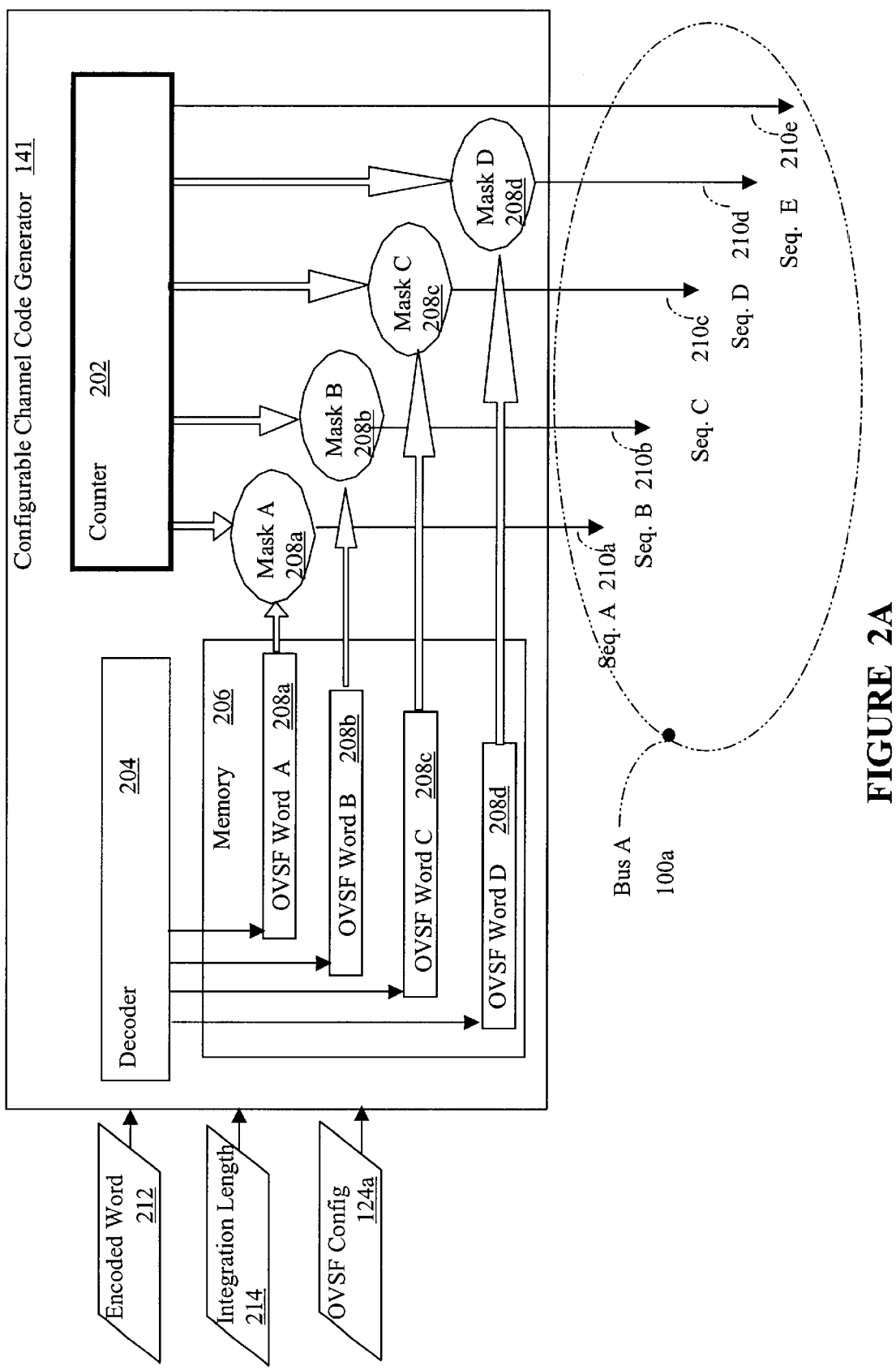
FIG. 2A is a block diagram of a configurable channel code generator, in accordance with one embodiment of the present invention.

Referring now to FIG. 2A, a block diagram of a configurable channel code generator 141 is shown, in accordance with one embodiment of the present invention. FIG. 2A provides an exemplary configurable channel code generator for application in CGS 114a of FIG. 1B. Channel code generator 141 is configurable to generate a wide variety of channelization codes, such as orthogonal varying spreading factor (OVSF) codes, for multiple communication protocols utilized by existing and future exemplary digital spread spectrum applications. Operation of configurable channel code generator is provided in subsequent flowchart figures.

Channel code generator 141 provides multiple possible bit-length sequences using the circuitry shown. In particular, channel code generator 141 includes a bit counter 202, a memory block 206, decoder block 204, and multiple mask circuits 209a–209d. Mask circuits 209a–209d are selectively coupled to bit locations of binary counter 202 and enabled by the mask word turning on selected gates within mask circuits 209a–209d. An exemplary mask circuit 209a is described in FIG. 2B. Mask circuits 209a–209d are provided as multiple instances of mask hardware in the present embodiment. Mask circuits are utilized to implement a combination of different bits in the counting sequence provided by counter 202.

Bit counter 202 sequentially can count from zero up to 256, e.g., a counter with eight registers to yield $2^8$ values. In the present embodiment, the length of bit counter 202 exceeds current requirements for spread spectrum systems. However, by providing greater capacity than necessary, and using mask circuits to scale the sequence to the desired range, the present invention provides flexibility for future expansion.

Memory block 206 has multiple memory buffers for storing mask words, e.g., word A 208a, word B 208b, word C 208c, and word D 208d; each of which are coupled in parallel to one of multiple mask circuits, e.g., masks A 209a, mask B 209b, mask C 209c, and mask D 209d, respectively. Each of the mask words, 208a-208d, enables a respective mask circuit 209a–209d to pass a select quantity of states from bit counter 202 to a respective output line 210a–210d. Output line 210e provides a least significant bit from bit counter 141. For every cycle, sequence E 210e will toggle between a value of "0" and "1" as bit counter 202 proceeds with its count. Thereby, the present invention provides multiple states, e.g., sequence A 210a through sequence D 210d, from bit counter to interface 148 of FIG. 1B. In this manner, interface 148 can selectively choose an appropriate sequence from the multiple sequences provided.

Because channel code generator 141 is configurable, it receives channel code generator configuration input 124a, e.g., an encoded word with values for word A 208a through word D 208d. Decoder 204 is coupled to each memory buffer 208a through 208d for relaying decoded results from the channel code generator configuration input 124a.

The present invention is well suited to alternative embodiments of channel code generator 141. For example, one alternative embodiment of channel code generator provides a greater number of mask words and mask circuits. In another embodiment, a larger bit counter is utilized. And in yet another embodiment, a decoder is not utilized to strip out the mask word data from a larger instruction context. Rather, mask words are directly provided from a local or system memory. One embodiment utilizes a counter 202 that only counts up to a value required by existing protocols. In a last alterative embodiment, output from mask circuits can be greater than one bit.

Figure 2B:
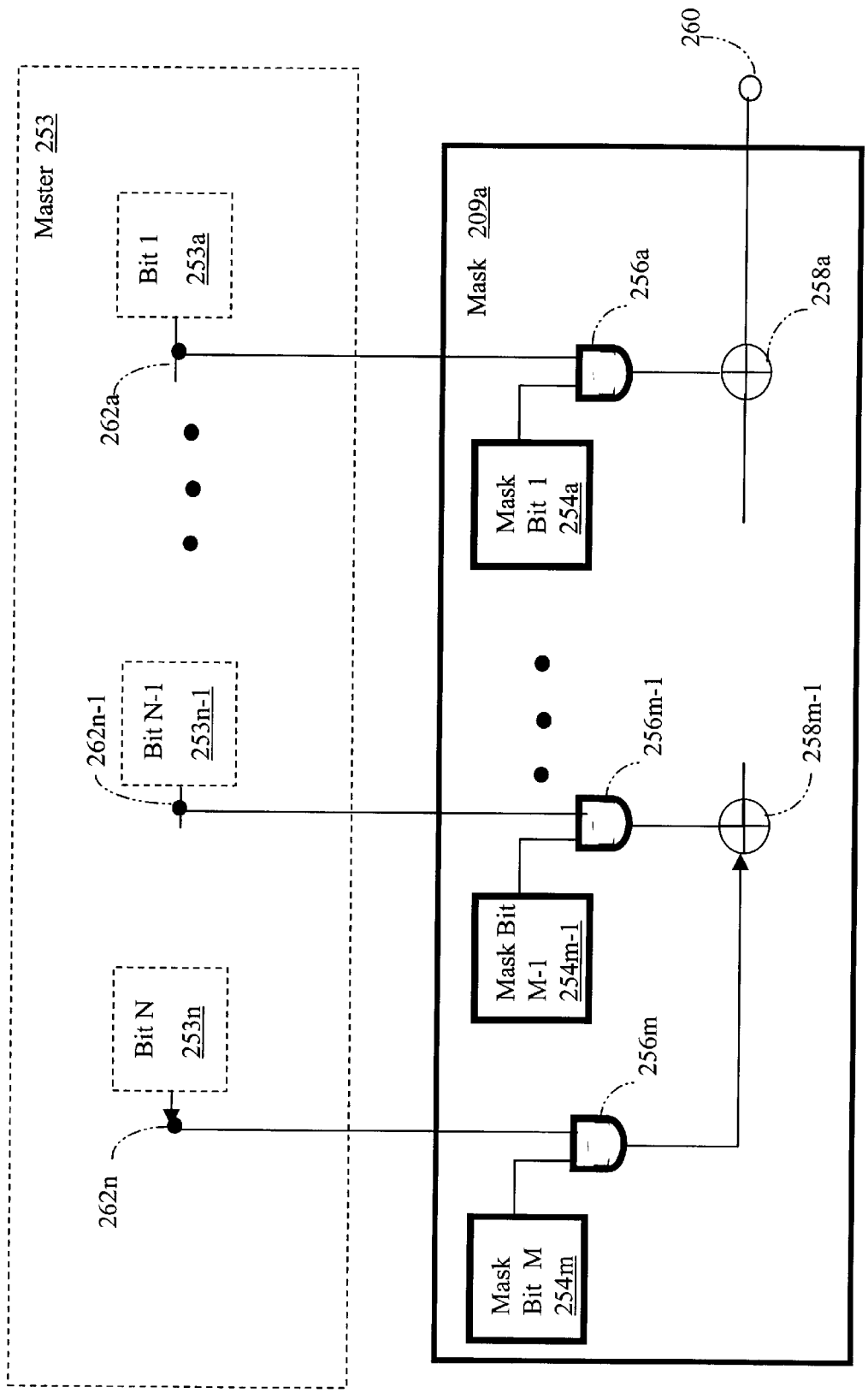
FIG. 2B is a block diagram of a mask circuit portion of the configurable channel code generator, in accordance with one embodiment of the present invention.

Referring now to FIG. 2B, a block diagram of a mask circuit portion of the configurable channel code generator is shown, in accordance with one embodiment of the present invention. Mask circuit 209a is an exemplary mask circuit for use in channel code generator 141, global code interface 145, channelization code conditioning circuit 152, despreading code conditioning circuit 154, and other circuits in CGS 114a of FIG. 1B. FIG. 2B also includes a master circuit 253 for illustrating the interaction between mask registers in mask 209a and state registers in master circuit 253.

Mask circuit 209a has multiple memory registers referred to as mask bits (or registers), e.g., mask bit 1 254a through mask bit M 254m. Similarly, master circuit 253 also includes multiple memory registers referred to as bit (or state) registers, e.g., bit 1 253a through bit N 253n. In the present embodiment, master circuit 253 represents a digital counter. The quantity of bit registers, N, is arbitrary and can depend upon the design application. If master circuit 253 is an eight-bit binary counter, then N=8 to provide $2^8$ values, e.g., zero to 255. Alternatively, master circuit 253 is an LFSR, wherein the states of the registers bit 1 253a–bit N 253n are translated and fed back in a manner known to those skilled in the art. For example, a lowest significant bit state is iteratively translated towards a most significant bit in the LFSR, with the least significant bit receiving a feedback sum, as is known by those skilled in the art.

In the present invention, "M" represents the quantity of mask registers, and the corresponding AND gates, 256a–256m, and outputs 258a–258m, and approximately the corresponding ADD circuits, 258a–258m–1. The value "M" is arbitrary, depending upon the design application. In the present embodiment, the length M for mask circuit 209a is equivalent to the length of bits, e.g., N, in a master circuit 253. However, another embodiment could provide less mask registers in mask 209a than bit registers is a master circuit 253. Outputs 262–262n can be used to transmit a bit from master circuit 253 to a logic device, e.g., AND gates 256a–256m in mask circuit 209a.

A mask circuit is enabled by a mask word. In particular, the mask word enables the selective combining of the data fed to the mask circuit, e.g., 209a, from a master circuit, e.g., 253. A mask word contains binary values that enable or disable a respective gate, e.g., a "1" value to the AND gate 256a would enable a value provided on input 262a to be output from AND gate 256a. Add circuits 258a–258m–1 add the outputs from gates 256a–256m to provide a result on output line 260. Mask circuit 209a is utilized for implementing code advancements in an LFSR to which it is coupled, in one embodiment. In another embodiment, mask circuit 209a is utilized to selectively choose a desired portion of a superset of codes or data, which spans multiple communication protocols, and combine it in a desired manner, e.g., according to the desired protocol. AND gates 256a provide the logic for selectively choosing a data value, and add circuits 258a–258m–1 provide the logic for combining the selected data values. One of multiple mask words can be selectively provided to mask circuit 209a as required by a communication protocol or a user-desired configuration.

Configurable Global Code Generator and Interface

Figure 3A:
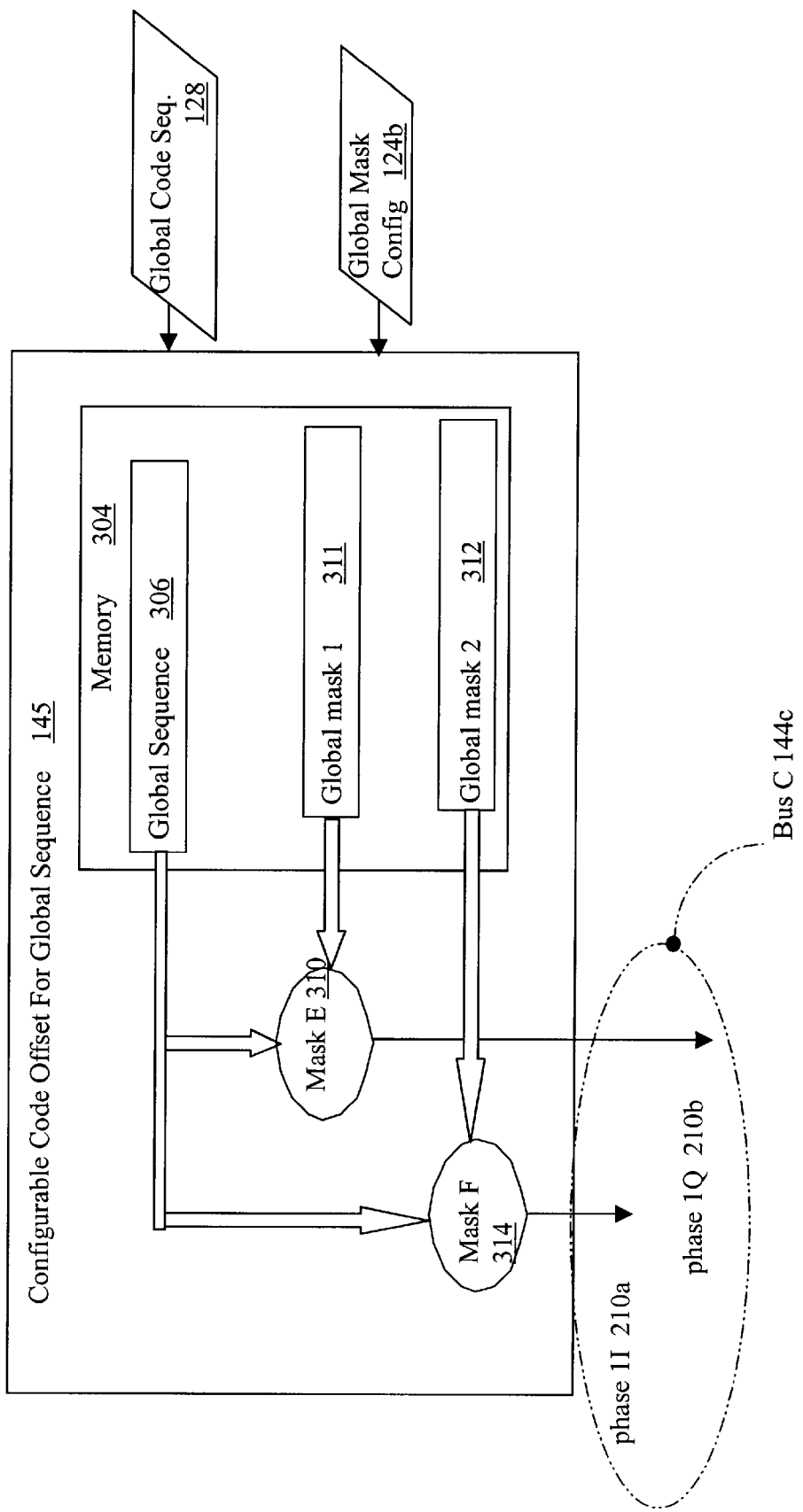
FIG. 3A is a block diagram of configurable interface for a global code sequence, in accordance with one embodiment of the present invention.

FIG. 3A is a block diagram of configurable interface 145 for a global code sequence, in accordance with one embodiment of the present invention. Configurable interface provided in FIG. 3A is an exemplary interface circuit for receiving a global code sequence and relaying an appropriate portion or offset therefrom to a local interface, e.g., interface 148, for subsequent conditioning. Detailed operation of configurable global code interface is described in a subsequent flowchart. Configurable global interface for global code 145 provides a wide range of global code sequences, via multiple parallel mask circuits, that span the class of global code sequences used by existing and future exemplary digital spread spectrum applications.

Configurable global code interface 145 includes a memory block 304 and multiple mask circuits, mask circuit E 310, and mask circuit F 314. Mask circuits E 310 and F 314 are also referred to as slave circuits, as they are dependant upon the global LFSR sequence for their output. Memory block 304 includes a memory 306 for global code sequence input 128, a memory 311 for a first global mask word, and a memory 312 for a second global mask word. Mask circuit E 310 and Mask F 314 are coupled in parallel to memory 306 to receive global sequence, e.g., via a bus for bit-to-bit coupling. Mask circuit E 310 is coupled to memory block for global mask 1 311, while mask circuit F 314 is coupled to memory for global mask 2 312. Memories 306, 311, and 312 are 42 bits long in the present embodiment to match a bit length of a global LFSR code generator, which has an order of 42. Similarly, mask E 310 and mask F 314 are 42 bits long to potentially access the full length of the global LFSR code generator.

Global mask 1 311 and global mask 2 312 are different mask words in the present embodiment, thereby representing two different offsets in code space from the output of the global code sequence. Mask circuit 209a of FIG. 2B provides an exemplary mask circuit applicable for the present mask circuits Mask E 310 and Mask F 314. However, outputs 258a through 258m of mask circuit 209a are summed to provide an output, e.g., phase 1I 210a and phase 1Q 210b, when applied to mask E 310 and mask F 314, respectively. Parallel output lines 1I 210a and phase 1Q 210b, which are also referred to as bus C 144c, represent the in-phase and quadrature-phase version of a global code sequence utilized in CGS 114a in the present embodiment. The process of operating global code interface 145 is described in a subsequent flowchart.

Because global code interface 145 is configurable, it receives a global interface configuration 124c, e.g., the mask words stored in memory 311 and 312 in the present embodiment. Global code interface block 145 also receives an input of global code sequence 128, from which the mask words will extract a code sequence. The present embodiment effectively provides a local engine for retrieving a desired code off set from a global code sequence. The present invention is well suited to alternative embodiment to those presented for global code interface 145. For example, global mask 1 311, global mask 2 312, mask E 310, mask F 314, and global sequence memory block 306 have a wide range of bit lengths in alternative embodiments.

Figure 3B:
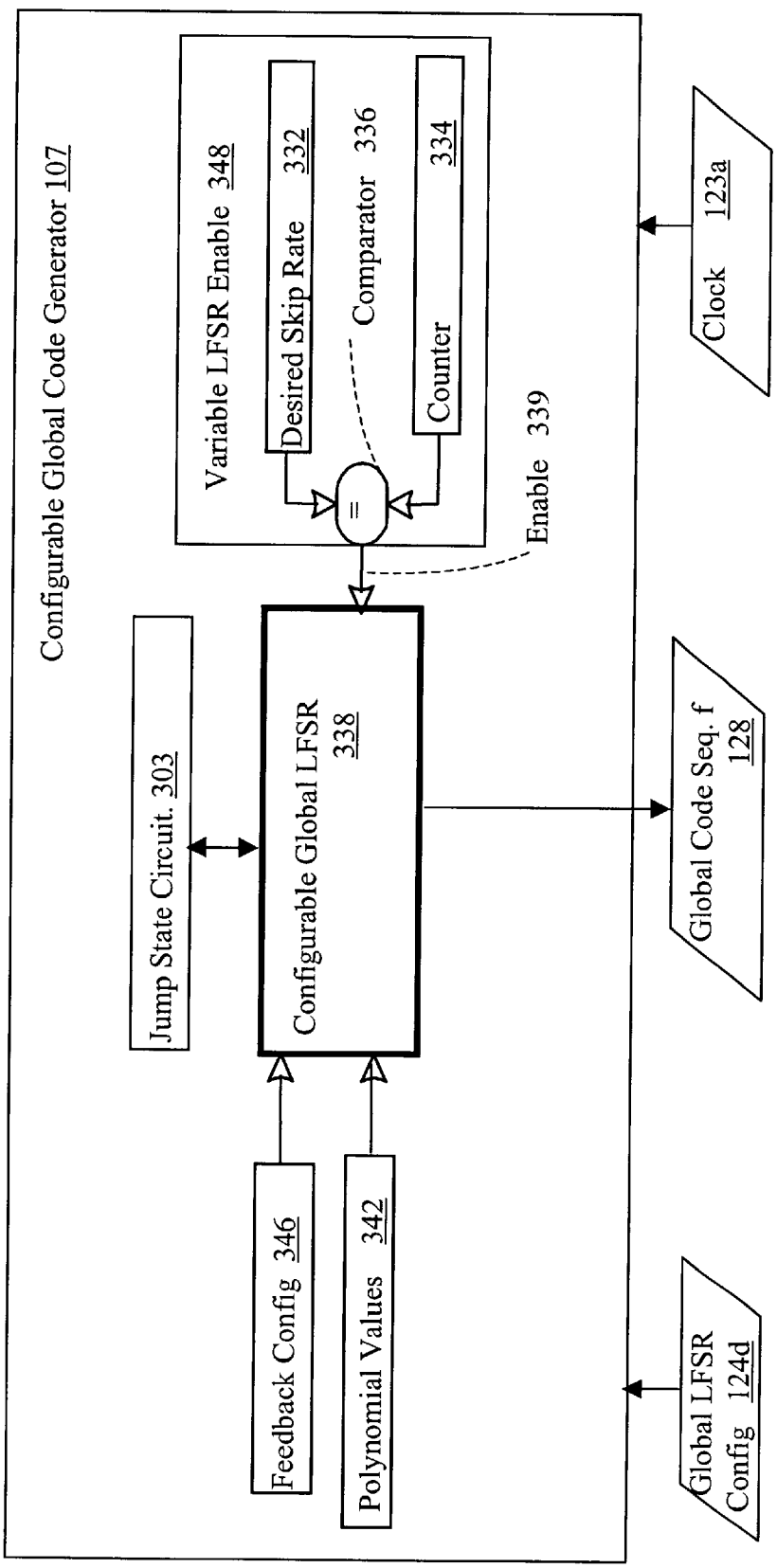
FIG. 3B is a block diagram of a configurable global code generator, in accordance with one embodiment of the present invention.

Referring now to FIG. 3B, a block diagram of a configurable global code generator is shown, in accordance with one embodiment of the present invention. FIG. 3B provides an exemplary global code generator for application in CGS 114a of FIG. 1B. Global code generator provides a single global code sequence input 128 to multiple modem processor blocks 108a through 108n of FIG. 1A, in the present embodiment. In this manner, synchronization of code sequences for multipath demodulation operations is achieved. Configurable global code generator 107 provides a wide range of configurations that span the class of code generating functions used by existing and future exemplary digital spread spectrum applications.

Configurable global code generator 107 includes a configurable global LFSR circuit 338, a jump state circuit 303, a variable LFSR rate circuit 348, feedback configuration memory 346, and polynomial values memory 342, each of which is coupled to global LFSR 338. Aspects of a configurable global LFSR 338 are provided in subsequent FIG. 4B–4F. Configurable global LFSR 338 has an order of 42 in the present embodiment, e.g., is a 42 state register LFSR, though the present invention is well suited to a wide range of orders for the LFSR. Polynomial values memory 342 provides a polynomial word for enabling a bit slice in configurable global LFSR 338 so as to vary the length of the LFSR. Feedback configuration memory 346 provides appropriate data values to configure circuitry in configurable global LFSR 338, as described in subsequent FIGS. 4B–4F.

Jump state circuit 303 is also coupled to configurable global LFSR 338. Jump state circuit 303 communicates a newly desired LFSR state into global LFSR 338 when an existing LFSR state matches a target state. The newly desired LFSR state can represent an advancement (or offset) in code space or it can represent an initialization value for the LFSR. An exemplary embodiment of jump state circuit 303 is provided in subsequent FIG. 6.

Variable LFSR enable circuit 348 allows configurable global LFSR to output code sequences, e.g., sequence output 128, at multiple rates. By using variable LFSR enable circuit 340, clock cycles can be skipped, thus allowing configurable global LFSR to generate code at one-half, one-third, etc. of a maximum clock rate, e.g., clock input 123a, provided to configurable global code generator 107. Variable LFSR enable circuit 348 is coupled to configurable global LFSR via enable line 339. A counter 334 and a skip-rate memory register 332 are coupled to comparator 336. Counter circuit 334 counts clock cycles input to global code generator 107 and compares them to the desired skip rate. Clock cycle input 123a can be a system clock signal or a local clock signal, e.g., from local controller 121 of FIG. 1B.

Because global code generator 107 is configurable, it receives global LFSR configuration information 124 provided via communication device components described in FIG. 1A. Configuration information 124 includes feedback configuration, jump states, LFSR length configuration, code rate configuration. Thus configurable global code generator 107 provides a configurable code rate, a configurable length, a configurable feedback and a configurable jump state. Consequently, configurable global code generator 107 provides a device that accommodates a wide class of code generating functions used by current and future exemplary spread spectrum applications.

Configurable LFSR Generator

Figure 4A:
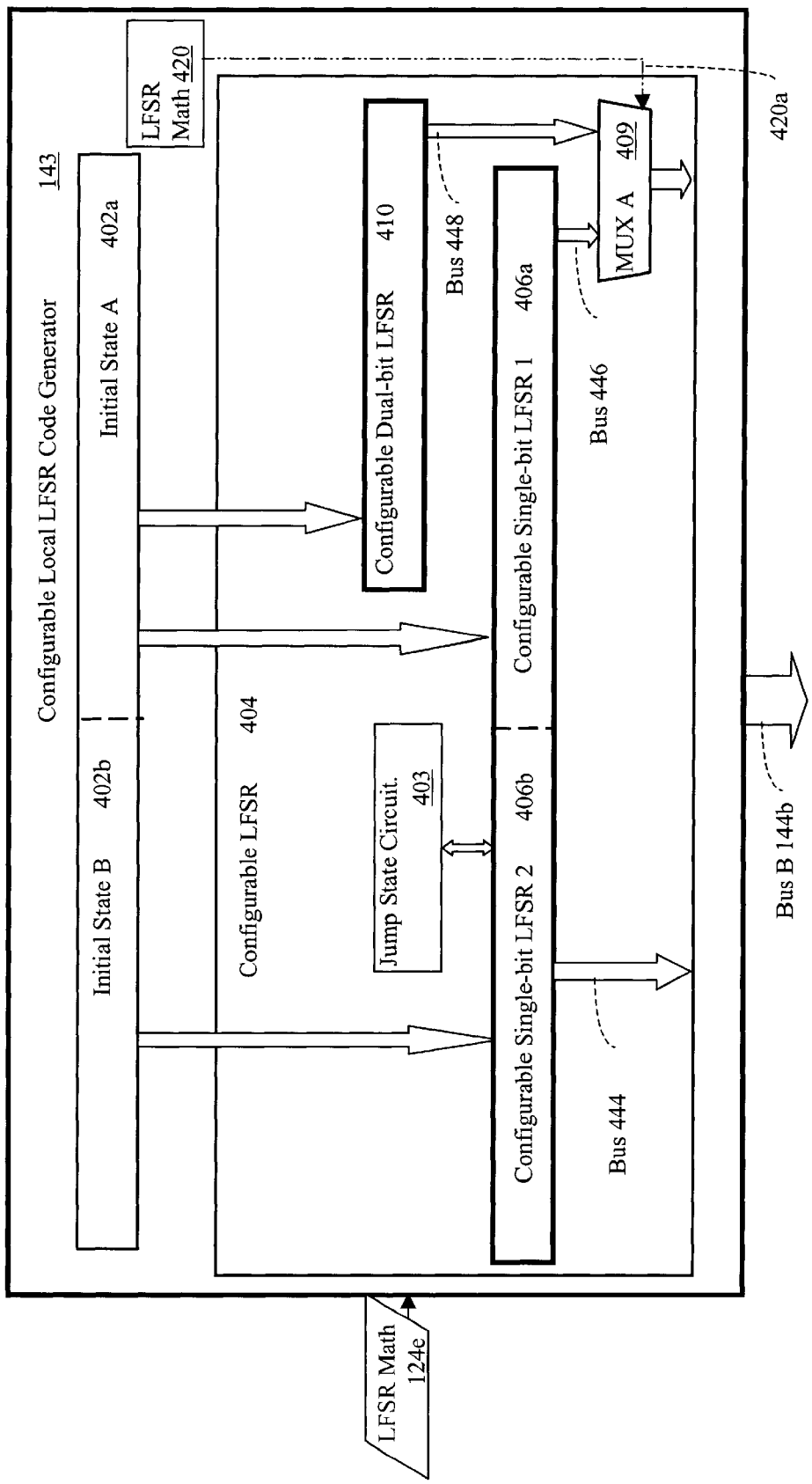
FIG. 4A is a block diagram of a configurable local LFSR code generator, in accordance with one embodiment of the present invention.

Referring now to FIG. 4A, a block diagram of a configurable local LFSR code generator 143 is shown, in accordance with one embodiment of the present invention. FIG. 4A provides an exemplary local LFSR code generator 143 for application in CGS 114a of FIG. 1B. Configurable local code generator 143 provides a wide range of local LFSR functions, e.g., despreading sequences, that span the class of code generating functions used by existing and future exemplary digital spread spectrum applications.

Local code generator 143 includes a configurable LFSR 404 having multiple independent LFSRs. In particular, configurable LFSR 404 includes a first configurable single-bit LFSR 1 406a coupled in series with a second configurable single-bit LFSR 2 406b, each of which has an output bus, e.g., bus 446 and bus 444, providing parallel output from configurable LFSR 404. Initial state B 402b memory is coupled to configurable single-bit LFSR 2 406b, while initial state A 402a memory is coupled to both configurable dual-bit LFSR 410 and to configurable single-bit LFSR 1 406a. LFSR register states are stored in initial state B 402b and initial state A 402a memory.

Configurable dual-bit LFSR 410 is similar to configurable single-bit LFSR 1 406a, but utilizes two-bit math operations in lieu of single bit math operations, which are also referred to as Z4. Thus, the hardware is essentially doubled, with the appropriate coupling arrangements for performing two-bit math. Configurable dual-bit LFSR 410 has both a Fibonacci feedback configuration and a Galois feedback configuration in the present embodiment, similar to those presented in FIGS. 4B through 4D. Additionally, configurable dual-bit LFSR 410 can have a jump-state circuit coupled to it, though it is not shown in FIG. 4A. Dual-bit LFSR 410 can include multiple component dual-bit LFSRs (not shown), similar to those shown for a single-bit LFSR 406a in FIG. 4B. In this embodiment, a selective interconnect would selectively couple the two component dual-bit LFSRs. An exemplary dual-bit bit-slice configuration for configurable dual-bit LFSR 410 is provided in subsequent FIG. 5D, while an exemplary dual-bit selective interconnect is provided in subsequent FIG. 5E.

Local code generator 143 also includes a configurable dual-bit LFSR 410, having an output bus 448, and a selective interconnect, e.g., multiplexer A 409, coupled to receive output bus 448 and 446 in parallel. LFSR math configuration input 124e provides a math configuration instruction that is stored in LFSR math memory block 420 and subsequently communicated to MUX A 409 via link 420a. In this manner, the present invention can output LFSR sequences relating to multiple math levels in parallel, e.g., output bus 444 for configurable single-bit LFSR 2 406b and either output bus 446 from configurable single-bit LFSR 1 406a or output bus 448 from configurable dual-bit LFSR 410.

Configurable single-bit LFSR 1 406a, configurable single-bit LFSR 2 406b, and configurable dual-bit LFSR 410 have components and interconnects that allow them to be configured as either a Galois feedback or a Fibonacci feedback configuration. Furthermore, configurable single-bit LFSR 1 406a and configurable single-bit LFSR 2 406b have variable lengths with which a composite LFSR can be constructed. Configurable LFSR 404 is described in more detail in subsequent apparatus and flowchart figures.

Configurable LFSR 404 also includes a jump state circuit 403 coupled to configurable single-bit LFSR 1 406a and configurable single-bit LFSR 2 406b. Jump state circuit 403 provides the data and instructions to load a new state into an LFSR when a current state of the LFSR matches some target state. In this manner, the LFSR can be advanced easily through code space. This embodiment also enables the use of an LFSR whose sequence capabilities exceed a current need, to be reset to an initial value when the end of the desired sequence is reached. An exemplary jump state circuit is described in subsequent FIG. 6.

Because local LFSR code generator 143 is configurable, it receives local LFSR math configuration information 124e provided via communication device components described in FIG. 1A. Thus configurable local LFSR code generator 143 provides code sequence outputs, e.g., on buses 444, 446, and 448, from multiple LFSRs structured for performing different levels of math, e.g., 1 bit or 2 bit operations. Consequently, configurable local LFSR code generator 143 provides a device that accommodates a wide class of code generating functions used by current and future exemplary spread spectrum applications.

Figure 4B:
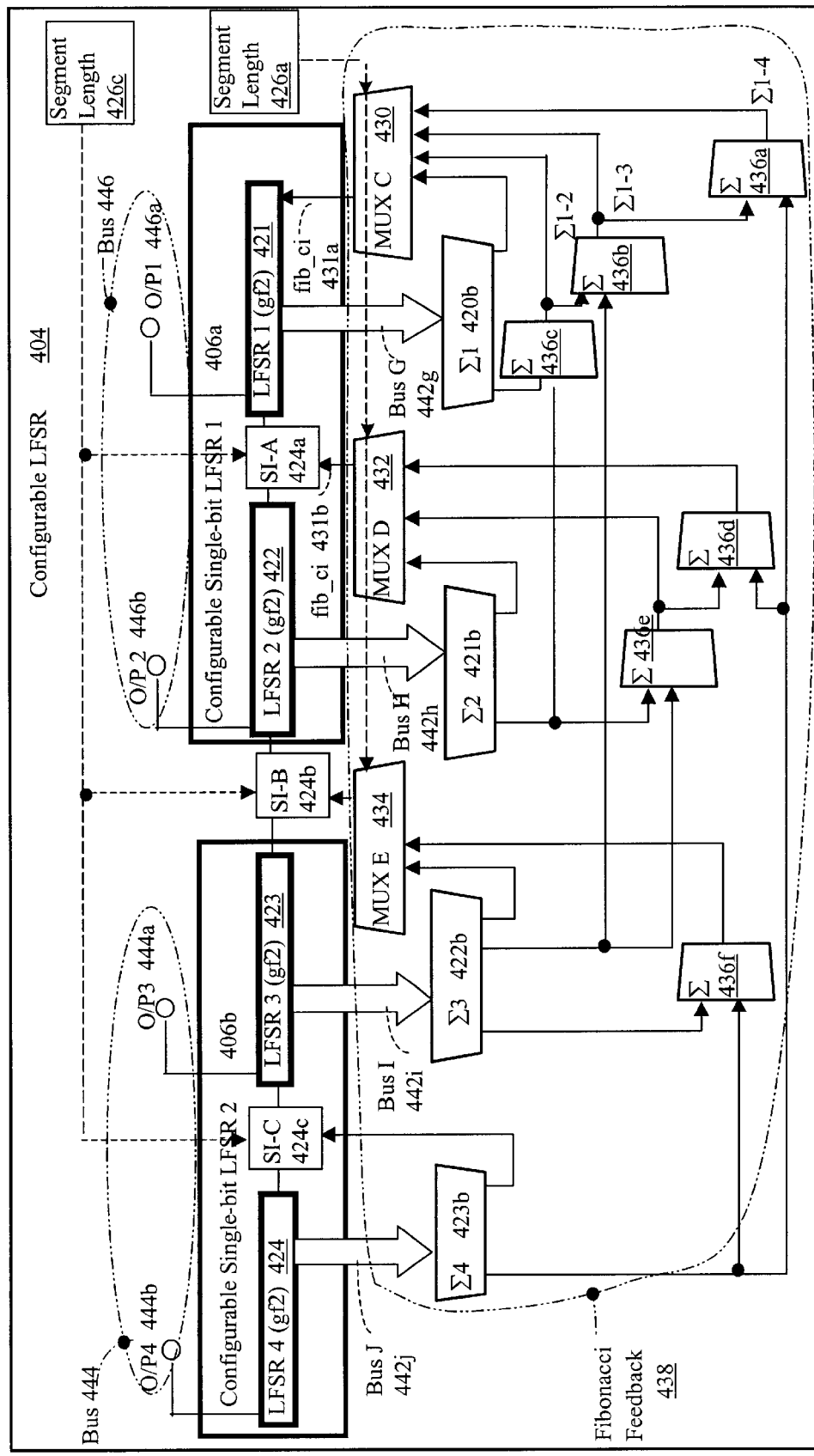
FIG. 4B is a block diagram of a Fibonacci feedback circuit portion of the configurable single-bit LFSR, in accordance with one embodiment of the present invention.

FIG. 4B is a block diagram of a Fibonacci feedback circuit portion of the configurable single-bit LFSR, in accordance with one embodiment of the present invention. FIG. 4B provides a portion of exemplary configurable LFSR code generator 404 with Fibonacci feedback for application in local LFSR code generator 143 of FIG. 4A. Alternative feedback configurations, e.g., Galois feedback, for configurable LFSR 404 are provided in subsequent FIGS. 4C and 4D. The components and inputs shown in the present figure provide an LFSR that can be configured into a variable quantity of independent LFSRs of varying lengths (or orders). In this manner, the present invention accommodates the class of code generating functions that span current and future exemplary digital spread spectrum applications.

Figure 5A:
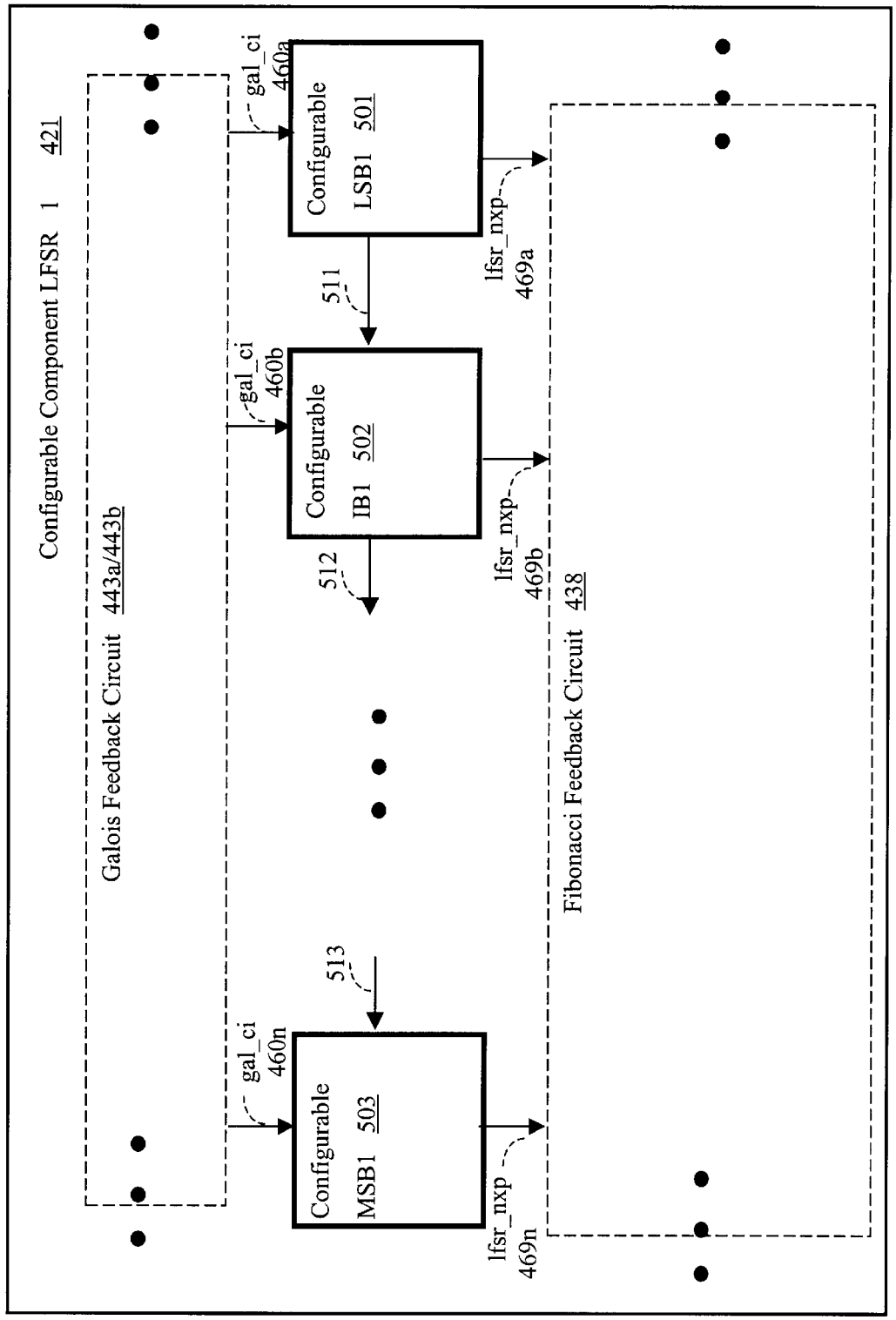
FIG. 5A is a block diagram of the arrangement of multiple bit slices in a configurable component LFSR, in accordance with one embodiment of the present invention.
Figure 5B:
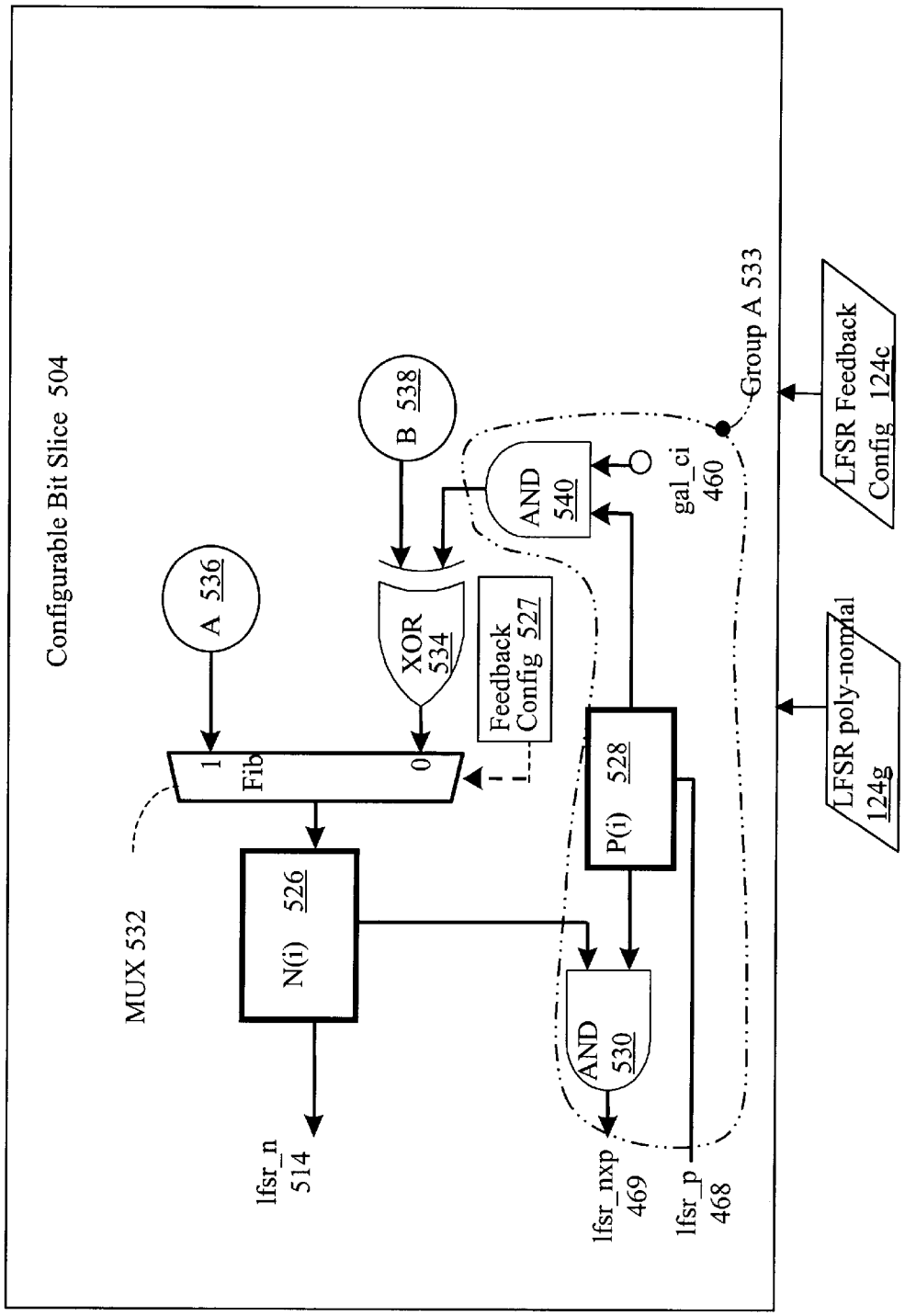
FIG. 5B is a block diagram of a configurable single-bit bit slice, in accordance with one embodiment of the present invention.
Figure 5C:
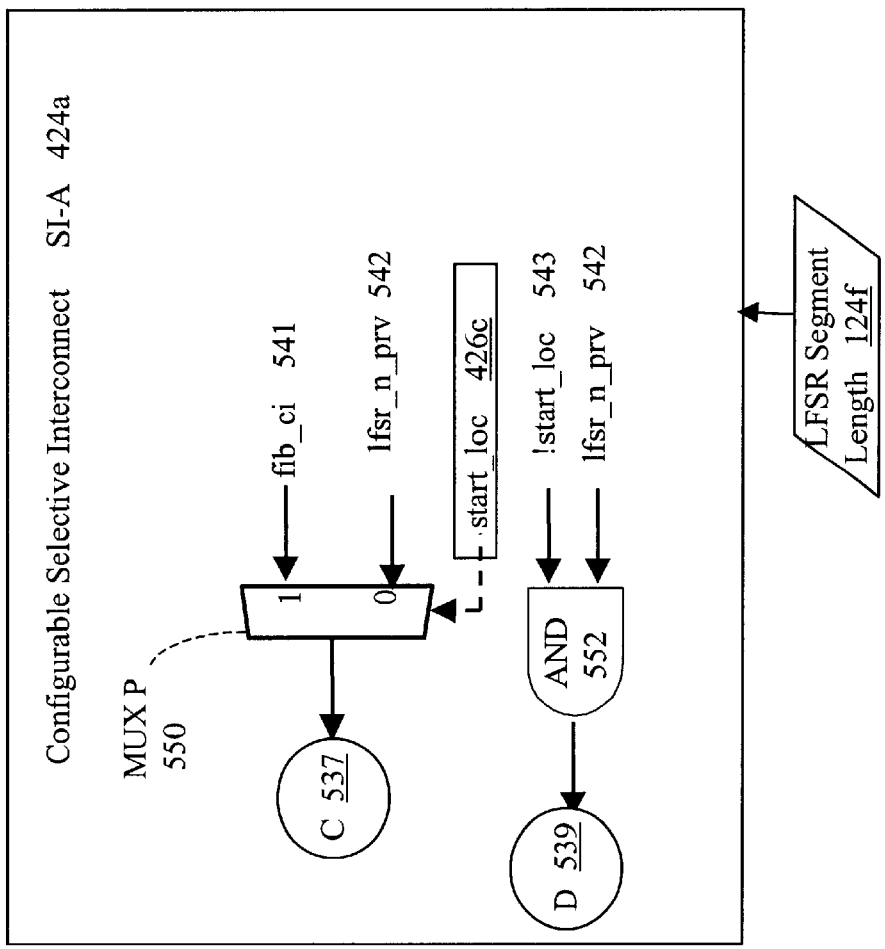
FIG. 5C is a block diagram of a selective interconnect for coupling two configurable single-bit LFSRs, in accordance with one embodiment of the present invention.
Figure 5D:
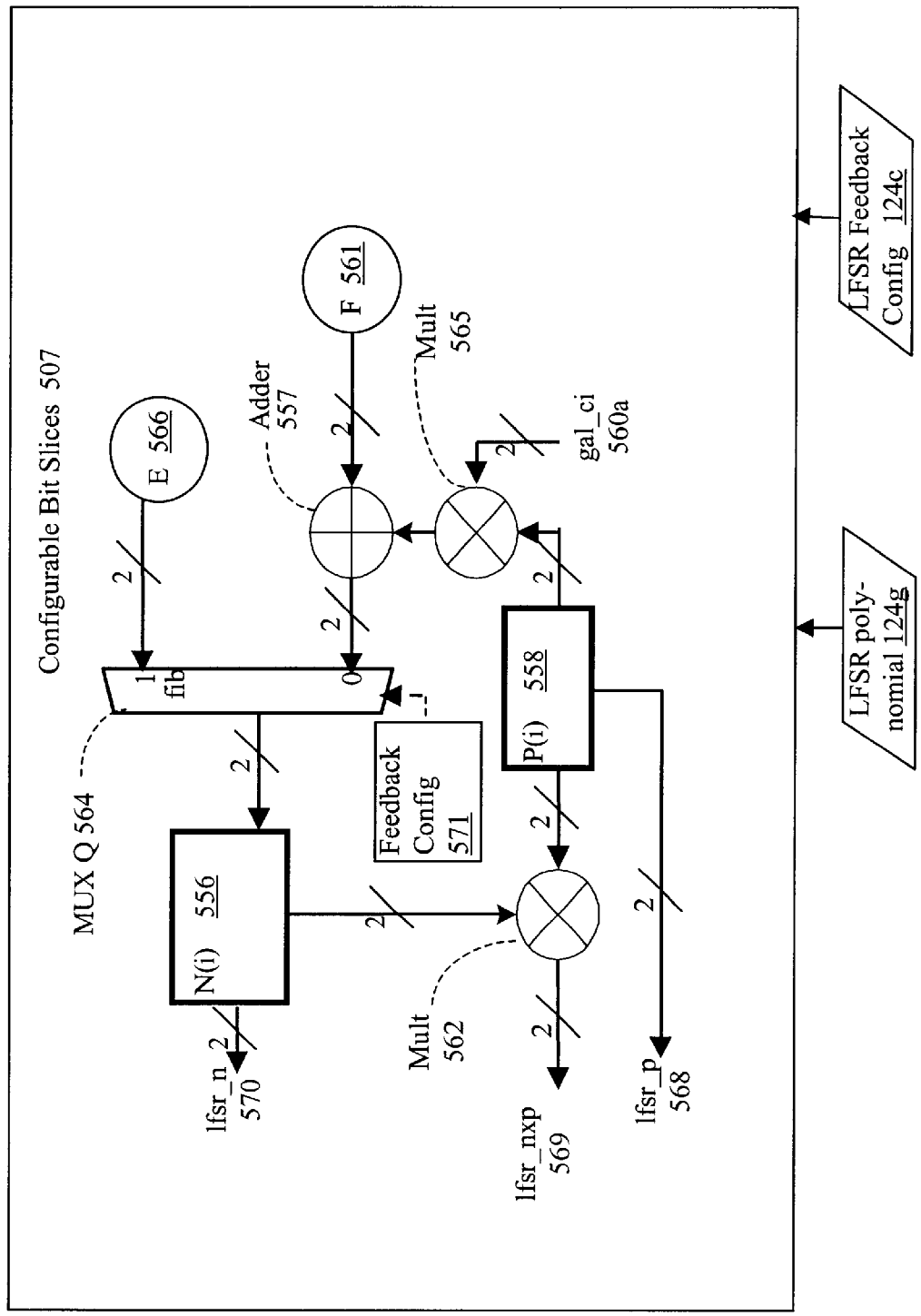
FIG. 5D is a block diagram of a configurable dual-bit bit slice, in accordance with one embodiment of the present invention.
Figure 5E:
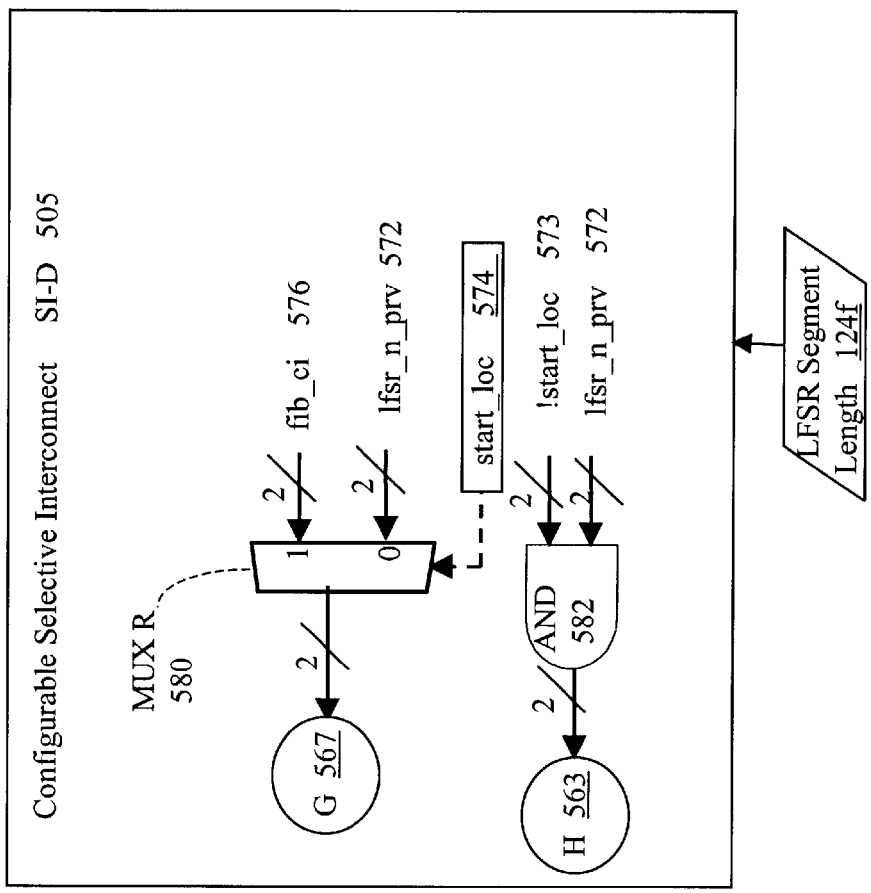
FIG. 5E is a block diagram of a selective interconnect for coupling two configurable dual-bit LFSRs, in accordance with one embodiment of the present invention.

Selective couplers 424a–424c, having an exemplary configuration as described in subsequent FIG. 5E, provide the flexibility to join smaller potentially independent LFSRs into larger ones. In the present layout, a least significant bit slice (LSB) of an LFSR, e.g., LFSR 3 423, is positioned at the right end of the LFSR, while a most significant bit slice (MSB) is positioned at the left end of the LFSR. Thus, selective interconnect, e.g., SI-B 424b, couples a MSB of LFSR 2 422 to a LSB of LFSR 3 423. By selectively coupling potentially independent (or modular or component) LFSRs 421–424, a desired length and quantity of LFSRs in configurable LFSR 404 is realizable. For example, if SI-A 424a couples LFSR 1 421 and LFSR 2 422, then an output from O/P 2 446b would provide the results of the composite LFSR while O/P 1 446a should be ignored. However, if SI-A 424a did not couple LFSR 1 421 and LFSR 2 422, then O/P 1 446a provides an output sequence from independent LFSR 1 421 while O/P 2 446b provides an output sequence from independent LFSR 2 422. Four potentially independent output (O/P) lines, e.g., 1 446a, 2 446b for bus 446, and O/P lines 3 444a, and 4 444b for bus 444, can provide output sequences from each of the potentially independent modular LFSRs 421–424. A similar scenario exists for SI-B 424b linking LFSR 2 422 and LFSR 3 423, and for SI-C 424c linking LFSR 3 423 and LFSR 4 424. Thus, the present embodiment is very flexible to provide either multiple short LFSRs or fewer long LFSRs, as required by the digital spread spectrum application.

In the present embodiment, LFSR 1 421 has an order of 8, LFSR 2 422 has an order of 8, LFSR 3 423 has an order of 9, LFSR 4 424 has an order of 25, structured to provide coverage for the class of code functions required by a wide range of digital spread spectrum applications. LFSR 1 421 through LFSR 4 424 can be configured with the Fibonacci feedback shown in FIG. 4B. A combination of feedback configurations can also be implemented using configurable LFSR 404. For example, FLSR 1 421 and LFSR 2 422 can be configured for the Fibonacci feedback shown in FIG. 4B, while LFSR 3 423 and LFSR 4 424 are configured with a different feedback configuration, e.g., Galois (shown in a subsequent Figure). In this scenario, feedback from LFSR 3 423 and LFSR 4 424 would not be communicated back to LFSR 1 421.

Configurable LFSR 404 of FIG. 4B includes Fibonacci feedback circuitry 438 coupled to modular configurable single-bit LFSR 1 406a and configurable single-bit LFSR 2 406b, which are in turn coupled to each other via selective interconnect B 424b.

Configurable single-bit LFSR 1 406a includes LFSR 1 421 and LFSR 2 422, coupled together via selective coupler (or interconnect) A 424a. Similarly, configurable single-bit LFSR 2 406b includes LFSR 3 423 and LFSR 4 424, coupled together via selective coupler C 424c. Configurable LFSRs 421–424 includes bit slice components, wherein the bit slices have memory registers and configurable circuitry appropriate for single-bit math in Galois/Fibonacci (gf2) applications, as described in subsequent FIGS. 4E and 4F.

Fibonacci feedback circuitry 438 provides one embodiment for selectively feeding back an appropriate state for all possible combinations of LFSR lengths. In general, Fibonacci feedback is defined as summing all the states in an LFSR and providing the result as a new state for the LSB of the LFSR. Because LFSR 404 is configurable for linking modular LFSRs 421–424, all possible Fibonacci feedback scenarios are accounted for in the present embodiment. This is done by selective couplers, e.g., MUX C 430 through MUX E 434, which receive all possible sums from LFSR combinations. In particular, adder 1 420b is coupled to and provides the sum of all bits in LFSR 1 421. Likewise, adder 2 421b is coupled to and provides the sum of all bits in LFSR 2 422. Similarly, adder 3 422b is coupled to and provides the sum of all bits in LFSR 3 423. Lastly, adder 4 423b is coupled to and provides the sum of all bits in LFSR 4 424. Combinations of the sums from multiple LFSRs are provided, for example, by adder 436f, which is coupled to and provides the composite sum of adder 3 422b and adder 4 423b, and by adders 436a through 436e, which are connected as shown. An output line from adder 4 423b is coupled to all downstream LFSRs, e.g., via MUX E 424 for LFSR 3 423, MUX D 423 for LFSR 2 422, and MUX C 430 for LFSR 1 421. Similarly, output lines from adders 1 420b, 2 421b and 3 422b are connected to all their downstream LFSRs.

Still referring to FIG. 4B, note that MUX C 430 in FIG. 4B has the most number of inputs, e.g., from adder 1 420b, from adder 436c, from adder 436b, and from adder 436a, because LFSR 1 can be combined with LFSR 2 422 in one embodiment, with LFSR 2 422 and LFSR 3 423 in another embodiment, and with LFSR 2 422, LFSR 3 423, and with LFSR 4 424 in yet another embodiment. In contrast, MUX E 434 has the least number of inputs, because feedback for LFSR 3 423 can only include more significant LFSRs, e.g., LFSR 4 424. Consequently, all the different feedback states from these different combinations of potentially independent LFSRs have been accounted for in the present invention. MUX D 423 and MUX E 424 have an output coupled to SI-A 424a and SI-B 424b, respectively, because the selective interconnect accounts for whether the input state to the least significant bit in an LFSR, e.g., LFSR 2 422, and LFSR 3 423, respectively, is provided from a feedback state, or simply from a most significant bit in an less significant LFSR. For example, if LFSR 1 421 LFSR 2 422, and LFSR 3 423 are coupled together to operate as a single LFSR, then MUX C 430 will provide output from adder 436b to a least significant bit in LFSR 1 421, via line fib-ci 431a. In this example SI-A 424a will not receive any feedback from MUX D 432 via line fib_ci 431b, per control line from segment length memory 426c. Neither will SI-B-424B receive feedback from MUX E 434. Rather, SI-A 424a will communicate a state from the most significant bit in LFSR 1 421 to the least significant bit in LFSR 2 422, and SI-B 424b will similarly communicate a state from the most significant bit in LFSR 2 422 to the least significant bit in LFSR 3 423. For purposes of clarity, the several exemplary configurations described herein are provided in lieu of all possible permutations of configurable LFSR 404. One skilled in the art will appreciate the broad range of configurabiltiy of configurable LFSR 404 along with the efficient use of hardware and coupling arrangements.

While configurable LFSR 404 of FIG. 4B utilizes specific types and quantities of components, specific coupling arrangements, and specific inputs, the present invention is well suited to a wide range of alternatives. For example, the quantity of potentially individual LFSRs, the number of bit slices within each LFSR, the quantity and layout of the selective couplers and adders is well suited to a wide range of values. The modular aspect of potentially individual LFSRs in configurable LFSR 404 can be increased or scaled back for another embodiment. Additionally, the quantity and coupling arrangement for adders and MUXs in FIG. 4B includes a tradeoff. By using less hardware, additional processing time is required for the circuit to operate. For example, adder 3 422b provides its output to adder 436e and 436b, which then perform another add operation. In another embodiment, separate adders can be provided for all unique combinations of sums. In this manner, only one add operation is required to provide all permutations of sums for any LFSR in configurable LFSR 404. Subsequent FIGS. 4C and 4D provide both embodiments for a Galois feedback configuration.

Because LFSR 404 is configurable, it receives LFSR segment length information 124f provided via communication device components described in FIG. 1A. Configuration information 124f includes the LFSR segment length, which intrinsically dictates how many independent LFSRs will exist. Segment length configuration is stored in memory, e.g., memory 426a, and subsequently communicated to MUX C 430 through MUX E 434 via a control line. Another input to configurable LFSR provides the logic necessary to select between feedback configurations. This input and circuitry is described in subsequent FIG. 5B. Feedback configuration input for Fibonacci feedback was provided via local LFSR code generator configuration input 124b, shown in FIG. 1B. Thus configurable LFSR code generator 404 provides a configurable feedback, a configurable LFSR length, and a configurable quantity of LFSRs. Consequently, configurable LFSR code generator 404 provides a Fibonacci feedback LFSR that accommodates a wide class of code generating functions used by current and future exemplary spread spectrum applications.

Figure 4C:
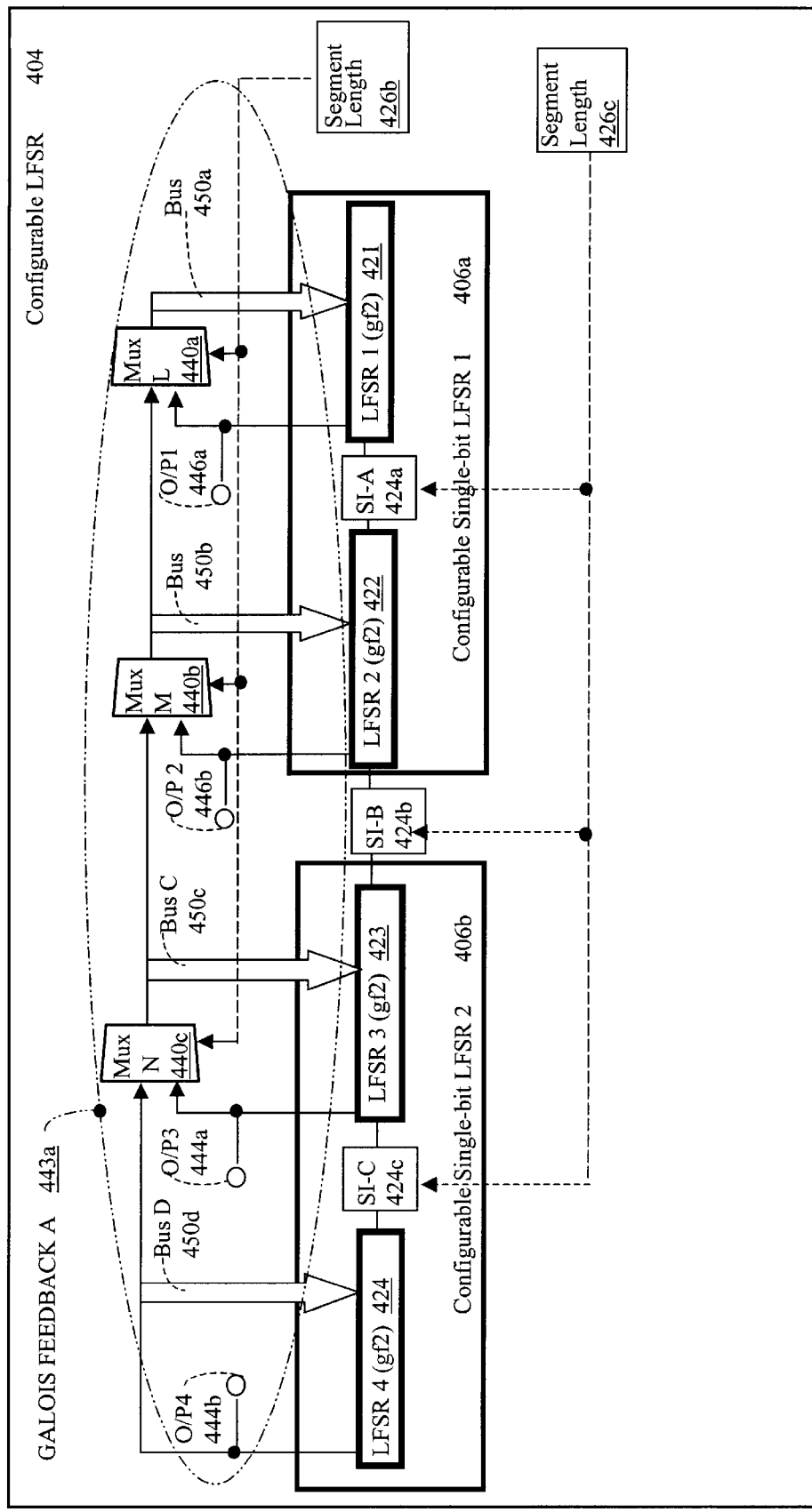
FIG. 4C is a block diagram of a Galois feedback circuit portion of the configurable single-bit LFSR, in accordance with one embodiment of the present invention.
Figure 4D:
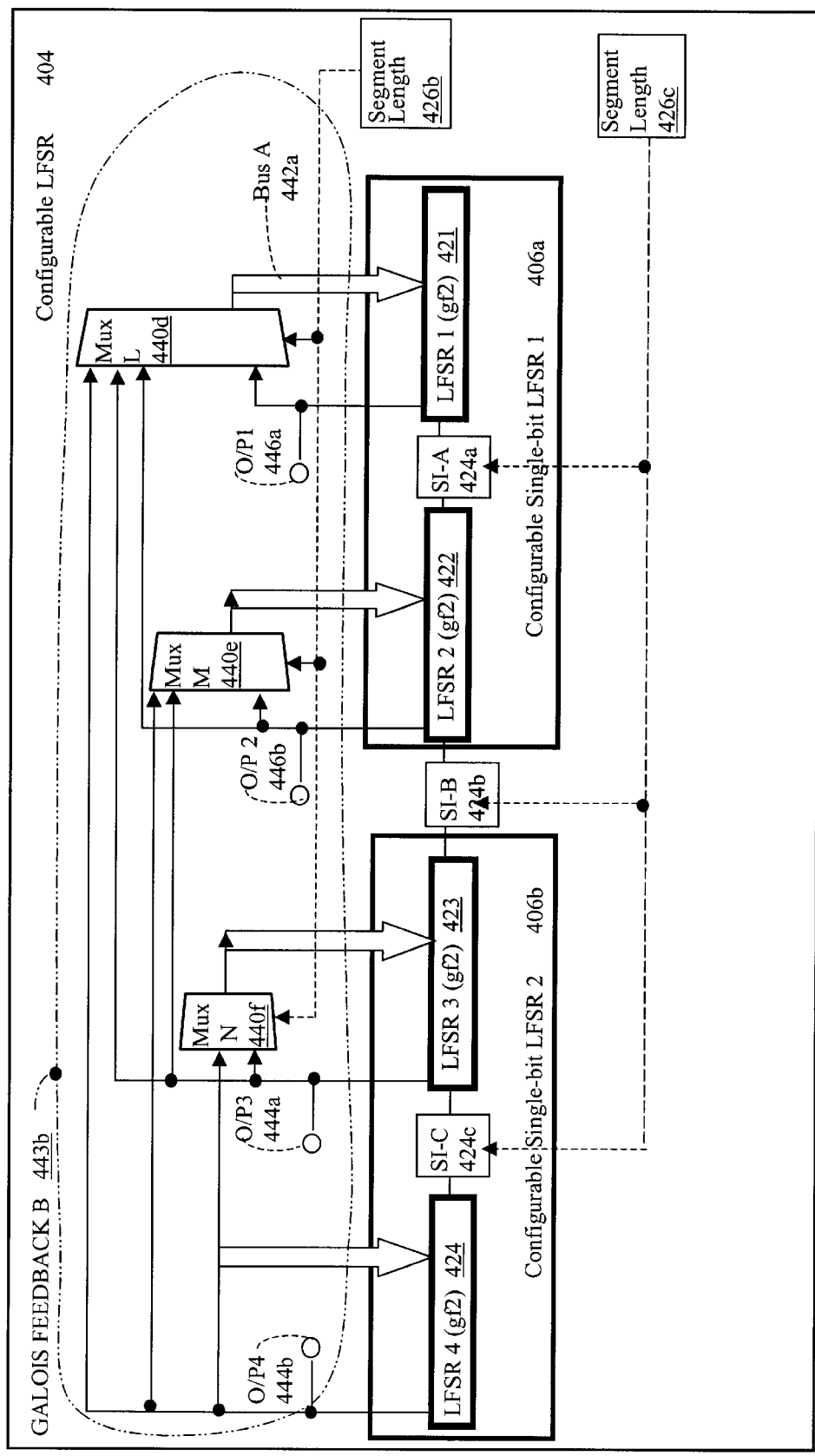
FIG. 4D is a block diagram of an alternative Galois feedback circuit portion of the configurable single-bit LFSR, in accordance with one embodiment of the present invention.

Referring now to FIG. 4C, a block diagram of a Galois feedback circuitry of the configurable single-bit LFSR is shown, in accordance with one embodiment of the present invention. FIG. 4C provides a portion of an exemplary configurable LFSR code generator 404 with Galois feedback configuration A 443a for application in local LFSR code generator 143 of FIG. 4A. An alternative configuration for Galois feedback, e.g., Galois configuration B 443b, is provided in subsequent FIG. 4D. And an alternative feedback configuration, e.g., Fibonacci feedback, for configurable LFSR 404, was provided in previous FIGS. 4B. The components and inputs shown in the present figure provide an LFSR that can be configured into a variable quantity of independent LFSRs of varying lengths (or orders). In this manner, the present invention accommodates the class of code generating functions that span current and future exemplary digital spread spectrum applications. FIG. 4C has many components and coupling arrangements that are similar to those presented in FIG. 4B. For purposes of clarity, only a description of components, coupling arrangements, and alternative embodiments for FIG. 4C that are different from FIG. 4B will be provided herein. Otherwise, the description of components, coupling arrangements and alternatives provided in FIG. 4B apply similarly to the present figure.

Configurable LFSR 404 of FIG. 4C includes Galois feedback circuitry 443a coupled to modular configurable single-bit LFSR 1 406a and configurable single-bit LFSR 2 406b, which are in turn coupled to each other via selective interconnect B 424b. Galois feedback circuitry 443a provides one embodiment for selectively feeding back an appropriate state for all possible combinations of LFSR lengths. In general, Galois feedback is defined as providing a most significant state in the LFSR to be selectively added to a bit state within the LFSR when it is advanced to a next higher degree. For example, a state of the most significant bit of LFSR 1 421, provided on output line 421a, can be fed through MUX L 440a and to bus A 450a if LFSR 1 421 is configured to operate as an independent LFSR. Bus A 450a then communicates the state of the most significant bit-to-bit slices within LFSR 1 421 for selective combination with states of bit slices, as determined by a desired feedback.

However, because LFSR 404 in FIG. 4C is configurable for linking modular LFSRs 421–424, all possible Galois feedback scenarios are accounted for in the present embodiment. This is done by selective couplers, e.g., MUX L 440a through MUX N 440c, which receive states from the most significant bits in all possible LFSR configurations. In general, each MUX has two input lines for the two possible upstream inputs, a control input, and an output. This configuration provides a chain of MUxs through which O/P 4 444b must travel in order to arrive at a lowest LFSR 1 421. For example, output 4 444b from LFSR 4 424 is fed back to itself, but is also made available through MUX N 440c for bit slices in LFSR 3 423 via Bus C 450c, through MUX M 440b for bit slices in LFSR 2 422 via bus 450b, and through MUX L 440a for bit slices in LFSR 1 421 via bus 450a. In another example, if LFSR 1 421 and LFSR 2 422 are joined to operate as a single LFSR, then output 2 446b will be provided via MUX M 440b to LFSR 2 422 and via MUX L 440a to LFSR 1 421. Similarly, if LFSR 3 423 and LFSR 4 424 are joined to operate as a single LFSR, then output 4 444b will be provided via bus D 450d to LFSR 4 424 and via MUX N 440c to LFSR 3 423. Galois Feedback configuration A 443a provides simpler MUX devices, e.g., 2-input MUXs, but it consumes additional time for a signal to travel through the LFSRs, e.g., from O/P 4 444b to bus 450a. An alternative configuration is provided in subsequent FIG. 4D.

All feedback states are accounted for by relaying the next higher states to lower order LFSRs. Consequently, all the different Galois feedback states from these different combinations of potentially independent LFSRs have been accounted for in the present invention. Selective interconnects, SI-A 424a, SI-B 424b, and SI-C 424c either communicate a state from a lower order LFSR to a higher order LFSR if they are joined, or they communicate no state between the LFSRs. For example, if LFSR 1 421 is joined with LFSR 2 422, then SI-A 424a provides a state from the highest order bit slice in LFSR 1 421 to the lowest order bit slice in LFSR 422. However, if LFSR 1 421 is not joined to LFSR 2 422, then SI-A 424a does not communicate any state between the two LFSRs. For purposes of clarity, the several exemplary configurations described herein are provided in lieu of all possible permutations of configurable LFSR 404 in FIG. 4C. One skilled in the art will appreciate the broad range of configurabiltiy of configurable LFSR 404 along with the efficient use of hardware and coupling arrangements.

Because LFSR 404 is configurable, it receives LFSR segment length information 124f provided via communication device components described in FIG. 1A. Configuration information 124f includes the LFSR segment length, which intrinsically dictates the quantity of independent LFSRs that will exist. Segment length configuration is stored in memory, e.g., memory 426b of FIG. 4C, and is subsequently communicated to MUX L 440a, MUX M 440b, and MUX N 440c via a control line. Another input to configurable LFSR provides the logic necessary to select between feedback configurations. This input and circuitry is described in subsequent FIG. 5B. Feedback configuration input for Galois feedback was provided via local LFSR code generator configuration input 124b, shown in FIG. 1B. Thus configurable LFSR code generator 404 provides a Galois feedback LFSR with a configurable LFSR length, and a configurable quantity of LFSRs. Consequently, configurable LFSR code generator 404 provides a device that accommodates a wide class of code generating functions used by current and future exemplary spread spectrum applications.

FIG. 4D is a block diagram of an alternative Galois feedback circuit portion of the configurable single-bit LFSR, in accordance with one embodiment of the present invention. FIG. 4D provides a portion of an exemplary configurable LFSR code generator 404 with Galois feedback configuration B 443b for application in local LFSR code generator 143 of FIG. 4A. An alternative configuration for Galois feedback, e.g., Galois configuration A 443a, was provided in previous FIG. 4C. And an alternative feedback configuration, e.g., Fibonacci feedback, for configurable LFSR 404, was provided in previous FIGS. 4B. FIG. 4D has many components and coupling arrangements that are similar to those presented in FIG. 4C. For purposes of clarity, only a description of components, coupling arrangements, and alternative embodiments for FIG. 4D that are different from FIG. 4C will be provided herein. Otherwise, the description of components, coupling arrangements and alternatives provided in FIG. 4C apply similarly to the present figure.

Configurable LFSR 404 of FIG. 4D includes Galois feedback circuitry 443b coupled to modular configurable single-bit LFSR 1 406a and configurable single-bit LFSR 2 406b. A significant difference between FIG. 4C and 4D is that FIG. 4D utilizes more complicated hardware, e.g., 4-input MUX L 440d and 3-input MUX M 440e. However, FIG. 4D reaps the tradeoff of providing all feedback configurations directly to each MUX without having to be processed by an intermediate MUX. Thus, O/P 444b is communicated to all downstream, or lower order, LFSRs via a single multiplexer, e.g., MUX n 440f, MUX M 440e, and MUX L 440d. Thus, in a single cycle, all feedback configuration possibilities are available to each LFSR.

Configurable Bit Slices and Interconnects

Referring now to FIG. 5A, block diagram of the arrangement of multiple bit slices in a configurable component LFSR is shown, in accordance with one embodiment of the present invention. FIG. 5A provides an exemplary configurable component LFSR code generator 421, with configurable bit slices, for application as any of the configurable component LFSRs, e.g., LFSR1 421, LFSR 2 422, LFSR 3 423, LFSR 4 424, or LFSR 410 in configurable LFSR 404 shown in FIGS. 4A and 4B. The configuration of each bit slice 501–503 in FIG. 5A depends upon which LFSR will be utilized. Thus, a bit slice configuration of 501a–503a shown in FIG. 5B is utilized for single bit LFSRs 421–424 of FIGS. 4B–4D, while bit slice configuration 501b–503b shown in FIG. 5D is utilized for dual-bit LFSR 410 of FIG. 4A. Both embodiments of bit slices, e.g., 501a and 501b, provide the configurable components necessary to implement a configurable length LFSR with configurable combining (e.g., between multiple independent LFSRs) and configurable feedback. In this manner, the present invention accommodates the class of code generating functions that span current and future exemplary digital spread spectrum applications.

Configurable component LFSR 1 421 includes multiple bit slices that range from a least significant bit (LSB) (or lowest order), e.g., LSB1 501, to intermediate bits (IB), e.g., IB 1 502, to a most significant bit (MSB), e.g., MSB 1 503. In the present embodiment, LFSR 1 421 is an eighth order LFSR; hence MSB1 503 represents the $8^{th}$ bit slice. Missing bit slices are omitted for clarity. Each bit slice is coupled to the next most significant bit slice. Hence, LSB1 501 is coupled to IB1 502 via line 511, which in turn is coupled to other intermediate bit slices (not shown) by line 512. A seventh bit slice (not shown) will consequently be coupled to MSB1 503 via line 513.

A portion of Galois feedback circuit 443a appropriate for the LFSR 1 421 is coupled to input lines into each bit slide. In particular, gal_ci lines 460a–460n, which represent bus A 450a of FIG. 4C and 4D, provide a Galois carry in feedback value to each bit slice, e.g., LSB 1 501 through MSB1 503.

In a complementary manner, a portion of Fibonacci feedback circuit 438 appropriate for the LFSR 1 421 is coupled to output lines from each bit slice. Thus, lfsr_nxp lines 469a–469n, which represent bus G 442g of FIG. 4B, provide an input to the feedback value, e.g., to adder 420b whose result is passed through MUX C 430 back to LFSR 1 421, as shown in FIG. 4B. While a specific quantity and feedback interface for bit slices is described in FIG. 5A, the present invention is well suited to alternative embodiments. For example, any quantity of bit slices can be utilized.

Referring now to FIG. 5B, a block diagram of a configurable single-bit bit slice is shown, in accordance with one embodiment of the present invention.

FIG. 5B provides an exemplary configurable single-bit bit slice for application in any of the LFSR code generators, e.g., LFSR 1 421–LFSR 4 424 of configurable LFSR 404 in FIGS. 4B–4D. The components and inputs shown in the present figure provide a bit slice 504 that can be implemented as bit slice 501–503 in FIG. 5A, that enables an LFSR to have a configurable feedback and a configurable length. In this manner, the present invention accommodates the class of code generating functions that span current and future exemplary digital spread spectrum applications.

Bit slice 504 includes a state memory register N(i) 526, which holds the state of the bit slice for both the Fibonacci feedback and the Galois feedback configuration. Group A 533 is a group of components that selectively enables feedback for both a Galois and a Fibonacci implementation of bit slice 481a. Bit slice 504 includes a polynomial memory register P(i) 528 coupled to an AND gate 530, and an AND gate 540 to selectively couple the bit slice, e.g., 501a, for both a Fibonacci feedback loop and a Galois feedback loop, respectively. In particular, output line lfsre_nxp 469 coupled to AND gate 530 is lfsr_nxp 469a shown in FIG. 5A for the case of LSB 1 501. Similarly, input gal_ci 460 coupled to AND gate 540 is gal_ci 460a for the case of LSBI 501 in FIG. 5A. AND gate 540 is coupled, along with interface B 538, to add-logic device 534, which is implemented as an XOR gate in the present embodiment for modulo 2 addition. In turn XOR gate 534 output is coupled to MUX 532, and provided as state of memory to state register N(i) 526 in the case of a Galois feedback configuration of bit slice 504. Thus, polynomial register P(i) 528 enables both feedback configurations. The "i" value refers to the ith position of the bit slice in an LFSR.

Because bit slices 504 can span a wide range of configurabiltiy that accounts for numerous permutations, the bit slice will be described according to the different permutations. Feedback configuration memory register 527 is coupled to MUX 532 to provide a control input which selectively couples an input from interface A 536 or an input from interface B 538 for a Fibonacci feedback embodiment or a Galois feedback embodiment, respectively.

In particular, interface A 536 is coupled to other components in configurable LFSR 404 of FIG. 4B according to several scenarios of the bit slice location in an LFSR for a Fibonacci feedback implementation. In a first case for the Fibonacci implementation (case F1), configurable bit slice 504 is an LSB in a higher significance, or order, LFSR (e.g., it is not the least significant LFSR) within a group of LFSRs. Thus, for case F1, interface A 536 would be coupled to a selective interface, e.g., SI-A 424a, or SI-B 424b, or SI-C 424c for an LFSR, e.g., LFSR 2 422, or LFSR 3 423, or LFSR 4 424, respectively, as shown in FIG. 4B. In a second case for the Fibonacci implementation (case F2), configurable bit slice 504 is an LSB in a lowest significance LFSR of the group of multiple LFSRs. Thus, for case F2, interface A 536 would be coupled to a output fib_ci 431a of MUX C 430, as shown in FIG. 4B. In a third case for the Fibonacci implementation (case F3), configurable bit slice 504 is an IB or MSB, as discussed in FIG. 5A, in any LFSR within a group of LFSRs. Thus, for case F3, interface A 536 would be coupled to an output of a previous bit slice. Thus interface A 536 provides a throughput line directly into memory state register N(i) 526 in this case. For example, case F3 for IB 1 502 of FIG. 5A would receive on input A 536, the value of LSB 435a on line 511. Explained in terms of bit slice in FIG.

5B, output 514 from a less significant bit slice would be received as input on A 536 on a more significant bit slice.

In contrast, interface B 538 is coupled to other components in configurable LFSR 404 of FIG. 4C and 4D according to several scenarios of the bit slice location in an LFSR for a Galois feedback implementation. In a first case for the Galois implementation (case G1), configurable bit slice 504 is a LSB for a higher order, or significance, LFSR (e.g., it is not the least significant LFSR) within a group of LFSRs. Thus, for case G1, interface B 536 would be coupled to a selective interface, e.g., SI-A 424a, or SI-B 424b, or SI-C 424c for an LFSR, e.g., LFSR 2 422, or LFSR 3 423, or LFSR 4 424, respectively, as shown in FIG. 4C and 4D. In a second case for the Galois implementation (case G2), configurable bit slice 504 is an LSB in a lowest significance, or order, LFSR of the group of multiple LFSRs. Thus, for case G2, interface B 538 can be eliminated, along with XOR 534, leaving output of AND gate 540 directly coupled into MUX 532. In a third case for the Galois implementation (case G3), configurable bit slice 504 is an IB or MSB, as discussed in FIG. 5A, in any LFSR within a group of LFSRs. Thus, for case G3, interface B 538 would be coupled to an output of a previous bit slice. For example, case G3 for IB 1 502 of FIG. 5A would receive on input A 536, the value of LSB 435a on line 511. Explained in terms of bit slice in FIG. 5B, output 514 from a less significant bit slice would be received as input on B 538 on a more significant bit slice.

Because every bit slice is a configurable component LFSR, e.g., LFSR 435 of FIG. 5A, a variable length Galois implementation can be made. In this case, the state registers are loaded toward the most significant end of the configurable components LFSR. The shortened length Galois feedback is implemented by providing a polynomial bit value in P(i) 528 that disables the LSB, e.g., LSB 501 of FIG. 5A, and any intermediate bit slices required to reach the desired length of an LFSR for Galois feedback. In contrast, if an LFSR does not provide the least significant bit with a polynomial register, then it cannot disable the feedback to the LSB, and thus effectively shorten the LFSR.

As a result of bit slice 504 being configurable, it receives an input of LFSR polynomial configuration 124g, e.g., a polynomial word, which provides a bit value for polynomial memory register P(i) 528. Configurable bit slice also receives an LFSR feedback configuration input 124c, which is stored in memory register 527 for subsequent controlling of MUX 532. Thus configurable bit slice 504 provides a bit slice with a configurable feedback and with a feedback implementation. Consequently, configurable bit 504 provides a device that accommodates a wide class of code generating functions used by current and future exemplary spread spectrum applications.

Referring now to FIG. 5C, a block diagram of a selective interconnect for coupling two configurable single-bit LFSRs is shown, in accordance with one embodiment of the present invention. FIG. 5C provides an exemplary configurable selective-interconnect for application in any of the selective interconnects, e.g., SI-A 424a, SI-B 424b, and SI-C 424c of configurable LFSR 404 in FIG. 4B–4D. The components and inputs shown in the present figure provide a selective interconnect 424a that can selectively couple two configurable component LFSRs, e.g., LFSR 1 421 and LFSR 2 422 of FIG. 4D. In this manner, the present invention accommodates the class of code generating functions that use different length and quantities of LFSRs for current and future exemplary digital spread spectrum applications.

Selective interconnect SI-A 424a includes a MUX P 550 having an input of fib_ci 541, which is coupled to receive an output, e.g., from line 431b, of a selective interconnect, e.g., MUX D 432 of FIG. 4B, for accommodating feedback permutations for different groupings of LFSRs. Selective interconnect SI-A 424a also includes a lfsr_n_prv 542 input, which is the output value from a state register of a less significant bit slice. For example, if configurable bit slice 504 of FIG. 5B was the MSB of LFSR 1 421 in FIG. 4B, then lfsr_n_prv 542 would be coupled to output line 514 of configurable bit slice 504. A memory block for start_loc 426c receives an input configuration of LFSR segment length 124f which enables a control input to MUX P 550 to selectively couple fib_ci 541 or lfsr_n_prv 542 to interface C 537. For example, if LFSR segment length input 124f of FIG. 5C indicates that a selective interconnect should couple the two LFSRs, then start_loc 426c would provide a low logic, e.g., "0," value that would enable MUX P 550 to pass lfsr_n_prv 542 value to interface C 537. Interface C 537 is coupled to an LSB input, e.g., interface A 536 of FIG. 5B where bit slice 504 would be the LSB in a higher order LFSR, e.g., LFSR 2 422 of FIG. 4C or 4D. This scenario accounts for case F1 described in FIG. 5B.

Selective interconnect SI-A 424a also includes an AND gate 552 for accommodating a Galois feedback configuration of LFSRs. AND gate 552 includes an input of !start_loc 543 coupled to receive a signal indicating whether the selective interconnect is coupling the two LFSRs it spans. If selective interconnect SI-A 424a is dictated to couple two LFSRs, then AND gate 552 is enabled to pass through signal lfsr_n_prv, as discussed hereinabove. Interface D 539 is coupled to an LSB input, e.g., interface A 536 of FIG. 5B, where bit slice 504 would be the LSB in a higher order LFSR, e.g., LFSR 2 422 of FIG. 4B. This scenario accounts for case GI described in FIG. 5B.

While the present embodiment of FIG. 5C utilizes subcomponent devices which are configurable within a higher assembly, itself being configurable, the present invention is well suited to substituting non-configurable sub components for some components that are configurable. For example, in one embodiment, selective interconnect 424a can include only MUX P 550 or AND gate 552 for selectively coupling two LFSRs that are not configurable for either a Fibonacci feedback or a Galois feedback configuration, respectively. This approach can also be applied to other embodiments in FIGS. 2A through 7C as applicable for a given application.

Referring now to FIG. 5D, a block diagram of a configurable dual-bit bit slice is shown, in accordance with one embodiment of the present invention. FIG. 5D provides an exemplary configurable dual-bit bit slice for application in any of the LFSR code generators, e.g., LFSR 410 of configurable LFSR 404 in FIG. 4A. The components and inputs shown in the present figure provide a bit slice 507 that can be implemented as bit slice 501–503 in FIG. 5A (as applied to LFSR 410), that enables an LFSR to have a configurable feedback and a configurable length. In this manner, the present invention accommodates the class of code generating functions that span current and future exemplary digital spread spectrum applications.

FIG. 5D has many components and coupling arrangements that are similar to those presented in FIG. 5C. For purposes of clarity, only a description of components, coupling arrangements, and alternative embodiments for FIG. 5D that are different from FIG. 5C will be provided herein. Otherwise, the description of components, coupling arrangements and alternatives provided in FIG. 5C apply similarly to the present figure.

Because bit slice 505 is for dual-bit math, input and output lines are 2 bits wide. Control inputs, such as start_loc configuration 574, provided by LFSR segment length 124f, can still be a single bit line. Similarly, it is understood that devices, e.g., MUX R 580 and AND gate 582, have two-bit capability. Inputs lfsr_n_prv 572, !start_loc 573, and fib_ci 576 have similar coupling arrangements as their counterparts in a configurable single-bit selective interconnect, e.g., FIG. 5C. In another embodiment, dual-bit LFSR, e.g., LFSR 410 of FIG. 4A, does not have configurable component LFSRs which can be joined to make a larger composite LFSR, and thus, would not require a selective interconnect SI-D 505.

Referring now to FIG. 5E, a block diagram of a selective interconnect coupling two configurable dual-bit component LFSRs is shown, in accordance with one embodiment of the present invention. FIG. 5E provides an exemplary configurable selective-interconnect for multiple configurable component dual-bit LFSRs of LFSR 410 in FIG. 4A. In this manner, the present invention accommodates a class of code generating functions that use different length and quantities of dual-bit LFSRs for current and future exemplary digital spread spectrum applications.

FIG. 5E has many components and coupling arrangements that are similar to those presented in FIG. 5C. For purposes of clarity, only a description of components, coupling arrangements, and alternative embodiments for FIG. 5D that are different from FIG. 5C will be provided herein. Otherwise, the description of components, coupling arrangements and alternatives provided in FIG. 5C apply similarly to the present figure.

Because bit slice 505 is for dual-bit math, input and output lines are 2 bits wide. Control inputs, such as start_loc configuration 574, provided by LFSR segment length 124f, can still be a single bit line. Similarly, it is understood that devices, e.g., MUX R 580 and AND gate 582, have two-bit capability. Inputs lfsr_n_prv 572, !start_loc 573, and fib_ci 576 have similar coupling arrangements as their counterparts in a configurable single-bit selective interconnect, e.g., FIG. 5C. In another embodiment, dual-bit LFSR, e.g., LFSR 410 of FIG. 4A, does not have configurable component LFSRs which can be joined to make a larger composite FLSR, and thus, would not require a selective interconnect SI-D 505.

Configurable Compare and Jump Circuit

Figure 6:
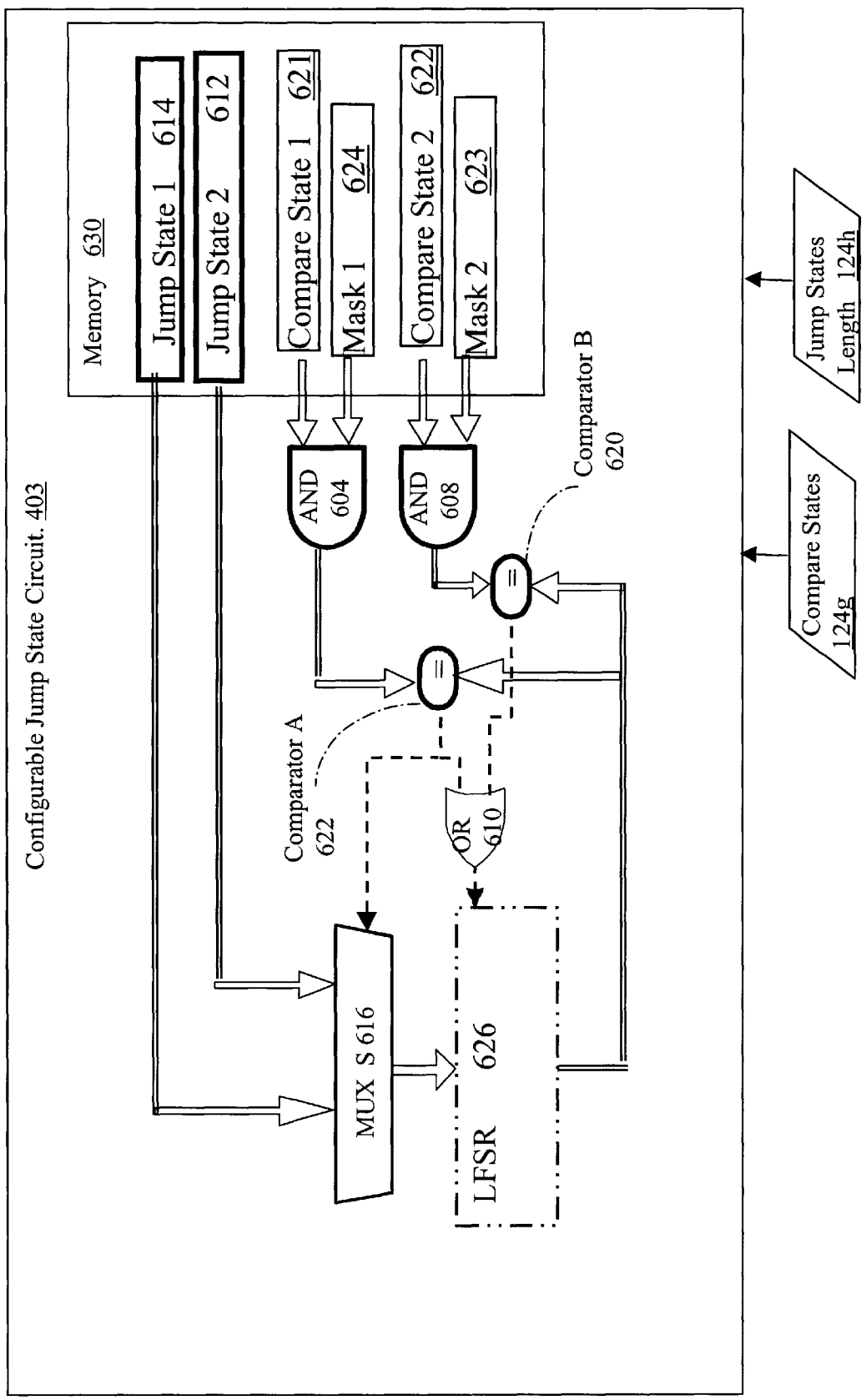
FIG. 6 is a block diagram of a configurable compare and jump circuit for an LFSR, in accordance with one embodiment of the present invention.

Referring now to FIG. 6, a block diagram of a configurable compare and jump circuit for an LFSR is shown, in accordance with one embodiment of the present invention. FIG. 6 provides an exemplary configurable compare and jump circuit for application in configurable LFSR code generators, e.g., configurable LFSR 404 in FIG. 4A or in global code generator 107 of FIG. 3B. The configurable components and inputs shown in the present figure enable the compare and jump circuit to satisfy compare and jump functions that span current and future exemplary digital spread spectrum applications.

LFSR 626 is shown to provide a context on which the balance of the jump state circuit 403 can be implemented. Thus, LFSR 626 can be any LFSR, e.g., FLSR 1 421, LFSR 2 422, LFSR 3 423, or LFSR 4 424, that is used in configurable LFSR 404 of FIGS. 4B–4D. The present embodiment for jump state circuit 403 is for a single-bit LFSR, but could be adapted for a dual-bit LFSR, e.g., LFSR 410 of FIG. 4A, providing dual-bit circuitry is implemented in FIG. 6.

Jump state circuit 403 includes memory block 630 in which resides jump state 1 word 614 and jump state 2 word 612, which are both coupled as inputs to MUX S 616. Memory block 630 also stores compare state 1 621 and mask word 1 624, which are both coupled as inputs to AND gate 604, and compare state 2 622 and mask 2 623, which are both coupled as inputs to AND gate 608. AND gate 604 and AND gate 608 are coupled to comparator A 622 and comparator B 620, respectively. Comparators A 622 and B 620 are both coupled to LFSR 626 to receive its register states in a parallel fashion. Thus, comparator A 622 and B 620 perform a bit-to-bit comparison of the states in LFSR 626 with the values of mask word 1 624 and mask word 2 623, respectively. Comparator A 622 has an output that is coupled to OR gate 610 and to MUX S 616 for enabling a jump state 1 614 to be passed through MUX S 616 and into LFSR 626, if the comparator concludes that the LFSR state matches the compare state 1. OR gate 610 has an output that enables LFSR 626 to accept the jump state from MUX S 616 if the OR gate is enabled by either comparator A 622 or comparator B 620.

Jump state circuit 403 provides two parallel comparison operations for two potentially different compare values in the present embodiment. In another embodiment, only one compare and jump state is implemented. Jump state circuit 403 is configurable to receive compare states input 124g and jump states length 124h, both of which can be stored in memory 630.

Interface

Figure 7A:
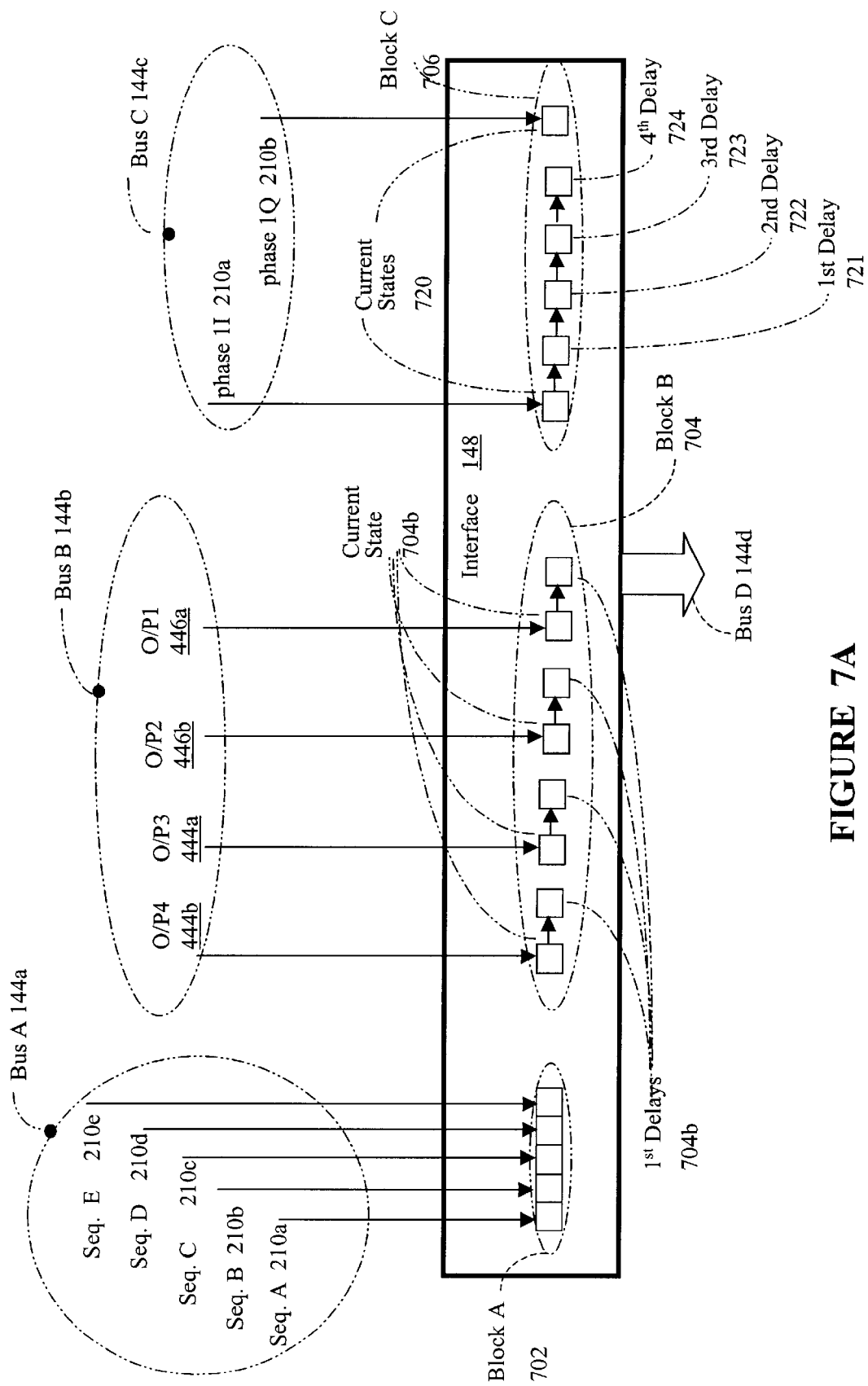
FIG. 7A is a block diagram of an interface for coupling a code generator to an output conditioning circuit, in accordance with one embodiment of the present invention.

Referring now to FIG. 7A, a block diagram of an interface for coupling a code generator to an output conditioning circuit is shown, in accordance with one embodiment of the present invention. FIG. 7A provides an exemplary interface for linking a configurable composite code generator 140 and a configurable composite output conditioning unit 150, as shown in FIG. 1B. Interface 148 essentially provides a superset of all code sequences required for the broad class of current and future exemplary digital spread spectrum applications. In this manner, the present embodiment satisfies the code needs for all the applications accounted for, though some of the code sequences will not be used for the single application using interface 148.

Interface 148 is coupled to receive code sequence information in parallel from input bus A 144a, bus B 144b, and bus C 144c. Input lines 210a through 210e, representing bus A 144l of FIG. 1B are coupled to block A 702. Similarly, input lines O/P 4 444b, O/P 3 444a, O/P 2 446b and O/P 1 446a, which represent bus B 144b in FIG. 1B are coupled to memory registers in block B 704. Lastly, output lines phase 1I 210a and phase 1Q 210b, which represent bus C 144c from configurable global code interface 145 in FIG. 1B are coupled to memory block C 706. Interface 148 includes multiple memory registers that can store current states of a code sequence, such as block A 702, current states 704b of block B 704, and current states 720 of block C 706. Interface 148 also includes multiple memory registers that store delay values of select code sequences. For example $1^{st}$ delays 704bb in block B 704 store a single delay value of the code sequence provided by bus B 144b, while first delay 721, second delay 722, third delay 723, and fourth delay 724 in block C 706 store sequentially delayed values of input phase 1I 210a. A bus D 144d is coupled to communicate values of all registers shown, in parallel, to composite output conditioning circuit 150, in the present embodiment.

While interface 148 provides a specific embodiment of codes stored (or temporarily buffered), the present invention is well suited to a wide range of alternatives. For example, an alternative embodiment can store more or less code sequences, and can store more or less delayed versions of those code sequences.

Output Conditioning Circuit

Figure 7B:
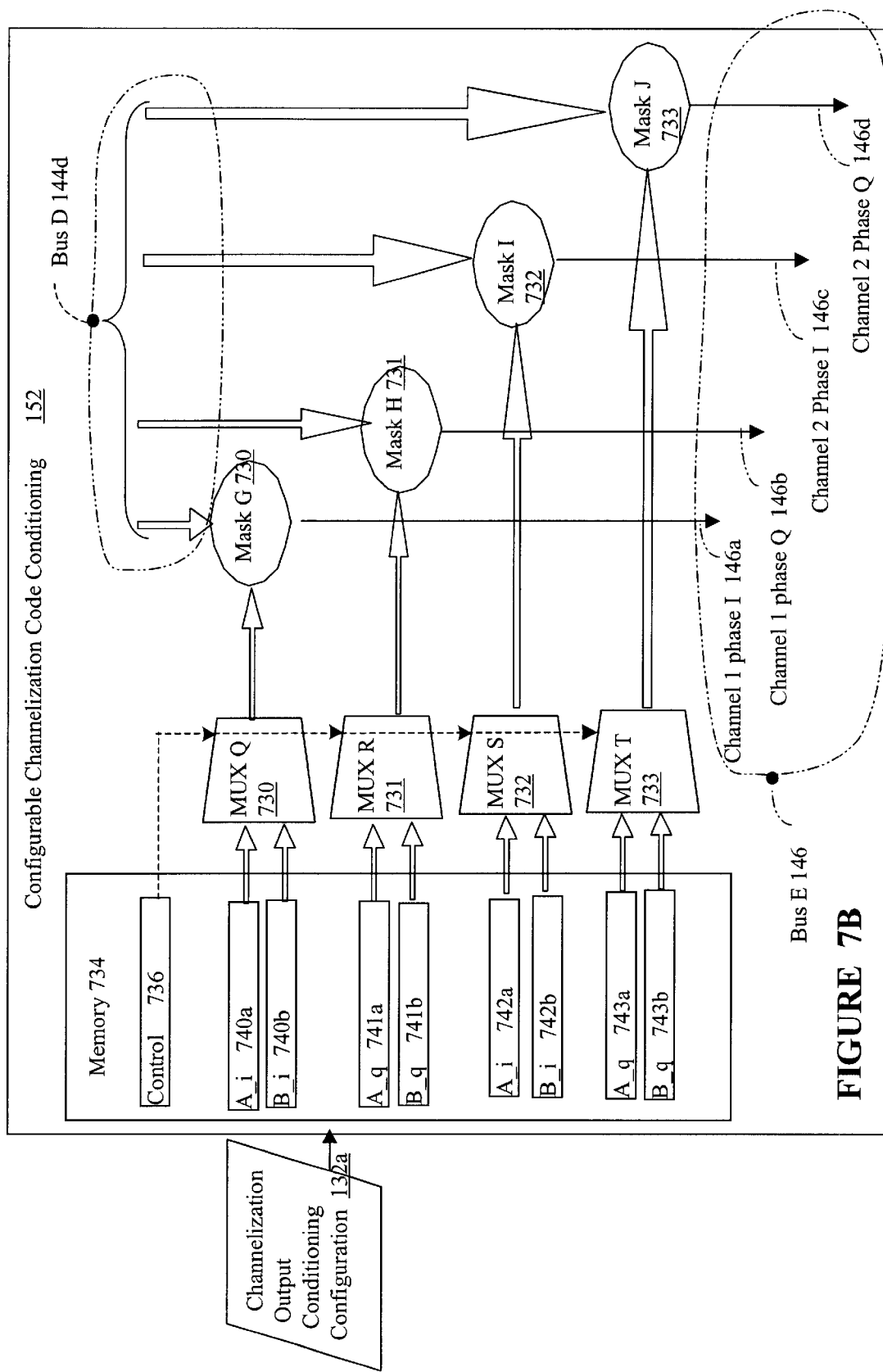
FIG. 7B is a block diagram of a configurable output conditioning circuit for channel codes, in accordance with one embodiment of the present invention.

Referring now to FIG. 7B, a block diagram of a configurable output conditioning circuit for channel codes is shown, in accordance with one embodiment of the present invention. FIG. 7B provides an exemplary output conditioning circuit for application in configurable composite output conditioning unit 150 and in configurable code generator system 114 of FIG. 1B. The components and inputs shown in the present figure accommodate a wide class of output conditioning functions for channelization code sequences that span current and future exemplary digital spread spectrum applications.

Configurable channelization code conditioning circuit 152 includes multiple mask (or slave) circuits 730b–733b, which are similar to exemplary mask circuit of FIG. 2B, and are coupled in parallel to input bus D 144d from interface (or master circuit) 148 of FIG. 7A. Thus, states of registers in interface 148 are provided simultaneously and in parallel to each mask circuit 730a–733a. Outputs from mask circuits 730a–733a form bus E 146, which is also shown in FIG. 1B. Mask circuits 730a–733a are each coupled in parallel to one of multiple selective interconnects, e.g., MUX Q 730b through MUX T 733b. In turn, each MUX is coupled to multiple mask words in memory.

Mask words are arranged in the present embodiment to accommodate real and imaginary categories, e.g., phase I and phase Q, for multiple channels, e.g., channel 1 and 2, for multiple applications (or users) A and B. Thus, for example, mask word A_i 740a is a mask word provided to mask circuit G 730a to generate a code sequence for user A, in-phase, channel 1 on output line 146a. Similarly, mask word A_i 742a is provided to mask circuit I 732a to generate a code sequence for user A, in phase, channel 2 on output line 146c. Control data in memory 736 enables each appropriate MUX to transmit a mask word for the appropriate user, e.g., A or B, to its respective mask circuit. Thus, if MUX Q 730-MUX T 733 receive a control input for user A, then mask words 740a, 741a, 742a, and 743a are transmitted from memory 734 to mask circuits 730a–733a, respectively. Similarly, if MUX Q 730-MUX T 733 receive a control input for user B, then mask words, 740b, 741b, 742b, and 743b are transmitted from memory 734 to mask circuits 730a–733a, respectively. In this manner, the computation resource provided by configurable channelization code conditioning circuit are time-shared across multiple computation processes, e.g., several multipaths and/or multiple channels, as discussed in FIG. 1A.

Mask words contain control information that selectively chooses the appropriate types of code sequences and delayed versions of code sequences, from interface 148 of FIG. 7A and combines them via the mask, whose function is discussed in FIG. 2B, to provide an output. The specific mask word for each user, channel, and/or phase condition can be specified by a user based on the communication protocol desired to be operated on communication device 100a of FIG. 1A.

Because configurable channelization code conditioning circuit 152 is configurable, it receives channelization output conditioning configuration information 132a provided via communication device components described in FIG. 1A. Configuration information 132a can include mask words for 740a–743a and 740b–743b, as well as information on control 736 for controlling MUX 703–733. Thus configurable channelization code conditioning circuit 152 provides a configurable code output for different channels and users. Consequently, configurable channelization code conditioning circuit 152 provides a device that accommodates a wide class of code generating functions used by current and future exemplary spread spectrum applications.

Figure 7C:
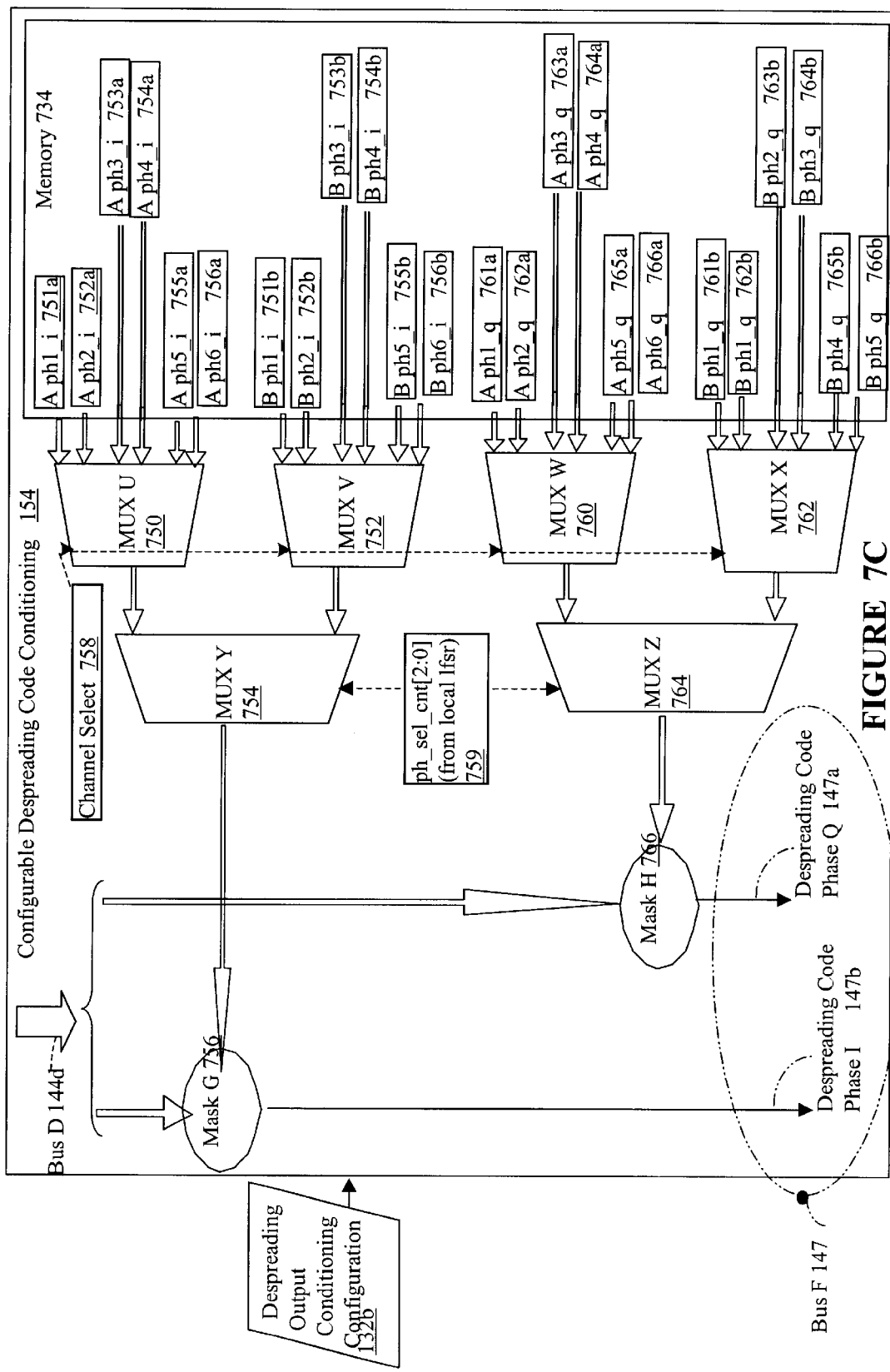
FIG. 7C is a block diagram of a configurable output conditioning circuit for despreading sequences, in accordance with one embodiment of the present invention.

Referring now to FIG. 7C, a block diagram of a configurable output conditioning circuit for despreading sequences is shown, in accordance with one embodiment of the present invention. FIG. 7C provides an exemplary output conditioning circuit for despreading sequences that can be applied in configurable composite output conditioning unit 150 and in configurable code generator system 114 of FIG. 1B. The components and inputs shown in the present figure accommodate a wide class of output conditioning functions for despreading code sequences that span current and future exemplary digital spread spectrum applications.

Configurable despreading code conditioning circuit 154 includes multiple mask (or slave) circuits 756 and 766, which are similar to exemplary mask circuit of FIG. 7B, and are coupled in parallel to input bus D 144d, which is also coupled to interface (or master circuit) 148 of FIG. 7A. Thus, states in registers in interface 148 are provided simultaneously and in parallel to each mask circuit 756 and 766. Even though configurable channelization output condition circuit 152 may utilize entirely different code sequences than configurable despreading code conditioning circuit 154 in one embodiment, they still are coupled to the same superset of code sequences from interface 148, from which they will selectively choose the desired code sequences. Output from mask circuits 756 and 766 form bus F 147, which is also shown in FIG. 1B.

Masks circuits 756 and 766 are each coupled to one of multiple selective interconnects, e.g., MUX Y 754 and MUX Z 764, which control the user A or B selection per control input from control memory 759. In turn, MUX Y 754 is coupled to MUX U 750 and MUX V 752. MUX U 750 and MUX V 752 provide switching, per control input from channel select memory register 758, for mask words for phases 1 through 6 of an in-phase version for user A and for user B, respectively. Similarly, MUX Z 764 is coupled to MUX W 760 and MUX X 762 to provide switching, per control input from channel select memory register 758, for mask words for phases 1 through 6 of a quadrature version for user A and for user B, respectively. In this manner, a user can configure mask words for different phases. If there is no phase change in the mask word for calculating a despreading code, then the same mask word can be loaded into all six registers, e.g., 751a–756a for input to MUX U 750.

Alternatively, if the mask word for calculating a despreading code, e.g., via mask G 756, changes for a given process, e.g., user A in-phase condition, in a binary fashion, then the different mask words can be alternatingly loaded into every other register, e.g., one mask word in registers 751a, 753a, 755a, and another mask word in registers 752a, 754a, and 756a, for user A in-phase input to MUX U 750. This sequence can be specified by one spread spectrum application. Then, as the mask words are retrieved from memory 734 in a linear fashion from the top down, per channel select input 758, the mask words will alternating be loaded into mask G 756 to produce an output for despreading code phase I line 147b. A last example arises if the mask word for calculating a despreading code, e.g., via mask G 756, in a tertiary fashion, then the different mask words can be alternatingly loaded into every third memory register, e.g., one mask word in registers 751a, 754a, and another mask word in registers 752a and 755a, and a third mask word in register 753a and 756a, for user A in-phase input to MUX U 750. This technique applies to the mask word inputs to MUX V 752, MUX W 760, and MUX X 762 as well. While the present invention utilizes a specific number of registers and selective interconnects to realize a limited number of code sequence calculations, the present invention is well suited to using a wide variety of memory arrangements and selective interconnects to realize greater or less flexibility for a given class of applications.

Processes

Figure 8A:
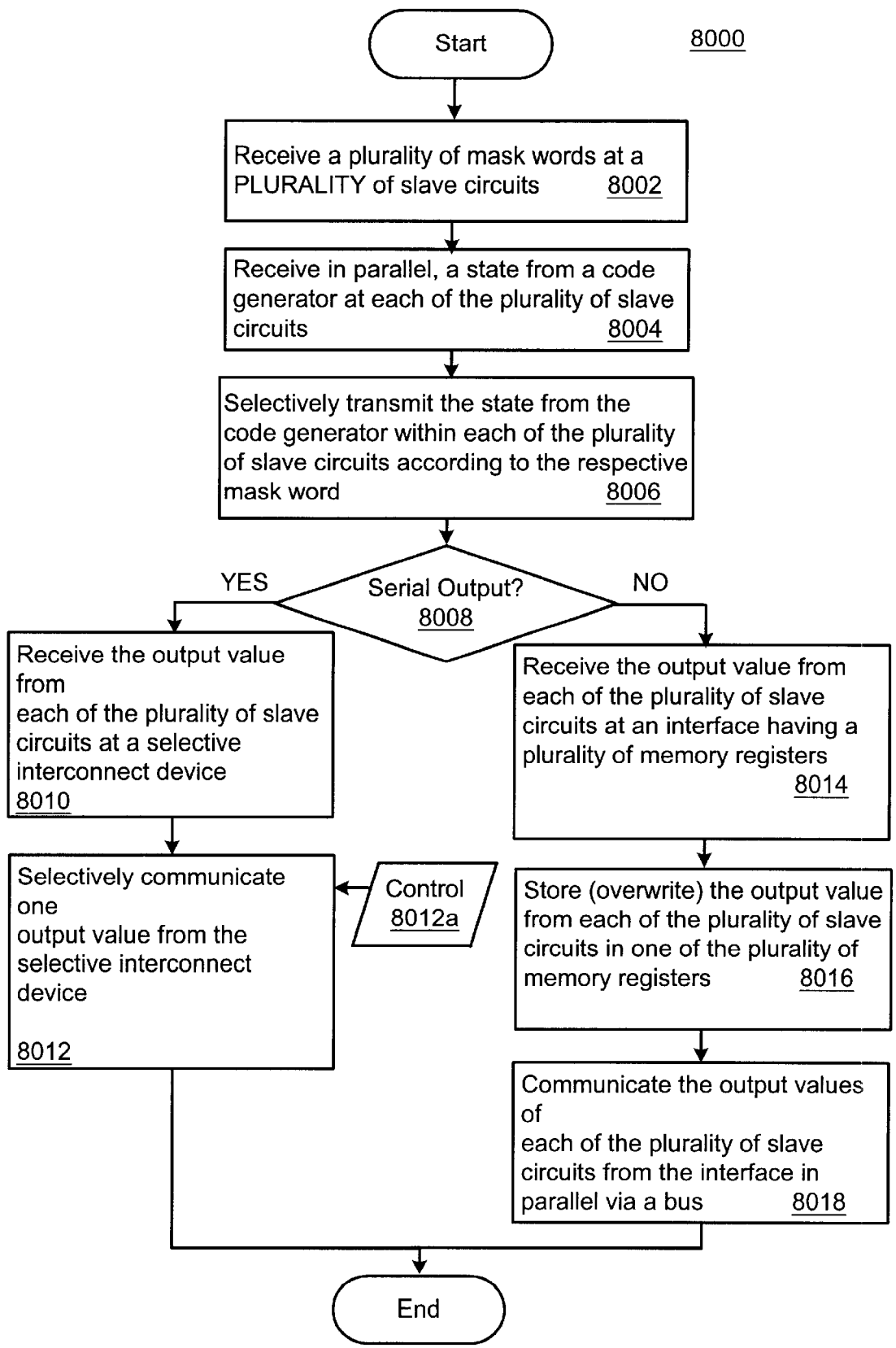
FIG. 8A is a flowchart of a process for generating a plurality of code sequences using multiple mask circuits, in accordance with one embodiment of the present invention.

Referring now to FIG. 8A, a flowchart of a process for generating a plurality of code sequences using multiple mask circuits is shown, in accordance with one embodiment of the present invention. Flowchart 8000 is implemented, in the present embodiment, using exemplary block diagrams of 2A, 2B, 3A, 7B and 7C. By using the present flowchart embodiment, the present invention provides a method of simultaneously providing multiple code sequences from a single master code circuit, thereby accommodating a wide range of spread spectrum communication applications and protocols.

Flowchart 8000 begins with step 8002. In step 8002 of the present embodiment, a plurality of mask words is received at a plurality of slave circuits. Step 8002 is implemented in the present embodiment, by receiving in parallel mask words, e.g., global mask word 311 and global mask word 312 at mask E 310 and mask F 314, respectively. The present invention is well suited to implementing step 8002 with any number of mask circuits-mask word combinations. Following step 8002, flowchart 8000 proceeds to step 8004.

In step 8004 of the present embodiment, a state is received in parallel from a code generator at each of the plurality of slave circuits. Step 8004 is implemented by communicating a code sequence from a master code circuit, e.g., global code sequence input 128 in FIG. 3A from global code generator 107 of FIG. 3B, in the present embodiment. In one embodiment, the code sequence from the global code generator is stored in a memory buffer 306 in FIG. 3A prior to being transmitted in parallel via bus 305 to mask circuits. However, in another embodiment, the code sequence is transmitted directly to the mask, e.g., bit counter master circuit 202 communicating directly to mask A 209a through mask D 209d. Furthermore, the code generator can be any type of code generator, such as a counter, e.g., bit counter 202 of FIG. 2A, or a PN sequence generator, e.g., global LFSR 338 of FIG. 3B, etc. Following step 8004, flowchart 8000 proceeds to step 8006.

In step 8006 of the present embodiment, the state from the code generator is selectively transmitted within each of the plurality of slave circuits according to the respective mask work. Step 8006 is implemented in one embodiment by mask circuit 209a in FIG. 2B. In mask circuit 209a, mask bits that are coupled to AND gates enable the data input to the mask to be transmitted. Thus for example, mask bit 254a coupled to AND gate 256a selectively enables the data input to the mask on line 262a to be transmitted. In the case where multiple masks are utilized for generating channel codes, the mask is coupled to a bit counter. OVSF code sequences can then be formed by combinations of values from a linear counter, depending upon the communication protocol desired. Following step 8006, flowchart 8000 proceeds to step 8008.

In Step 8008 of the present embodiment, an inquiry determines whether a single output is desired. If a single output is desired, then flowchart 8000 proceeds to step 8010. However, if a single output is not desired, e.g., a parallel output of results from the multiple mask circuits is desired, then flowchart 8000 proceeds to step 8014.

In step 8010 of the present embodiment, the output value from each of the plurality of slave circuits at a selective interconnect device is received. Step 8010 is implemented by receiving outputs from the slave circuit at a multiplexer, for example. A multiplexer can receive multiple inputs, and communicate only a single desired output. Following step 8010, flowchart 8000 proceeds to step 8012.

In step 8012 of the present embodiment, one output value from the selective interconnect device is selectively communicated. Step 8012 is implemented in one embodiment by receiving a control signal input 8012a. The control signal is received at a multiplexer to indicate which input line should be coupled to the output line. Following step 8012, one branch of flowchart 8000 ends.

In step 8014 of the present embodiment, the output value from each of the plurality of slave circuits is received at an interface having a plurality of memory registers. Step 8014 is implemented in one embodiment by communicating the output code sequence from each mask, e.g., line A 210a, B, 210b, C 210c, D 210d, and E 210e (or bus A 100a) of FIG. 2A to an interface of memory registers, e.g., interface 148 in FIG. 7A. Following step 8014, flowchart 8000 proceeds to step 8016.

In step 8016 of the present embodiment, the output value from each of the plurality of slave circuits in one from the plurality of memory registers is stored. Step 8016 is implemented in the present embodiment by storing the value in a given memory register in interface 148 of FIG. 7A. In one embodiment, multiple values of a given code sequence output from a mask are stored in the interface, e.g., first through fourth delay 721–724 of input phase 1I 210a in FIG. 7A. Following step 8014, flowchart 8000 proceeds to step 8018.

In step 8018 of the present embodiment, the output value of each of the plurality of slave circuits is communicated from the interface in parallel via a bus. Step 8018 is implemented in one embodiment by providing a common bus, e.g, bus D 144d, that communicates the state of the registers in interface 148 to subsequent circuits, e.g., output conditioning circuit 152 of FIG. 7B. Following step 8018, one branch of flowchart 8000 ends.

Figure 8B:
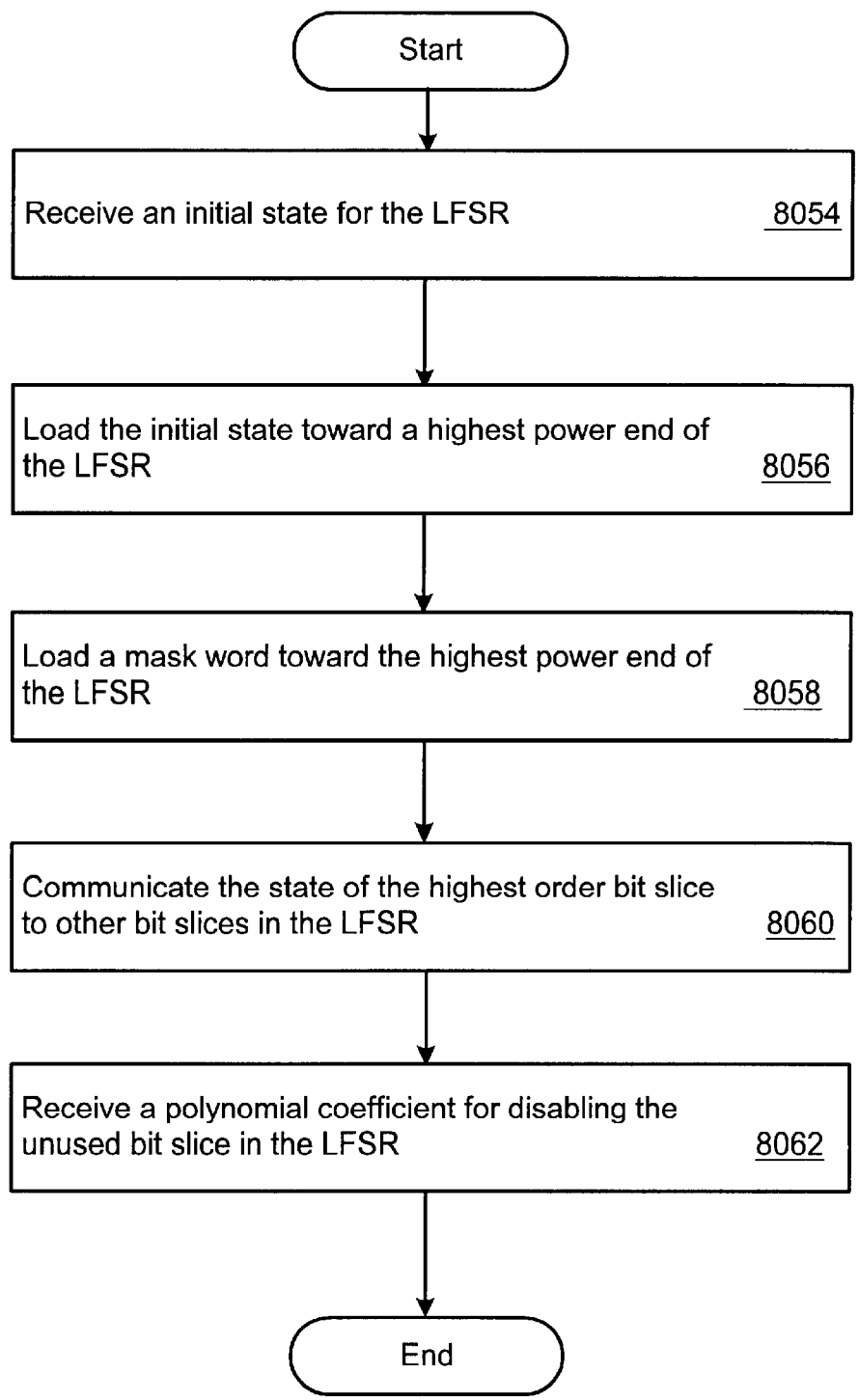
FIG. 8B is a flowchart of a process for selectively varying the length of an LFSR having a Galois feedback configuration, in accordance with one embodiment of the present invention.
Figure 8C:
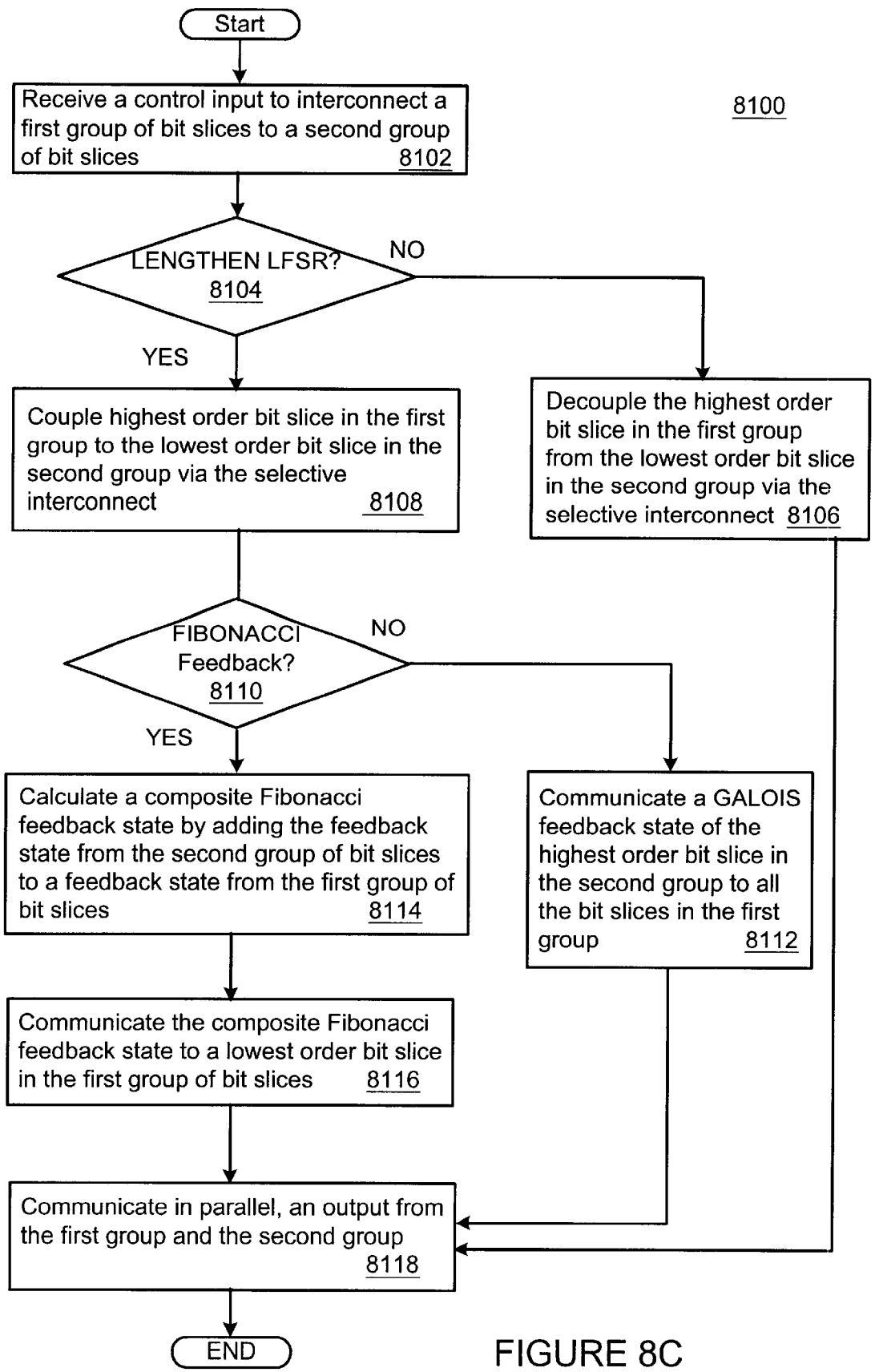
FIG. 8C is a flowchart of a process for operating a modular LFSR, in accordance with one embodiment of the present invention.

Referring now to FIG. 8B, a flowchart of a process for selectively varying the length of an LFSR having a Galois feedback configuration is shown, in accordance with one embodiment of the present invention. Flowchart 8050 is implemented, in the present embodiment, using exemplary block diagrams of 2A and 5B. By using the present flowchart embodiment, the present invention provides a method of shortening an LFSR for a Galois feedback code generator, thereby saving resources.

Flowchart 8050 begins with step 8054, in which an initial state for the LFSR is received. Step 8054 is implemented in one embodiment by receiving a word from memory that can be loaded into the bit registers of an LFSR. For example, FIG. 4A provides a memory block in which initial state A 402a and B 402b are stored, and selectively communicated to configurable LFSR 404. Following step 8054, flowchart 8050 proceeds to step 8056.

In Step 8056 of the present embodiment, the initial state for the LFSR is loaded toward a highest power (or significance) end of the LFSR. Step 8056 is implemented by formatting the initial state with zeros to fill the least significant bit registers in the LFSR that will not be utilized. For example, if master circuit 253 is a Galois LFSR that has N=8 bits, and only a 7 bit LFSR is desired, then the appropriate polynomial bit will deselect the unused bit, and the initial state will have 7 bits for the initial state plus a single zero at the least significant bit location to correctly align the initialization state with the active bits in the LFSR. Following step 8056, flowchart 8050 proceeds to step 8058.

In Step 8058 of the present embodiment, a mask word is loaded toward the highest power end of the LFSR. If mask circuits are utilized with the shortened Galois LFSR, then the mask word is formatted and is loaded in the mask circuit in a manner similar to the formatting and application of the initialization state in step 8056. Step 8058 is implemented in one embodiment in FIG. 3A by providing global mask word 2 311, which has an offset value of zero for the one unused LFSR bit in the present example. Following step 8058, flowchart 8050 proceeds to step 8060.

In Step 8060 of the present embodiment, the state of the highest order bit slice is communicated to other bit slices in the LFSR. LFSR 1 421 of FIG. 4 is utilized to implement step 8060 in one embodiment. In particular, output 421a from the most significant bit in LFSR 1 421 is communicated back to the balance of the bit slices in the LFSR via bus A 442a. Following step 8060, flowchart 8050 proceeds to step 8062.

In Step 8062 of the present embodiment, a disabling polynomial coefficient is received at the lower order bit slices in the LFSR that exceed the LFSR order desired. In the present example, if the least significant bit of a GALOIS LFSR is not utilized, then a polynomial coefficient can be received to disable the reception of the Galois feedback signal at that bit register. Step 8064 is implemented via enable signal from polynomial bit register 528 to AND A gate 540 of exemplary bit slice 504 in FIG. 5B. Following step 8064, flowchart 8050 ends Referring now to FIG. 8C, a flowchart of a process for operating a modular LFSR is shown, in accordance with one embodiment of the present invention. Flowchart 8100 is implemented, in the present embodiment, using exemplary block diagrams of 4B through 4D and FIGS. 5A through 5E. By using the present flowchart embodiment, the present invention provides a configurable method of accommodating the varying code generator lengths required for the non-uniform digital spread spectrum communication applications and protocols.

In Step 8102 of the present embodiment, a control input is received at a selective interconnect to couple a first group of bit slices to a second group of bit slices. Step 8102 is implemented by selective interconnect A (SI-A) 424a of FIG. 4D receiving a control input from segment length memory 426c that indicates whether the LFSR is to be lengthened, e.g., by joining it to an adjacent LFSR, e.g., LFSR 2 422. Following step 8102, flowchart 8100 proceeds to step 8104.

In Step 8104 of the present embodiment, an inquiry determines whether the LFSR is to be lengthened. If the LFSR is to be lengthened, then flowchart proceeds to step 8108. However, if the LFSR is not to be lengthened, then flowchart 8100 proceeds to step 8106. Step 8104 provides the logic for accommodating the selective interconnect-abiltiy of potentially independent modular LFSRs.

In Step 8106 of the present embodiment, the highest order bit slice in the first group is decoupled from the lowest order bit slice in the second group via the selective interconnect. Step 8106 is implemented by selective interconnect SI-A 424a receiving an input of LFSR segment length 124f which translates into control signals start_loc 426c and 543 to selectively interconnect MUX 550 and AND gate 552, respectively. The present invention is well suited to using alternative logic devices and alternative control methodology to decouple LFSRs. Following step 8106, flowchart 8100 proceeds to step 8118.

In step 8118 of the present embodiment, an output from the first group and the second group is communicated in parallel. Step 8118 is implemented by communicating an output from all outputs of configurable LFSR 404 of FIG. 4B. For example, O/P 1 446a and O/P 2 446b are transmitted from LFSR 404 regardless of the configuration length chosen, and received at a selective interconnect 148 of FIG. 7A in the present embodiment. Subsequent processing blocks will be configured a priori to not select an output that is provided to selective interconnect if it is not applicable. In this manner, the superset of code data is still provided to the interface 148, but control logic indicates which code data is applicable for a given application. After step 8118, flowchart ends.

Step 8108 arises if it is desired to lengthen the LFSR per step 8104. In step 8108 of the present embodiment, the highest order bit slice in the first group is coupled to the lowest order bit slice in the second group via the selective interconnect. Step 8108 is implemented in a complementary manner to step 8106. Thus, while control logic in step 8106 disables selective interconnects, the control logic utilized for step 8108 enables the selective interconnects. Following step 8108, flowchart 8100 proceeds to step 8110.

In step 8110 of the present embodiment, an inquiry whether a Fibonacci feedback is desired. If a Fibonacci feedback is desired, then flowchart 8100 proceeds to step 8114. However, if a Fibonacci feedback is not desired, then flowchart 8100 proceeds to step 8112.

Step 8112 arises if a Fibonacci feedback is not desired per step 8110. In Step 8112 of the present embodiment, a Galois feedback state of the highest order bit slice in the second group is communicated to all the bit slices in the first group. Step 8112 is implemented by receiving LFSR feedback configuration input 124c at a configurable bit slice 504 of FIG. 5B or bit slice 507of FIG. 5D. The input 124c controls the selective interconnects, e.g., MUX 532, to transmit the desired feedback value. Following step 8112, flowchart 8100 proceeds to step 8118.

In step 8114 of the present embodiment, a composite Fibonacci feedback state is calculated by adding the feedback state from the second group of bit slices to a feedback state from the first group of bit slices. Step 8114 is implemented in the present embodiment using Fibonacci feedback circuitry 438 in FIG. 4B. Input of LFSR segment length 124f provides control data to store in memory buffer 426a which drives the appropriate MUX as discussed in FIG. 4B. Following step 8114, flowchart 8100 proceeds to step 8116.

In step 8116 of the present embodiment, the composite Fibonacci feedback state is communicated to a lowest order bit slice in the first group of bit slices. Step 8116 is implemented by receiving a feedback value, e.g., byfib_ci line 431a for LSB of LFSR 1 421 in FIG. 4B. Step 8116 is also implemented on a more discrete level by receiving LFSR feedback configuration input 124c at a configurable bit slice 504 of FIG. 5B or bit slice 507of FIG. 5D. The input 124c controls the selective interconnects, e.g., MUX 532, to transmit the desired feedback value. Following step 8116, flowchart 8100 proceeds to step 8118, described hereinabove.

Figure 8D:
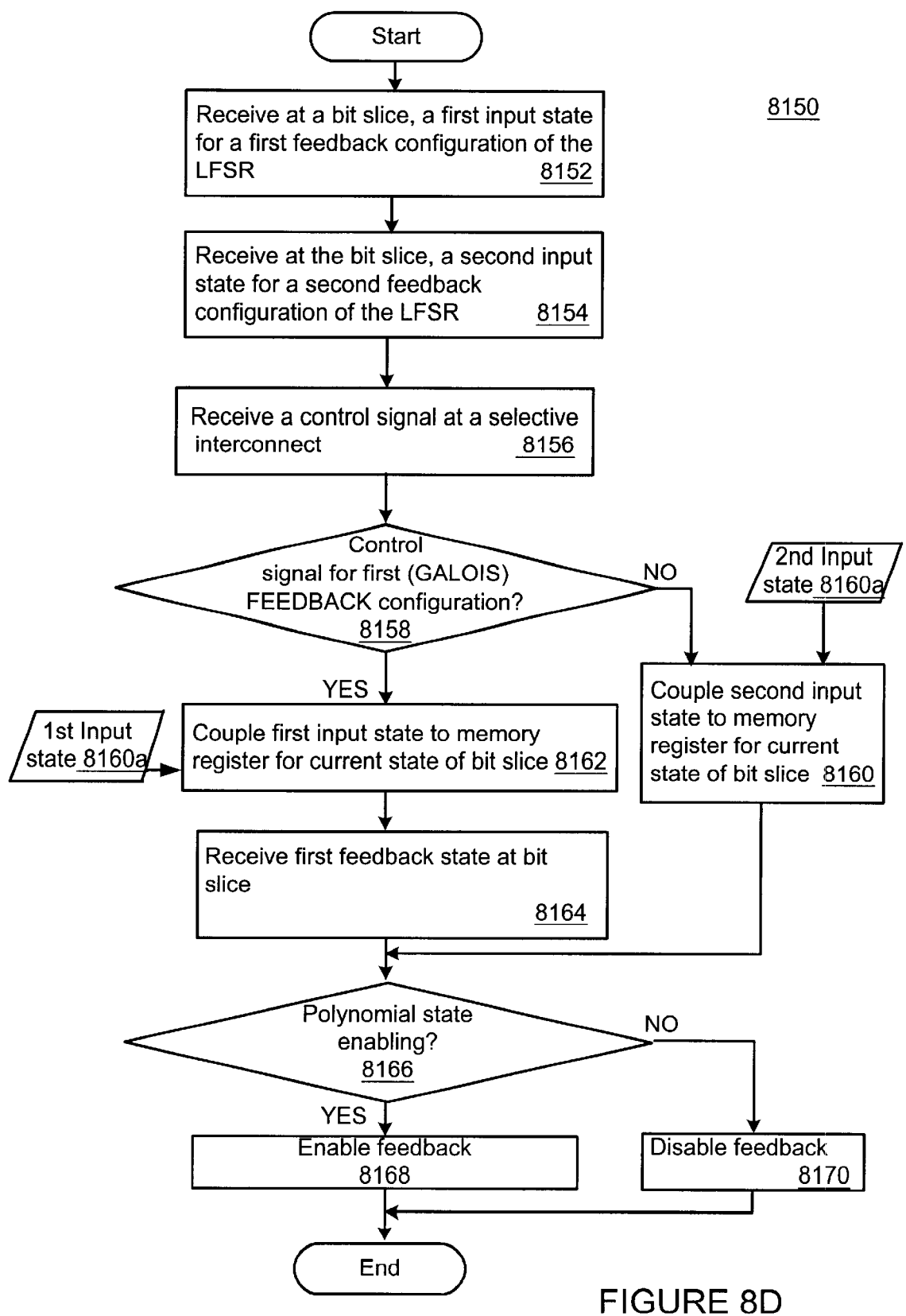
FIG. 8D is a flowchart of a process for selectively implementing a feedback configuration for a bit slice of an LFSR, in accordance with one embodiment of the present invention.

Referring now to FIG. 8D, a flowchart of a process for selectively implementing a feedback configuration for a bit slice of an LFSR is shown, in accordance with one embodiment of the present invention. Flowchart 8150 is implemented, in the present embodiment, using exemplary block diagrams of 2A, 2B, 3A, 7B and 7C. By using the present flowchart embodiment, the present invention provides a configurable method of accommodating diverse feedback requirements that exist among the various spread spectrum communication applications and protocols.

In step 8152 of the present embodiment, a first input state for a first feedback configuration of the LFSR is received at a bit slice. Step 8152 is implemented in the present embodiment by receiving a first state, e.g., a Galois state, at configurable bit slice at selective interconnect MUX 532 via XOR 534, and subsequently via interface B 538 of FIG. 5B. Following step 8152, flowchart 8150 proceeds to step 8154.

In step 8154 of the present embodiment, a second input state for a second feedback configuration of the LFSR is received at the bit slice. Step 8154 is implemented in the present embodiment by receiving a second state, e.g., a Fibonacci state, at configurable bit slice at selective interconnect MUX 532 via interface A 536 of FIG. 5B. Following step 8154, flowchart 8150 proceeds to step 8156.

In step 8156 of the present embodiment, a control signal is received at a selective interconnect. Step 8156 is implemented by receiving an input of LFSR feedback configuration 124c in FIG. 5B which is stored as a control signal in memory for feedback configuration 527. Selective interconnect MUX 532 is coupled to receive this control signal from feedback configuration memory 527, thereby enabling the appropriate feedback state to be transmitted through MUX 532. Following step 8156, flowchart 8150 proceeds to step 8158.

In step 8158 of the present embodiment, an inquiry determines whether the control signal is for a first, e.g., Galois, feedback configuration. If the control signal indicates a Galois feedback configuration, then flowchart 8100 proceeds to step 8162. However, if the control signal does not indicate a Galois feedback configuration, then flowchart 8100 proceeds to step 8160.

In step 8160 of the present embodiment, the second input state is coupled to a memory register for the current state of bit slice. Step 8160 is implemented in the present embodiment by transmitting the second state, e.g., a Fibonacci state, to state register N(i) 526 via selective interconnect MUX 532, as shown in FIG. 5B. Following step 8160, flowchart 8150 proceeds to step 8166.

Step 8162 arises if the control signal does not indicate a Galois feedback, per step 8158. In step 8162 of the present embodiment, the first input state is coupled to memory register for current state of bit slice. Step 8162 is implemented in the present embodiment by transmitting the first state, e.g., a Galois state, to state register N(i) 526 via selective interconnect MUX 532, as shown in FIG. 5B. Following step 8162, flowchart 8150 proceeds to step 8164.

In step 8164 of the present embodiment, the first feedback state is received at bit slice. Step 8164 is implemented by receiving a first feedback, e.g. via bus A 442a for LFSR 1 421, as shown in FIG. 4D. Step 8164 is also implemented by receiving Galois feedback from bus A more discretely at input gal_ci 460 of a given bit slice, as shown in FIG. 5B. Following step 8164, flowchart 8150 proceeds to step 8166.

In step 8166 of the present embodiment, an inquiry determines whether the polynomial state is enabled. If the polynomial state is enabled, then flowchart 8100 proceeds to step 8168. However, if the polynomial state is not enabled, then flowchart 8100 proceeds to step 8170.

In step 8168 of the present embodiment, feedback is enabled. Step 8166 is implemented in the present embodiment by receiving an LFSR polynomial input 124g at configurable bit slice 504 of FIG. 5B. Subsequently, polynomial register P(i) 528 transmits a control signal to selective interconnect AND A 540 to enable a feedback into bit slice 504 for gal_ci 460 line for Galois feedback configuration. Simultaneously, polynomial register P(i) 528 transmits a control signal to selective interconnect AND B 530 to enable a feedback out of bit slice 504 via line lfsr_nxt 469 for a Fibonacci feedback configuration.

In step 8170 of the present embodiment, feedback is disabled. Step 8170 is implemented in the present embodiment in an opposite manner. That is, polynomial register P(i) 528 of FIG. 5B does not transmit an enabling signal to selective interconnects. Consequently, feedback is disabled.

Figure 8E:
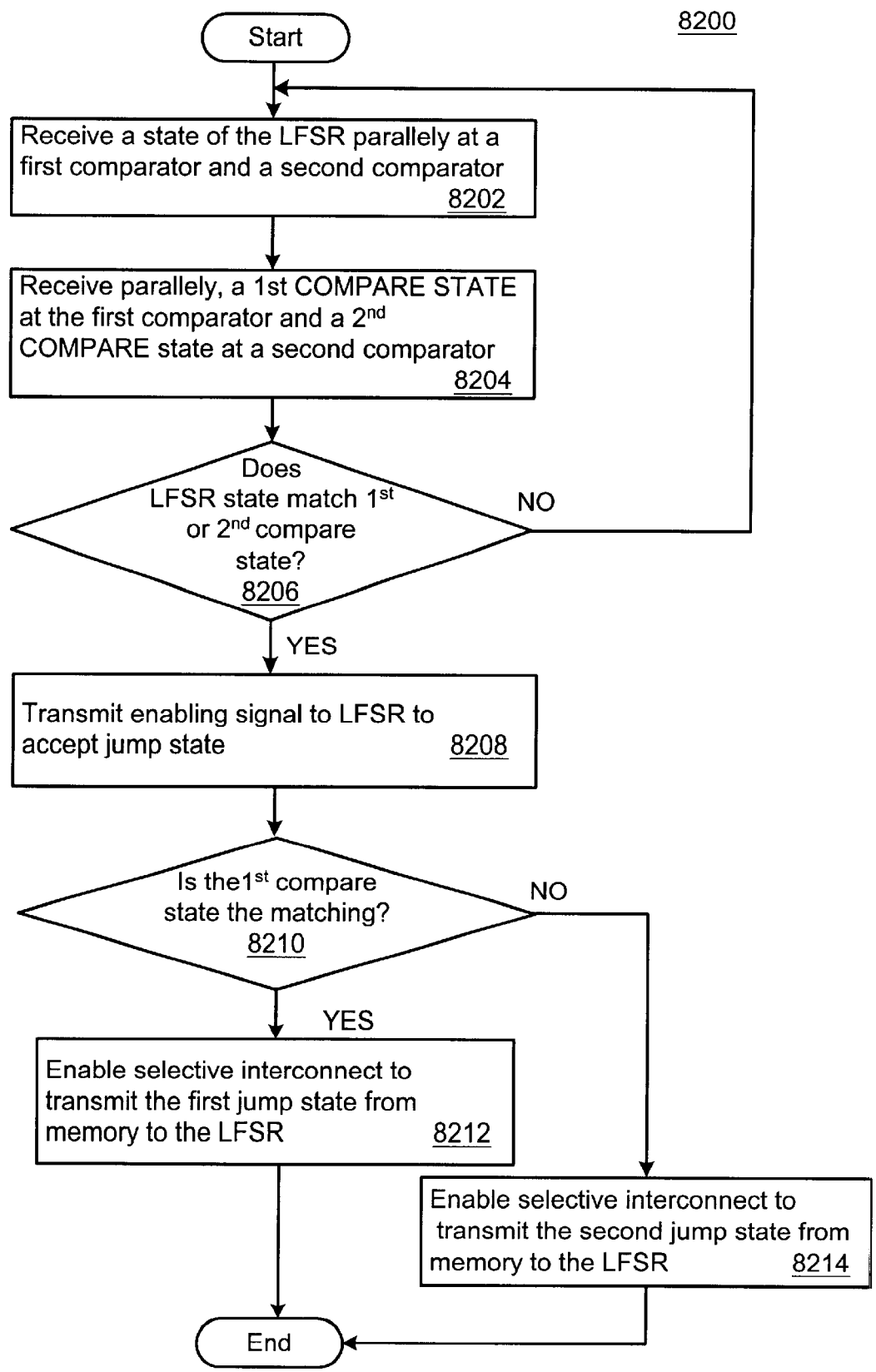
FIG. 8E is a flowchart of a process for selectively loading a state into an LFSR, in accordance with one embodiment of the present invention.
Figure 8F:
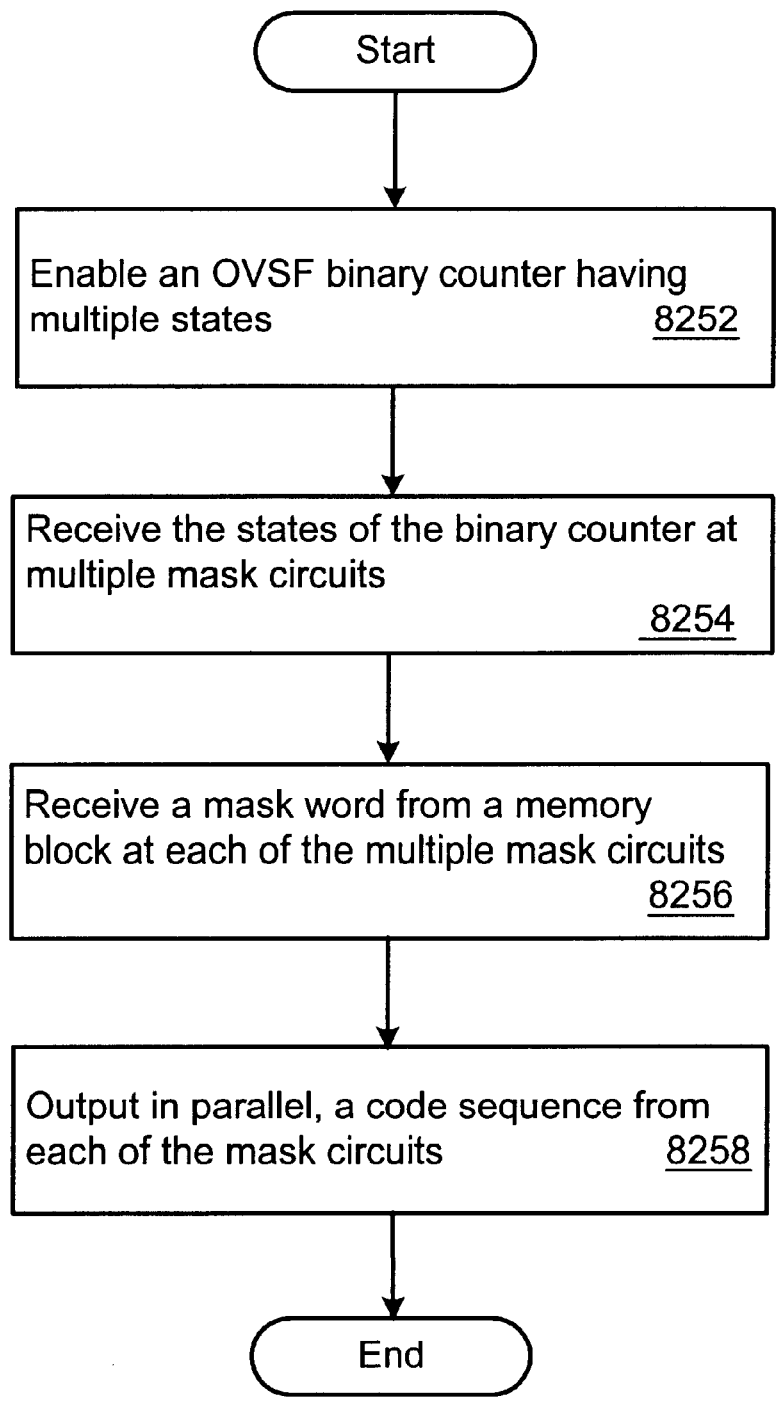
FIG. 8F is a flowchart of a process for simultaneously generating multiple independent code sequences in accordance with one embodiment of the present invention.

Referring now to FIG. 8E, a flowchart of a process for selectively loading a state into an LFSR is shown, in accordance with one embodiment of the present invention. Flowchart 8200 is implemented, in the present embodiment, using exemplary block diagrams of configurable jump state circuit in FIG. 6 as applied to a code generator in FIG. 4A and in FIG. 3B. By using the present flowchart embodiment, the present invention provides a method of accommodating state resets or state jumps in an LFSR required to accommodate the wide range of spread spectrum communication applications and protocols.

In step 8202 of the present embodiment, a state of the LFSR is received in parallel at a first comparator and a second comparator. Step 8202 is implemented in the present embodiment by receiving state from exemplary LFSR 626 at comparator A 622 and comparator B 620 in FIG. 6. In another embodiment, only a single compare and jump state is utilized. Following step 8202, flowchart 8200 proceeds to step 8204.

In step 8204 of the present embodiment, a first compare state is received at the first comparator and a second compare state is received at a second comparator in parallel. Step 8204 is implemented by comparator A 622 receiving a compare state 1 621 from memory 630, as shown in FIG. 6. Similarly, step 8204 is implemented by comparator B 620 receiving a compare state 2 622 from memory 630. Following step 8204, flowchart 8200 proceeds to step 8206.

In step 8206 of the present embodiment, an inquiry determines whether the LFSR state matches the first or second compare state. Step 8206 is implemented by comparator A 622 and B 620 performing a bit by bit comparison of the two sequences received in the previous steps. If the LFSR state does not match the first state and the second state, then flowchart 8200 returns to step 8202. Alternatively, if the LFSR does match the first state or the second state, then flowchart 8200 proceeds to step 8208.

Step 8208 arises if the LFSR state matches either the first compare state or the second compare state, per step 8206. In step 8208 of the present embodiment, an enabling signal is transmitted to LFSR to accept jump state. Step 8208 is implemented by comparator A 622 or comparator B 620 providing an enable signal to OR gate 610 which provides an enable signal to LFSR 626 to accept the jump state provided via MUX S 616. Following step 8208, flowchart 8200 proceeds to step 8210.

In step 8210 of the present embodiment, an inquiry determines whether the first compare state matches is the state that matched the LFSR state. If the first compare state matches the LFSR state, then flowchart 8200 proceeds to step 8212. However, if the first compare state does not match the LFSR state, then flowchart 8200 proceeds tot step 8214. Following step 8210, flowchart 8200 proceeds to step 8212 or 8214.

In step 8212 of the present embodiment, the selective interconnect is enabled to transmit the first jump state from memory to the LFSR. Steps 8212 and 8214 provide the logic to decide which compare state was successful in the comparison to the LFSR state. Step 8212 is implemented in the present embodiment by providing control signal output from comparator A 622 for compare state 1 to MUX S 616. In turn MUX S 616 is biased such that an enable input will allow jump state 1 614 from memory to be transmitted through MUX S 616 to LFSR 626.

In step 8214 of the present embodiment, the selective interconnect is enabled to transmit the second jump state from memory to the LFSR. Step 8214 is implemented in an opposite manner to that provided for step 8212. That is, if no enable is provided by COMPARATOR A 622 to MUX S 616, yet LFSR 626 is enabled by XOR 610, then MUX S 616 will default to transmitting jump state 2 612 from memory 630 into LFSR 626. Following step 8214, flowchart 8200 ends.

Figure 8G:
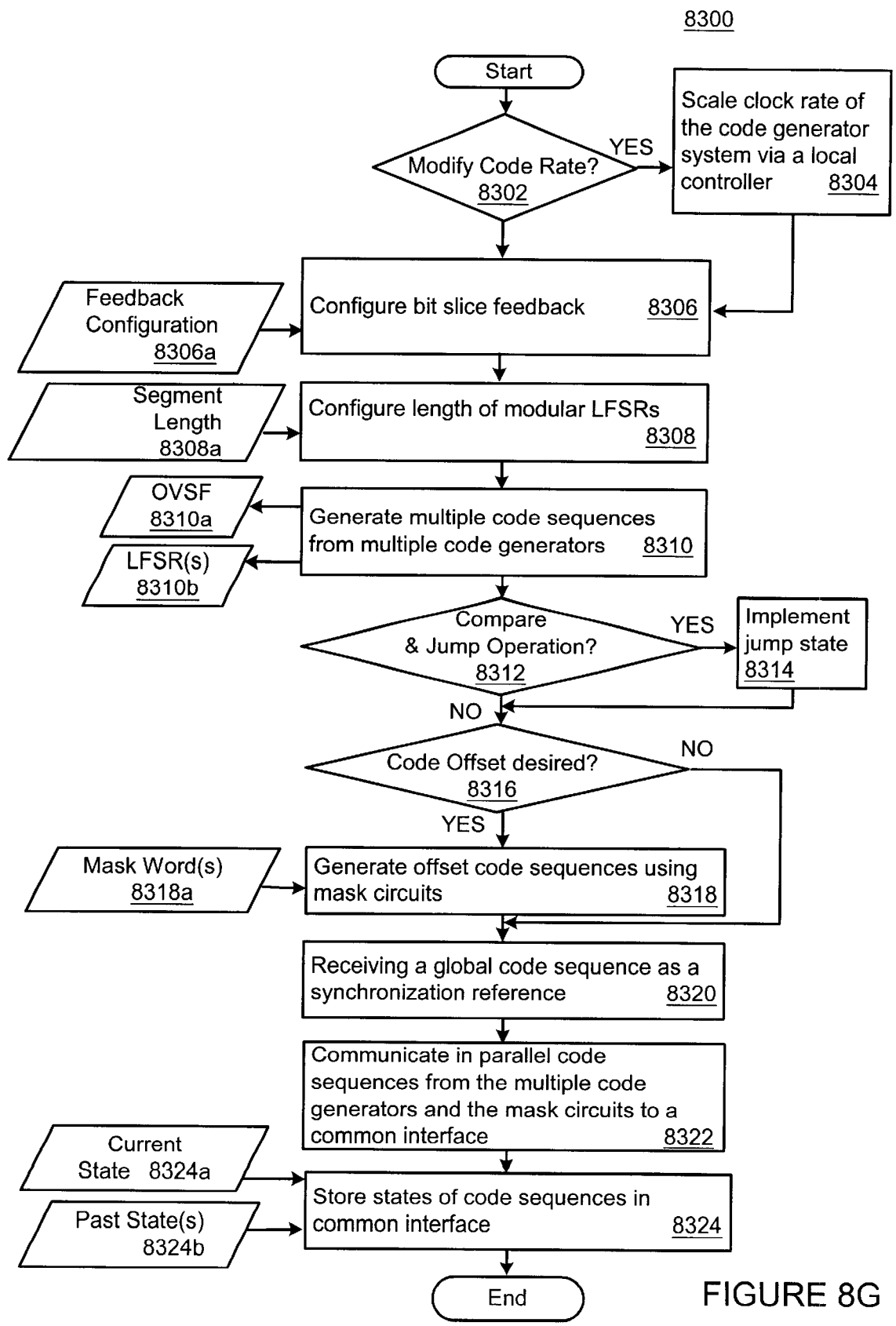
FIG. 8G is a flowchart of a process for simultaneously generating multiple independent code sequences, in accordance with one embodiment of the present invention.

Referring now to FIG. 8G, a flowchart of a process for simultaneously generating multiple independent code sequences is shown, in accordance with one embodiment of the present invention. Flowchart 8300 is implemented, in the present embodiment, using exemplary code generator system of FIG. 1B, and various code generator component diagrams in FIGS. 2A, 2B, 3A, 3B, and 4A through 4D. By using the present flowchart embodiment, the present invention provides a method of configuring a code generator to generate the desired code sequence and to provide a superset of code sequences such that a wide range of spread spectrum communication applications and protocols can be accommodated.

Flowchart 8300 begins with step 8302, in which an inquiry determines whether a code rate is modified. If a code rate needs modification, then flowchart 8300 proceeds to step 8304. However if a code rate does not need modification, then flowchart proceeds to step 8306.

In step 8304, the clock rate of the code generator system is scaled via a local controller. Step 8304 is implemented by scaling via the local controller 121, an input clock 123 provided to code generator system 114a in FIG. 1B. In another embodiment, the code rate can be adjusted by using variable LFSR rate block 348 of FIG. 3B. In particular, variable LFSR rate block 348 uses a counter to count clock cycles, compare the count to a desired skip rate, and then enable the LFSR 338 to produce a code value when a match occurs. This latter embodiment is useful for reducing a code rate from a maximum available code rate, e.g., red7ucign the rate by 1/N via enabling LFSR 338 every other Nth clock cycle. Following step 8304, flowchart 8300 proceeds to step 8306.

In step 8306 of the present embodiment, a bit slice feedback is configured, based on feedback configuration input 8306a. Step 8306 is implemented in the present embodiment by receiving feedback configuration input 124c, as dictated by a user or an application, to configurable bit slice 504 of FIG. 5B. The feedback configuration is stored in memory 527 and subsequently provided to a selective interconnect, e.g., MUX 532, which couples the appropriate interface, e.g., and interface B 538 via XOR 534 or interface A 536. Step 8306 is implemented in one embodiment as described by exemplary flowchart 8150. Following step 8306, flowchart 8300 proceeds to step 8308.

In step 8308 of the present embodiment, the length of modular LFSRs is configured. Step 8308 is implemented by exemplary flowchart 8100. Following step 8308, flowchart 8300 proceeds to step 8310

In step 8310 of the present embodiment, a multiple code sequences from multiple code generators are generated. Step 8310 is implemented in the present embodiment by providing multiple code generators in parallel, e.g., channelization code generator 141, local LFSR code generator 143, and global interface 145, as shown in FIG. 1B. Another implementation of step 8310 is provided in FIG. 4A where multiple independent (or modular) LFSRs are selectively coupled together in series. Lastly, multiple code sequences are also generated by use of mask circuits which generate multiple versions of a given code sequence, e.g., channel code generator 141 of FIG. 2A, and global code interface 145 of FIG. 3A. These multiple code outputs are shown as orthogonal varying spreading factor code (OVSF) output 8310a and LFSR 8310b. Following step 8310, flowchart 8300 proceeds to step 8312.

In step 8312 of the present embodiment, an inquiry determines whether a compare and jump operation is desired. If a compare and jump state operation is desired for a given code generator, then flowchart 8300 proceeds to step 8314. However if a compare and jump state operation is not desired for a given code generator, then flowchart 8300 proceeds to step 8316.

In step 8314 of the present embodiment, a jump state operation is implemented. An exemplary method of implementing a compare and jump operation is provided in flowchart 8200.

In step 8316 of the present embodiment, an inquiry determines whether a code offset is required. If a code offset is desired from a given code generator, then flowchart 8300 proceeds to step 8318. However if no code offset is desired from a given code generator, then flowchart 8300 advances to step 8320.

In step 8318 of the present embodiment, an offset code sequence is generated using mask circuits, and mask word inputs 8318a. Mask words can be determined a priori by a user and loaded into a communication device. Step 8318 is implemented by exemplary flowchart 8000. Following step 8318, flowchart 8300 proceeds to step 8320.

In step 8320 of the present embodiment, a global code sequence, useful for a synchronization reference, is received. Step 8320 is implemented by generating a global code sequence by global code generator 107 of FIG. 1A, which has exemplary components shown in FIG. 3B. A subsequent sub step is to interface the global code to a local code generator system via a global code interface 145 of FIG. 3A. Global code sequence can provide values useful for determining reference states and code offsets for different modem processor planes 108a–108n in a communication device 100a, as shown in FIG. 1A. Following step 8320, flowchart 8300 proceeds to step 8322.

In step 8322 of the present embodiment, parallel code sequences are communicated from the multiple code generators and the mask circuits to a common interface. Step 8322 is implemented in the present embodiment by multiple buses A 144a, B 144b, and C 144c arranged in parallel to communicate code sequences generated by channel code generator 141, local LFSR code generator 143, and global code interface 145 to the interface 148, as shown in FIG. 1B. Following step 8322, flowchart 8300 proceeds to step 8324.

In step 8324 of the present embodiment, states of code sequences are stored in a common interface. Step 8324 is implemented by memory registers shown in interface 148 of FIG. 7A. Note that only a short temporal range of code sequences is stored in the present embodiment. For example, most code sequences are only stored for a single cycle, e.g., block A 702 has no registers for storing delayed versions of the code sequence. In contrast, Phase 11 210*a* code sequence has four delay registers to store the present state and the previous four states. States are overwritten if no delay is provided, and states are translated to adjacent registers if a delay version is dictated. Following step 8324, flowchart 8300 ends.

Figure 8H:
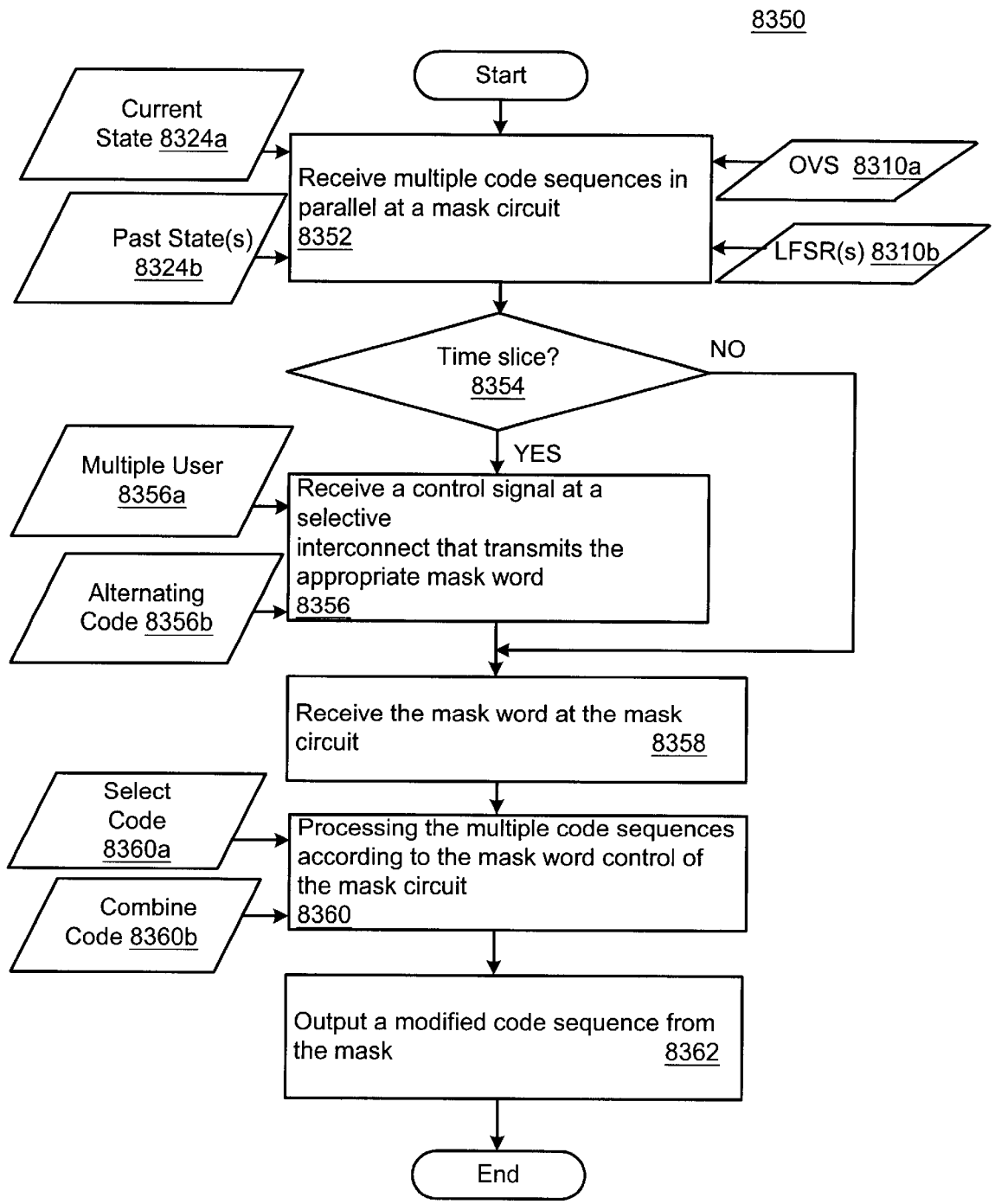
FIG. 8H is a flowchart of a process for conditioning multiple code sequences in a configurable conditioning circuit, in accordance with one embodiment of the present invention.

Referring now to FIG. 8H, a flowchart of a process for conditioning multiple code sequences in a conditioning circuit is shown, in accordance with one embodiment of the present invention. Flowchart 8350 augments flowchart 8300 by utilizing the codes generated in flowchart 8300 in a manner appropriate for a given communication protocol. Flowchart 8350 is implemented, in the present embodiment, using exemplary block diagrams shown in FIGS. 7B and 7C. By using the present flowchart embodiment, the present invention provides a method of intelligently selecting and combining primitive code sequences in a wide range of configurations as determined by a user so as to satisfy a desired one of the wide range of spread spectrum communication applications and protocols.

In step 8352 of the present embodiment, a multiple code sequence is received in parallel at a mask circuit. Step 8352 is implemented by receiving the entire range of code sequences stored in interface 148 of FIG. 7A at masks G 730*a*–733*a* of FIG. 7B and at masks 756 and 766 of FIG. 7C, via a common bus D 144*d*. In this manner, all masks receive the entire superset of the primitive code sequences stored in interface 148, even if the desired conditioning circuit does not need them. Thus, the masks have many possible combinations and permutations for subsequent code selection and combining. In another embodiment, a restricted set of registers is provided to a mask depending on the slated function of the mask. Following step 8352, flowchart 8350 proceeds to step 8354.

In step 8354 of the present embodiment, an inquiry determines whether time slicing is desired. If time slicing is desired, then flowchart 8350 proceeds to step 8356. However, if time slicing is not desired, then flowchart 8350 skips forward to step 8358.

Step 8356 arises if time slicing is desired for the code generation system. In step 8356 of the present embodiment, a control signal at a selective interconnect that transmits the appropriate mask word is received. In this manner, resources of individual computation components, such as CGS 114*a*, can be time-shared across multiple computation processes, e.g., several multipaths and/or multiple channels, e.g., as user inputs 9356*a* and code input 9356*b*. Step 8356 is implemented in channelization condition circuit 152 wherein control 736 provides control to MUX 730*b*–733*b* so as to enable the proper user, e.g., A or B through each MUX to the mask circuits 730*a*–733*a*. Step 8354 is implemented as described in previously incorporated patent entitled "IMPROVED APPARATUS AND METHOD FOR MULTI-THREADED SIGNAL PROCESSING" by Subramanian et al. Following step 8356, flowchart 8350 proceeds to step 8358.

In step 8358 of the present embodiment, a mask word is received at the mask circuit. Step 8358 is implemented by communicating an appropriate mask word from memory 734 to its respective mask, as shown in exemplary FIG. 7B. Following step 8358, flowchart 8350 proceeds to step 8360.

In step 8360 of the present embodiment, the multiple code sequences are processed according to the mask word control of the mask circuit. Step 8360 is implemented as described in mask components of FIG. 2B. While a mask can be utilized for selective adding of states of a code generator circuit, it is also useful for selective combination of a superset of primitive and widely varying code sequence states. Following step 8360, flowchart 8350 proceeds to step 8362.

In step 8362 of the present embodiment, a modified code sequence is outputted from the mask. Step 8362 is implemented by communicating the result of the mask operation on the input code sequences. Thus, the present invention can accommodate wireless code division multiple access spread spectrum channelization codes and despreading codes using the present invention. Yet the present invention is extremely configurable, so as to accommodate a wide range of current spread spectrum applications, as well as future undefined spread spectrum applications and protocols.

While the present embodiment applies flowcharts 8000, 8050, 8100, 8150, 8200, 8250, 8300, and 8350 to a digital wireless communication system, the present invention can be applied to any electronic device for any type of application. Within the wireless communication system described in the present embodiment, the present invention is applicable to mobile units, base stations, and test platforms.

While flowcharts 8000, 8050, 8100, 8150, 8200, 8250, 8300, and 8350 of the present embodiment show a specific sequence and quantity of steps, the present invention is suitable to alternative embodiments. For example, not all the steps provided in the aforementioned flowcharts are required for the present invention. Similarly, other steps may be omitted depending upon the application. In contrast, the present invention is well suited to incorporating additional steps to those presented, as required by an application, or as desired for permutations in the process.

Lastly, the sequence of the steps for flowcharts 8000, 8050, 8100, 8150, 8200, 8250, 8300, and 8350 can be modified depending upon the application. Thus, while the present flowcharts are shown as a single serial process, they can also be implemented as a continuous or parallel process. For example, is appreciated that the present flowcharts can be repeated for the multiple hardware planes, e.g., modem processor plane 108*a*–108*n* of FIG. 1A, in the multiple baseband processor planes, e.g., processors 106*a*–106*n* of FIG. 1A, within a communication device, e.g., device 100*a*.

Many of the instructions for the steps, and the data input and output from the steps, of flowcharts 8000, 8050, 8100, 8150, 8200, 8250, 8300, and 8350 utilize memory and processor hardware components, e.g. system memory 120 and processor 130 in FIG. 1A, or local memory 122 and local controller 121 of FIG. 1B. The memory storage used to implement the flowchart steps in the present embodiment can either be permanent, such as read only memory (ROM), or temporary memory such as random access memory (RAM). Memory storage can also be any other type of memory storage, capable of containing program instructions, such as a CD ROM, or flash memory, etc. Similarly, the processor used to implement the flowchart steps can either be a dedicated controller, an existing system processor, or it can be a dedicated digital signal processor (DSP), as appropriate for the type of step. Alternatively, the instructions may be implemented using some form of a state machine. Some portions of the detailed description, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "coupling," "enabling," "transmitting," "providing," "repeating," "generating," "communicating," "scaling," "configuring," "loading," "shortening," "transmitting," "choosing," "combining," "storing," "disassembling," "performing," "synchronizing," "demuxing," "transmitting," "combining," "formatting," "assembling," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

In view of the embodiments described herein, the present invention has been shown to provide a method and apparatus that overcomes the limitations of protocol non-uniformity and proliferation of code sequences in the wireless communications field. In particular, the detailed description has shown how the present invention overcomes the limitations of a conventional code generator in order to accommodate new and undefined code standards. And the present invention overcomes the limitation of generating code only at one speed. Lastly, the present invention overcomes the limitation of sequentially indexing through the entirety of a code sequence to reach a starting point of the sequence.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A configurable code generator comprising:
   a master linear feedback shift register (LFSR) having a plurality of memory registers, and at least one adder coupled to the plurality of memory registers for feedback; and
   a plurality of slave circuits coupled in parallel to the linear feedback shift register, wherein each of the plurality of slave circuits has a mask circuit for receiving a unique mask word corresponding to a unique offset in code space from the master linear feedback shift register, each of the plurality of slave circuits providing a code sequence output in parallel.

2. The configurable code generator recited in claim 1 further comprising a plurality of memory registers, wherein each of the memory registers stores a single mask word for a respective one of the plurality of slave circuits.

3. The configurable code generator recited in claim 1 further comprising a selective interconnect coupled to the output from each of the plurality of slave circuits and coupled to a final output line, the selective interconnect for selecting a desired output sequence.

4. The configurable code generator recited in claim 1 further comprising an interface coupled to the final output line of each of the plurality of slave circuits, the interface for storing at least one bit of a code sequence from each of the plurality of slave circuits.

5. The configurable code generator recited in claim 1 wherein an output line from each of the plurality of slave circuits is coupled in parallel to the interface, and wherein the interface stores in parallel the at least one bit of the code sequence from each of the plurality of slave circuits.

6. A linear feedback shift register (LFSR) having a variable length, the LFSR comprising:
   a highest order bit slice; and
   a lowest order bit slice having a selective interconnect and a polynomial memory register, the selective interconnect of the lowest order bit slice coupled to the highest order bit slice and to the polynomial memory register; and
   at least one intermediate bit slice coupled to the lowest order bit slice and to the highest order bit slice in a Galois configuration, the at least one intermediate bit slice having a selective interconnect and a polynomial memory register, the selective interconnect of the at least one intermediate bit slice coupled to the highest order bit slice and to the polynomial memory register.

7. The LFSR recited in claim 6 wherein the highest order bit slice does not require a polynomial memory register.

8. The LFSR recited in claim 6 wherein the highest order bit slice, the lowest order bit slice, and the at least one intermediate bit slice all have a state memory register coupled to each other for a Galois configuration.

9. A modular linear feedback shift register (LFSR), the LFSR comprising:
   a first group of bit slices coupled to each other;
   a second group of at least one bit slice; and
   a first selective interconnect coupling a highest order bit slice in the first group of bit slices to a lowest order bit slice in the second group of at least one bit slice, the first selective interconnect selectively communicating a start bit value for the lowest order bit slice in the second group;
   wherein the first group of bit slices and the second group of at least one bit slice are both operable as a separate LFSR when the first selective interconnect decouples the highest order bit slice in the first group of bit slices from the lowest order bit slice in the second group of at least one bit slice.

10. The modular LFSR recited in claim 9 wherein the first group of bit slices and the second group of at least one bit slice are both operable as a separate LFSR when the first selective interconnect decouples the highest order bit slice in the first group of bit slices to the lowest order bit slice in the second group of at least one bit slice.

11. The modular LFSR recited in claim 9 wherein the first group of bit slices and the second group of at least one bit slice form a single LFSR when the first selective interconnect couples the highest order bit slice in the first group of bit slices to the lowest order bit slice in the second group of at least one bit slice.

12. The modular LFSR recited in claim 9 wherein both the first group of bit slices and the second group of at least one bit slice are configured for a Fibonacci feedback configuration.

13. The modular LFSR recited in claim 12 wherein the LFSR includes a second selective interconnect coupled to the lowest order bit slice in the first group, the second selective interconnect for selectively communicating to the lowest order bit slice in the first group, a sum of all the bit slices in the first group or a sum of all the bit slices in the first group and the second group.

14. The modular LFSR recited in claim 13 wherein the LFSR includes a first adder and a second adder, the first adder coupled to the first group of bit slices for summing the values of all the bit slices in the first group, and wherein the second adder is coupled to the second group of bit slices for summing the values of all the bit slices in the second group.

15. The modular LFSR recited in claim 14 wherein the LFSR includes a third adder coupled to the first adder, the second adder, and the second selective interconnect, the third adder summing results from the first adder and the second adder.

16. The modular LFSR recited in claim 9 wherein both the first group of bit slices and the second group of at least one bit slice are configured for a Galois LFSR.

17. The modular LFSR recited in claim 16 further comprising a second selective interconnect coupled to the highest order bit slice in the second group, to the highest order bit slice in the first group, and to all the bit slices in the first group of bit slices, the second selective interconnect for selectively communicating to all the bit slices in the first group of bit slices, either the highest order bit slice from the first group of bit slices or from the second group of bit slices.

18. The modular LFSR recited in claim 9 wherein the bit slices in the first group and the second group have configurable interconnections for implementing a plurality of feedback configurations in the LFSR.

19. The modular LFSR recited in claim 18 wherein the configurable interconnects perform modulo-2 addition for either a Fibonacci feedback or a Galois feedback configuration.

20. The modular LFSR recited in claim 9 further comprising a third group of bit slices and a fourth group of bit slices, the third group coupled to the second group and the fourth group, wherein the bit slices in the third group and the fourth group are respectively coupled to each other.

21. The modular LFSR recited in claim 20 wherein the first group has eight bit slices with an output tap at its eighth bit slice, the second group has eight bit slices with an output tap at its eighth bit slice, the third group has nine bit slices with an output tap at its ninth bit slice, and the fourth group has twenty-five bit slices with an output tap at its twenty-fifth bit slice.

22. The modular LFSR recited in claim 9 further including a third group of bit slices coupled to each other and a fourth group of bit-slices coupled to each other, wherein a bit slice from the third group is grouped with a respective order of bit slice from the fourth group to provide Z4 2-bit math operations, the third group and the fourth group selectively coupled to the first group and the second group.

23. The modular LFSR recited in claim 22 further including a second selective interconnect coupled to the first group, second group, third group, and fourth group, wherein the second selective interconnect has a control input to selectively enable either the first group and the second group of bit slices, or to enable the third group and the fourth group of bit slices within the modular LFSR.

24. The modular LFSR recited in claim 9 further comprising a first output from the first group of bit slices, and a second output from the second group of at least one bit slice, the first and second output provided in parallel.

25. A configurable bit slice for implementing multiple formats of a linear feedback shift register (LFSR), the configurable bit-slice comprising:
 a state memory register for storing a state of the bit slice;
 a first circuit for a first feedback configuration of the LFSR;
 a second circuit for a second feedback configuration of the LFSR; and
 a first selective interconnect selectively coupling the first circuit and the second circuit to the state memory register.

26. The configurable bit slice recited in claim 25 further comprising a configuration memory coupled to the first selective interconnect, the configuration memory providing configuration data to the first selective interconnect to configure a desired format of the LFSR.

27. The configurable bit slice recited in claim 25 wherein the first circuit is a throughput line for receiving a downstream state input, the first circuit representing a Fibonacci feedback configuration of the LFSR.

28. The configurable bit slice recited in claim 25 further comprising a second selective interconnect, a third selective interconnect, and a polynomial memory register, the polynomial memory register selectively transmitting the state of the state memory register via the second selective interconnect for a Fibonacci feedback configuration, the polynomial memory register selectively receiving a highest order state the second circuit via the third selective interconnect for a Galois feedback configuration.

29. The configurable bit slice recited in claim 25 wherein the first circuit, the second circuit, the state memory register, and the selective interconnect are one-bit devices.

30. The configurable bit slice recited in claim 25 wherein the first circuit, the second circuit, the state memory, and the selective interconnect are two-bit devices for performing Z4 2-bit math operations.

31. The configurable bit slice recited in claim 25 wherein the second circuit is a modulo 2 adder logic device having a first input, a second input, and an output, the first input for receiving a state from a highest order bit slice of the LFSR, the second input for receiving a downstream state input, the output coupled to the first selective interconnect, the second circuit representing a Galois feedback configuration of the LFSR.

32. The configurable bit slice recited in claim 31 wherein a two-bit adder logic device for performing Z4 2-bit math operations is substituted for the modulo 2 adder logic device.

33. The configurable bit slice recited in claim 31 wherein a first 2-bit XOR logic device for performing Z4 2-bit math operations is substituted for a first AND gate logic device, and wherein a second 2-bit XOR logic device is substituted for a second AND gate logic device.

34. A configurable circuit for managing the state of a linear feedback shift register (LFSR), the circuit comprising:
   a first memory register for storing a first compare state;
   a second memory register coupled to the first memory register, the second memory register for storing a first jump state for the LFSR; and
   a comparator coupled to the first memory register, the comparator enabling the first jump state to be loaded into the LFSR when a state of the LFSR matches the first compare state.

35. The configurable state circuit recited in claim 34 further comprising:
   a third memory register for storing a second compare state;
   a fourth memory register coupled to the third memory register, the fourth memory register for storing a second jump state; and
   a second comparator coupled to the third memory register, the second comparator enabling the second jump state to be loaded into the LFSR when the state of the LFSR matches the second compare state.

36. The configurable state circuit recited in claim 35 further comprising a selective interconnect coupled to the first comparator, the second memory register and the fourth memory register, the selective interconnect selectively communicating the first jump state or the second jump state to the LFSR.

37. The configurable state circuit recited in claim 36 wherein the first memory register for storing a first compare state and the third memory register for storing a second compare state are alternating implemented respectively for a first channel and a second channel.

38. The configurable state circuit recited in claim 35 further comprising a second selective interconnect coupled to the first comparator and the second comparator, the second selective interconnect providing an enabling signal for the LFSR to accept a jump state.

39. A configurable code generator for generating orthogonal varying spreading factor (OVSF) codes in multiple communication protocols, the code generator comprising:
   a binary counter;
   a memory register for storing a mask word; and
   a mask circuit coupled to the memory register and to the binary counter, the mask circuit selectively coupled to bit locations of the binary counter as configured by the mask word.

40. The configurable code generator recited in claim 39 further including a plurality of mask circuits and a plurality of memory registers, each of the plurality of mask circuits coupled in parallel to the binary counter, each of the plurality of memory registers respectively coupled to one of the plurality of mask circuits.

41. The configurable code generator recited in claim 40 further including a plurality of output lines for providing a plurality of output sequences from an OVSF code generator, each of the plurality of output lines respectively coupled to one of the plurality of mask circuits.

42. The configurable code generator recited in claim 40 wherein each of the mask circuits is operable to select a unique code sequence.

43. The configurable code generator recited in claim 40 wherein two of the plurality of masks circuits receive mask words for a first communication protocol, and an additional two of the plurality of mask circuits receive mask words for a second communication protocol.

44. The configurable code generator recited in claim 40 wherein two of the plurality of mask circuits receive a mask word for an in-phase (I) channel, and wherein two of the plurality of mask circuits receive a mask word for a quadrature phase (Q) channel.

45. The configurable code generator recited in claim 40 wherein a bit length of the binary counter exceeds a bit length required for a first communication protocol.

46. A configurable composite code generator for providing multiple code sequences, the code generator comprising:
   a first code generator having an output line for communicating a first code sequence;
   a second code generator having an output line for communicating a second code sequence, the second code generator operating independently from the first code generator; and
   an interface coupled to the output line of the first code generator and to the output line of the second code generator, the interface for storing at least one bit of the first code sequence and at least one bit of the second code sequence.

47. The configurable composite code generator recited in claim 46 wherein the output line from the first code generator and the output line from the second code generator are coupled in parallel to the interface which stores in parallel the at least one bit of the first code sequence and the at least one bit of the second code sequence.

48. The configurable composite code generator recited in claim 46 wherein the interface stores at least one delayed bit of the first code sequence.

49. The configurable composite code generator recited in claim 46 further comprising:
   a local controller coupled to the first code generator, the second code generator, and the interface, the local controller scaling an input clock rate to create a local clock rate communicated to the first code generator, the second code generator, and the interface.

50. The configurable composite code generator recited in claim 46 wherein the first code generator generates a channelization code.

51. The configurable composite code generator recited in claim 50 wherein the channelization code is an OVSF code sequence for a communication protocol.

52. The configurable composite code generator recited in claim 46 wherein the second code generator provides a pseudonoise (PN) sequence spreading code.

53. The configurable composite code generator recited in claim 52 wherein the second code generator generates in parallel a plurality of independent PN code sequences for a plurality of possible communication protocols.

54. The configurable composite code generator recited in claim 46 further comprising:
   an input bus coupled to the interface, the input bus for receiving a code sequence from a third code generator operating independently from the composite code generator system and providing a reference state for the first code generator and the second code generator.

55. The configurable composite code generator recited in claim 46 further comprising:
   a plurality of mask circuits coupled to the first code generator, the plurality of mask circuits each having an output coupled in parallel to the interface with respect to the output from the first code generator.

56. The configurable composite code generator recited in claim 46 further comprising:

a global code sequence interface coupled to the interface, the global code sequence interface for receiving a code sequence from a global code generator.

57. A configurable output conditioning circuit (OCC) for processing code sequences, the circuit comprising:
   a plurality of input lines for communicating a plurality of code sequences;
   a mask circuit coupled to the plurality of input lines, the mask circuit for selecting a desired one of the multiple code sequences received on the plurality of input lines for a given application; and
   a memory register coupled to the mask circuit, the memory register providing a mask word to the mask circuit for selecting a desired one of the plurality of code sequences.

58. The configurable OCC recited in claim 57 wherein the plurality of input lines are arranged as a bus.

59. The configurable OCC recited in claim 58 further comprising an interface coupled to the mask circuit, the interface for storing in parallel a first bit from a first code sequence and a second bit from a second code sequence.

60. The configurable OCC recited in claim 59 wherein the interface stores at least one delayed bit of the first code sequence.

61. The configurable OCC recited in claim 59 wherein the interface is a block of memory registers.

62. The configurable OCC recited in claim 57 further comprising a plurality of memory blocks and a selective interconnect, wherein the selective interconnect coupled to the plurality of memory blocks and to the mask circuit, the plurality of memory blocks providing a plurality of selections from among the plurality of code sequences available.

63. The configurable OCC recited in claim 62 wherein each of the plurality of memory blocks stores a mask word for each of a plurality of communication protocols.

64. The configurable OCC recited in claim 62 wherein each of the plurality of memory blocks represents a plurality of phase shifted formulas to be sequentially implemented for a given communication protocol.

65. The configurable OCC recited in claim 64 wherein the plurality of phase shifted formals is equivalent to any divisor of the plurality of memory blocks.

66. The configurable OCC recited in claim 57 further comprising a plurality of mask circuits and a plurality of memory blocks, the plurality of masks coupled to the plurality of input lines in parallel, at least one of the plurality of memory blocks respectively coupled to one of the plurality of masks circuits.

67. The configurable OCC recited in claim 66 wherein each of the plurality of mask circuits is operable to selectively combine any of the multiple code sequences to obtain a desired output code sequence.

68. The configurable OCC recited in claim 67 wherein the local controller locally scales a clock rate and communicates it to a first code generator, a second code generator, and the interface.

69. The configurable OCC recited in claim 57 further comprising a local controller coupled to the mask circuit and the memory register.

70. A configurable code generator system for providing multiple code sequences, the code generator comprising:
   a composite code generator having multiple independent code generators that each generate an independent code sequence;
   a global code generator for providing a global code sequence for synchronization; and
   an interface coupled to the composite code generator and to the global code generator, the interface for storing at least one bit of the global code sequence and at least one bit from at least one of the independent code sequences of the composite code generator.

71. The configurable code generator system recited in claim 70 further comprising an output conditioning circuit (OCC) coupled to the interface, the OCC for processing code sequences.

72. The configurable code generator system recited in claim 70 wherein at least one of the independent code generators includes bit slices with a selective interconnect for enabling a Galois configuration or a Fibonacci configuration for feedback.

73. The configurable code generator system recited in claim 70 further comprising a plurality of slave circuits coupled to at least one independent code generator of the composite code generator, the plurality of slave circuits providing parallel outputs of offset code sequences with respect to the code sequence generated by the at least one independent code generator.

74. The configurable code generator system recited in claim 73 wherein at least one of the independent code generators has a modular linear feedback shift register.

75. A communication device for processing a data signal, the communication device comprising:
   a front-end processor for receiving and transmitting the data signal;
   a modem coupled to the front-end processor, the modem for demodulating the data signal;
   a processor coupled to the a front-end processor and the modem;
   a configurable code generator system coupled to the processor, the configurable code generator system producing parallel code sequences for a plurality of communication protocols, the configurable code generator system conditioning the parallel code sequences for a desired communication protocol to condition the data signal.

76. The communication device recited in claim 75 wherein the configurable code generator system includes a composite code generator for producing in parallel the parallel code sequences for the plurality of communication protocols.

77. The communication device recited in claim 76 wherein the configurable code generator system includes a global code generator for synchronizing the multiple code sequences produced by the composite code generator.

78. The communication device recited in claim 77 wherein the configurable code generator system includes an interface coupled to the global code generator and the composite code generator, the interface for providing in parallel the code sequences for the plurality of communication protocols for subsequent conditioning.

79. The communication device recited in claim 75 wherein the configurable code generator system includes an output conditioning circuit (OCC) coupled to an interface, the OCC for processing code sequences.

80. In a code generator, a method of configurably generating a plurality of code sequences at different code offsets, the method comprising the steps of:
   a) receiving a plurality of mask words at a plurality of mask circuits, one of the plurality of the mask words received at a respective one of the plurality of mask circuits;
   b) receiving in parallel, a state from a plurality of memory registers of the code generator at each of the plurality of mask circuits, the state of the plurality of memory registers representing a polynomial sequence;

c) selectively transmitting the state from the code generator within each of the plurality of mask circuits according to the mask word received at each of the plurality of mask circuits; and d) summing the states at each of the plurality of mask circuits to achieve an output value for each of the plurality of mask circuits.

81. The method recited in claim 80 further comprising the steps of:

e) receiving at a selective interconnect device, the output value from each of the plurality of mask circuits; and f) selectively communicating one output value from the selective interconnect device.

82. The method of claim 80 further comprising the steps of:

g) receiving at a interface having the plurality of memory registers, the output value from each of the plurality of mask circuits; and h) storing the output value from each of the plurality of mask circuits in one of the plurality of memory registers.

83. The method recited in claim 82 further comprising the step of:

i) communicating the output values of each of the plurality of mask circuits from the interface in parallel via a bus.

84. The method recited in claim 83 further comprising the step of:

j) cycling the clock for the code generator;

k) repeating steps a) through h); and l) overwriting the outputs from each of the plurality of mask circuits in the interface.

85. A method of configurably reducing a virtual length of a linear feedback shift register (LFSR), the method comprising the steps of:

a) receiving an initial state for the LFSR;

b) loading the initial state toward a highest power end of the LFSR; and c) loading a mask word toward the highest power end of the LFSR, the mask word selectively activating a quantity of registers in the LFSR.

86. The method recited in claim 85 further comprising the step of:

d) selectively communicating the state of a highest order bit slice in the LFSR to all other bit slices in the LFSR.

87. The method recited in claim 85 further comprising the step of:

e) receiving a polynomial coefficient at a lowest order bit slice in the LFSR for selectively coupling the lowest order bit slice to the highest order bit slice.

88. The method recited in claim 85 wherein the LFSR is coupled in a Galois feedback configuration.

89. A method of configurably operating a modular LFSR, the method comprising the steps of:

a) receiving a control input at a first selective interconnect that selectively couples a first group of bit slices to a second group of bit slices;

b) decoupling the first group of bit slices from the second group of bit slices via the first selective interconnect thereby eliminating a transfer of a state from a highest order bit slice within the first group of bit slices to a lowest order bit slice in the second group of bit slices;

c) coupling the first group of bit slices to the second group of bit slices via the first selective interconnect if the control input is a second value, the coupling step communicating the state from the highest order bit slice in the first group to the lowest order bit slice in the second group; and d) selectively communicating via a second selective interconnect, a feedback state from the second group of bit slices to the first group of bit slices.

90. The method recited in claim 89 further comprising the steps of:

e) calculating a composite Fibonacci feedback state in an adder by adding a sum of the second group of bit slices to a sum of the first group of bit slices; and f) communicating the composite Fibonacci feedback state via the second selective interconnect to a lowest order bit slice in the first group of bit slices.

91. The method recited in claim 90 further comprising the step of:

h) communicating in parallel, an output from the first group of bit slices and an output from the second group of bit slices when the first group and the second group of bit slices are coupled or uncoupled.

92. The method recited in claim 89 further comprising the steps of:

g) communicating a Galois feedback state of the highest order bit slice in the second group to all the bit slices in the first group via the second selective interconnect.

93. A method of configuring a configurable bit slice of an LFSR to operate in one of a plurality of feedback configurations, the method comprising:

a) receiving at a selective interconnect for the bit slice, a first input state for a first feedback configuration of the LFSR;

b) receiving at the selective interconnect for the bit slice, a second input state for a second feedback configuration of the LFSR;

c) receiving a control signal at the selective interconnect; and d) selectively coupling, according to the control signal, the first input state or the second input state to a memory register of the configurable bit slice, the memory register representing a current state of the bit slice.

94. The method recited in claim 93 further comprising the steps:

e) receiving a first feedback state for the first feedback configuration, wherein the first feedback configuration is a Galois feedback configuration; and f) enabling the first feedback state to be summed with the first input according to a state of a polynomial memory register.

95. The method recited in claim 94 further comprising the step of:

g) enabling a feedback state for the second feedback configuration of the LFSR to be transmitted from the bit slice according to a state of the polynomial memory register, wherein the second feedback configuration is a Fibonacci feedback configuration.

96. A method of configurably advancing an LFSR state, the method comprising:

a) receiving a state of the LFSR at a first comparator;

b) receiving a first compare state at the first comparator; and c) transmitting a first jump state from memory to the LFSR when the state of the LFSR matches the first compare state.

97. The method recited in claim 96 further comprising the step of:
  d) providing a first enabling signal from the first comparator to the LFSR when the state of the LFSR matches the first compare state, the first enabling signal allowing the LFSR to accept the first jump state.

98. The method recited in claim 96 further comprising the steps of:
  e) receiving the state of the LFSR at a second comparator;
  f) receiving a second compare state at the second comparator; and
  g) transmitting a second jump state from memory to the LFSR when the state of the LFSR matches the second compare state.

99. The method recited in claim 98 further comprising the step of:
  h) providing a second enabling signal from the second comparator to the LFSR when the state of the LFSR matches the second compare state, the second enabling signal allowing the LFSR to accept the first jump state.

100. The method recited in claim 99 further comprising the step of:
  i) providing the second enabling signal from the second comparator to a selective interconnect, the selective interconnect decoupling the first jump state from, and coupling the second jump state to, the LFSR.

101. A method of configurably generating multiple channelization codes, the method comprising:
  a) enabling a binary counter having a plurality of states;
  b) receiving the plurality of states of the binary counter at a first mask circuit;
  c) receiving a first mask word from a memory block at the first mask circuit; and
  d) transmitting a first value from the first mask circuit based on the first mask word and the plurality of states of the binary counter.

102. The method recited in claim 101 further comprising the step of:
  e) repeating in parallel, step a) through step d) for a second mask word and a second mask circuit, wherein a second value from the second mask circuit is output in parallel with the first value output from the first mask circuit.

103. The method recited in claim 102 wherein the first mask word and the first value are chosen for a first communication protocol, and wherein the second mask word and the second value are chosen for a second communication protocol.

104. The method recited in claim 101 wherein length of the binary counter exceeds the length required for a first OVSF code.

105. The method recited in claim 101 wherein the first value is stored in a first memory register and the second value is stored in a second memory register, the first memory register arranged in parallel with the second memory register.

106. A method of configurably generating multiple independent code sequences, the method comprising:
  a) generating in parallel, a code sequence from each of a plurality of code generators;
  b) communicating in parallel, the code sequence from each of the plurality of code generators to a common interface; and
  c) storing at least one past state from the first code sequence in the interface.

107. The method recited in claim 106 further comprising the step of:
  d) generating at least one offset code sequence from the first code sequence using a mask circuit.

108. The method recited in claim 106 further comprising the step of:
  e) generating a plurality of offset code sequences from the first code sequence using a plurality of mask circuits, each of the plurality of mask circuits responsible for one of the plurality of offset code sequences.

109. The method recited in claim 106 further comprising the step of:
  f) receiving a global code sequence from a global code generator to the common interface, the global code sequence providing a reference for synchronizing the first code generator and the second code generator to the global code generator.

110. The method recited in claim 109 further comprising the step of:
  l) shortening the length of a Galois feedback code generator by biasing a mask word toward the highest power end of the given code generator and decoupling the feedback to the lowest power bit slices that exceed the desired length.

111. The method recited in claim 106 further comprising the step of:
  g) locally scaling an input clock rate at a local controller to produce an output clock rate;
  h) communicating the output clock rate to the first code generator and the second code generator; and
  i) scaling an output rate of the first code generator and an output rate of the second code generator by the output clock rate, the output rate of the first code generator and the output rate of the second code generator being approximately equivalent.

112. The method recited in claim 106 further comprising the step of:
  j) configuring the bit slices in the first code generator as a Galois feedback or a Fibonacci feedback configuration.

113. The method recited in claim 106 wherein one of the code generators is an OVSF code generator.

114. The method recited in claim 106 wherein at least two of the code generators are modular LFSR code generators that can operate independently or as a single code generator.

115. The method recited in claim 106 further comprising the step of:
  k) loading a jump state into one or more of the plurality of code generators after the state of the one or more of the plurality of code generators matches a compare state.

116. The method recited in claim 106 wherein the code sequences generated by the plurality of code generators include a superset of a desired quantity of communication protocols.

117. A method of configurably conditioning multiple code sequences provided to a conditioning circuit, the method comprising:
  a) receiving the multiple code sequences in parallel at a mask circuit;
  b) receiving a mask word at the mask circuit, the mask word selectively choosing a desired code sequence from the multiple code sequences available; and
  c) transmitting a modified code sequence from the mask.

118. The method recited in claim 117 further comprising the step:

d) selectively combining two or more of the multiple code sequences of the input for a communication algorithm.

119. The method recited in claim 117 further comprising the step of:
   e) transmitting the multiple code sequences from a memory register that stores in parallel the current state of the multiple code sequences.

120. The method recited in claim 119 further comprising the step of:
   g) providing a plurality of mask words to a given mask circuit via a selective interconnect, wherein the plurality of mask words correspond to different communication protocols or to different communication channels.

121. The method recited in claim 120 further comprising the step of:
   h) selectively choosing one of the plurality of mask words using the selective interconnect that couples to the mask circuit, a memory storing the plurality of mask words.

122. The method recited in claim 119 further comprising the steps of:
   f) repeating steps a) through c) for a plurality of mask circuits coupled in parallel.

123. The method recited in claim 117 wherein the memory stores at least one past state of at least one of the multiple code sequences.

124. A method of configurably generating code sequences for a plurality of protocols in a CDMA communication system, the method comprising the steps of:
   a) generating a plurality of primitive code sequences in parallel for a plurality of communication standards via a composite code generator;
   b) communicating in parallel the plurality of primitive code sequences to an output conditioning circuit; and
   c) selectively combining the plurality of primitive code sequences in an output conditioning circuit to attain a desired output code sequence.

125. The method recited in claim 124 further comprising the step of:
   d) storing the primitive code sequences from the composite code generator in a memory buffer.

\* \* \* \* \*